United States Patent
Yang et al.

(10) Patent No.: US 12,521,739 B2
(45) Date of Patent: Jan. 13, 2026

(54) MISTING FAN

(71) Applicant: SHENZHEN SHIWU TECHNOLOGY CO., LTD, Guangdong (CN)

(72) Inventors: Xiangyu Yang, Guangdong (CN); Shaohua Zhong, Guangdong (CN)

(73) Assignee: SHENZHEN SHIWU TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/205,930

(22) Filed: May 12, 2025

(65) Prior Publication Data
US 2025/0367687 A1 Dec. 4, 2025

(30) Foreign Application Priority Data

May 30, 2024 (CN) .......................... 202421224174.1
Jan. 22, 2025 (CN) .......................... 202520152840.3
(Continued)

(51) Int. Cl.
*B05B 7/00* (2006.01)
*B05B 15/65* (2018.01)
(Continued)

(52) U.S. Cl.
CPC ............ *B05B 7/0075* (2013.01); *B05B 15/65* (2018.02); *F04D 19/002* (2013.01);
(Continued)

(58) Field of Classification Search
CPC ..... B05B 7/0075; B05B 15/65; F04D 19/002; F04D 25/0673; F24F 6/14; F24F 2006/146
See application file for complete search history.

(56) References Cited

U.S. PATENT DOCUMENTS 5,620,633 A * 4/1997 Junkel .................. B05B 3/0204
239/289
6,257,501 B1 * 7/2001 Roach .................. F24F 5/0035
239/289
(Continued)

FOREIGN PATENT DOCUMENTS

CN 201289174 Y * 8/2009
CN 106151070 A * 11/2016 ......... F04D 25/0673
(Continued)

OTHER PUBLICATIONS

Epo translation of CN211573812 (Year: 2020).*

*Primary Examiner* — Stephen Hobson
(74) *Attorney, Agent, or Firm* — HOWARD M COHN and Associates, LLC

(57) ABSTRACT

A misting fan includes a fan assembly and a misting assembly. The fan assembly includes a fan housing and a fan blade assembly. The fan housing includes an air inlet guard and an air outlet guard. The air outlet guard includes a mist outlet portion and air outlet vanes, the mist outlet portion includes a mist outlet hole and air outlet holes. The misting assembly includes an atomizing member and a water tank. The water tank includes a main tank body, at least one water delivery pipeline, and an atomizing portion. Liquid in the main tank body is provided to the atomizing member through the at least one water delivery pipeline and the atomizing portion, thereby enabling the atomizing member to spray mist spray formed by atomizing the liquid from the mist outlet hole, and outlet airflow is arranged around the mist spray.

19 Claims, 65 Drawing Sheets

(30) Foreign Application Priority Data

Feb. 19, 2025  (CN) .......................... 202520265026.2
May 4, 2025   (CN) .......................... 202520868248.3

(51) Int. Cl.
  *F04D 19/00*   (2006.01)
  *F04D 25/06*   (2006.01)
  *F24F 6/14*    (2006.01)

(52) U.S. Cl.
  CPC ............ *F04D 25/0673* (2013.01); *F24F 6/14* (2013.01); *F24F 2006/146* (2013.01)

(56)              References Cited

U.S. PATENT DOCUMENTS

| | | | | |
|---|---|---|---|---|
| 6,786,701 | B1 * | 9/2004 | Huang | F24F 6/14 |
| | | | | 62/304 |
| 7,510,170 | B2 * | 3/2009 | Huang | F24F 5/0035 |
| | | | | 261/118 |
| 7,810,794 | B2 * | 10/2010 | Chen | B05B 11/0056 |
| | | | | 239/289 |
| 10,330,333 | B2 * | 6/2019 | Kaleta | F04D 19/002 |
| 11,629,869 | B1 * | 4/2023 | Barlettano | F24F 6/16 |
| | | | | 62/176.6 |
| 12,097,523 | B2 * | 9/2024 | Zhong | B05B 1/3006 |
| 12,281,655 | B1 * | 4/2025 | Zhu | F04D 25/0606 |
| D1,076,199 | S * | 5/2025 | Zhong | D26/106 |
| 2003/0111746 | A1 * | 6/2003 | Stutts | F04D 19/002 |
| | | | | 261/116 |
| 2008/0099934 | A1 * | 5/2008 | Chang | F24F 6/14 |
| | | | | 422/124 |
| 2009/0014556 | A1 * | 1/2009 | Gokal | F24F 7/007 |
| | | | | 239/289 |
| 2009/0240192 | A1 * | 9/2009 | Power | B05B 17/0669 |
| | | | | 604/26 |
| 2009/0314216 | A1 * | 12/2009 | Polak | A01K 1/0082 |
| | | | | 239/222.11 |
| 2013/0168882 | A1 * | 7/2013 | Lykins | F04D 29/705 |
| | | | | 220/592.2 |
| 2013/0219933 | A1 * | 8/2013 | Hubert | F24F 1/0076 |
| | | | | 62/121 |
| 2015/0247644 | A1 * | 9/2015 | Stearns | F24F 5/0035 |
| | | | | 261/37 |
| 2016/0208810 | A1 * | 7/2016 | Tse | F04D 25/06 |
| 2018/0238352 | A1 * | 8/2018 | Guo | F04D 29/703 |
| 2022/0228702 | A1 * | 7/2022 | Dai | F04D 29/601 |
| 2023/0009492 | A1 * | 1/2023 | Qin | F24F 6/12 |
| 2023/0118363 | A1 * | 4/2023 | Zhong | F24F 6/14 |
| 2025/0043974 | A1 * | 2/2025 | Brinkman | F24F 5/0035 |
| 2025/0146496 | A1 * | 5/2025 | Zheng | H02P 29/68 |

FOREIGN PATENT DOCUMENTS

| | | | | |
|---|---|---|---|---|
| CN | 106762727 | A * | 5/2017 | .......... F04D 29/002 |
| CN | 206723094 | U * | 12/2017 | |
| CN | 207299341 | U * | 5/2018 | |
| CN | 108843593 | A * | 11/2018 | .............. F24F 6/14 |
| CN | 211573812 | * | 9/2020 | |
| CN | 211573812 | U * | 9/2020 | |
| CN | 216693822 | U * | 6/2022 | |
| CN | 115324915 | A * | 11/2022 | .......... F04D 19/002 |
| CN | 117029143 | A * | 11/2023 | .............. F24F 6/14 |
| CN | 117628607 | A * | 3/2024 | .......... F04D 29/703 |
| CN | 221197589 | U * | 6/2024 | |
| CN | 221347319 | U * | 7/2024 | |
| CN | 118463302 | A * | 8/2024 | ......... F24F 11/0008 |
| CN | 119103628 | A * | 12/2024 | .............. E21F 1/08 |
| WO | WO-2013002038 | A1 * | 1/2013 | .......... F04D 25/084 |
| WO | WO-2013080427 | A1 * | 6/2013 | .......... F04D 29/541 |
| WO | WO-2019131468 | A1 * | 7/2019 | ............. A42B 1/008 |

\* cited by examiner

MISTING FAN

CROSS-REFERENCE TO RELATED APPLICATIONS

The application claims priorities of Chinese Patent Application No. CN202421224174.1, filed on May 30, 2024, Chinese Patent Application No. CN202520152840.3, filed on Jan. 22, 2025, Chinese Patent Application No. CN202520265026.2, filed on Feb. 19, 2025, and Chinese Patent Application No. CN202520868248.3, filed on May 4, 2025, the entire contents of which are incorporated herein by reference.

TECHNICAL FIELD

The present invention relates to the technical field of fans, and in particular to a misting fan.

BACKGROUND

In hot summer, the fan is not easy to carry when people go out, and the heat removal effect of ordinary handheld fans is not obvious. Crowded places are full of some unpleasant smells such as sweat, which brings some discomfort to people Therefore, people have developed a variety of misting fans, which can humidify the air with a misting humidifier while blowing air. On the one hand, the misting fans are conducive to getting cool, on the other hand, the moisture content in the air can be replenished in time. However, when some existing misting fans are used for spraying mist, the sprayed mist and blowing airflow are prone to interfering with each other, leading to the reduction of the experience of the user.

SUMMARY

A main objective of the present invention is to provide a misting fan, which is intended to improve the misting and air blowing effect.

The present invention provides a misting fan, which includes a fan assembly and a misting assembly.

The fan assembly includes a fan housing and a fan blade assembly arranged in the fan housing. The fan housing includes an air inlet guard located at an air inlet side and an air outlet guard located at an air outlet side. The air outlet guard includes a mist outlet portion and a plurality of air outlet vanes annularly connected about the mist outlet portion. The mist outlet portion includes a mist outlet hole, and a plurality of air outlet holes annularly arranged about the mist outlet hole are formed among the plurality of air outlet vanes.

The misting assembly includes an atomizing member and a water tank. The atomizing member is located in the fan housing and corresponds to the mist outlet hole, the water tank includes a main tank body, at least one water delivery pipeline, and an atomizing portion, the at least one water delivery pipeline communicates between the main tank body and the atomizing portion, the atomizing portion corresponds to the atomizing member, and the atomizing portion and the atomizing member are located between the fan blade assembly and the air outlet guard to enable the fan blade assembly to be able to blow air entering from the air inlet side to sequentially pass through a periphery of the atomizing portion and a periphery of the atomizing member and then blow the air out through the plurality of air outlet holes; liquid in the main tank body is able to be provided to the atomizing member through the at least one water delivery pipeline and the atomizing portion, thereby enabling the atomizing member to spray mist spray formed by atomizing the liquid from the mist outlet hole, and outlet airflow from the plurality of air outlet holes is arranged around the mist spray.

In the misting fan according to an embodiment of the present invention, the mist spray formed by atomizing the liquid can be sprayed out from the mist outlet hole by the atomizing member, and the outlet airflow of the multiple air outlet holes is arranged around the mist spray, and then the interference between the mist spray and the outlet airflow of the misting fan is relatively small, the blowing and misting effects are both excellent, and the user experience is high.

BRIEF DESCRIPTION OF THE DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

DETAILED DESCRIPTION OF THE EMBODIMENTS

Figure 1:
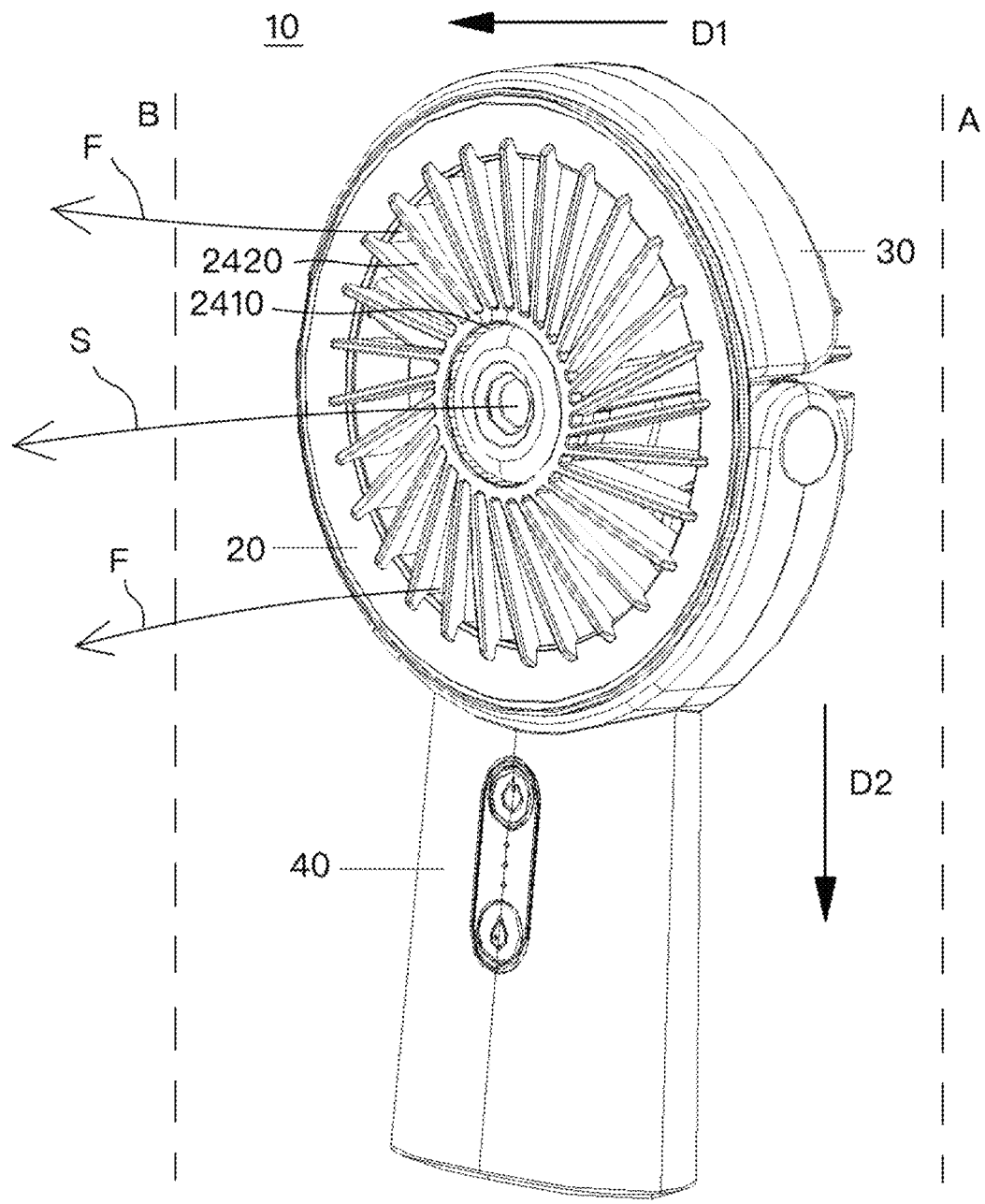
FIG. 1 is a three-dimensional diagram of a misting fan according to a first embodiment of the present invention.
Figure 2:
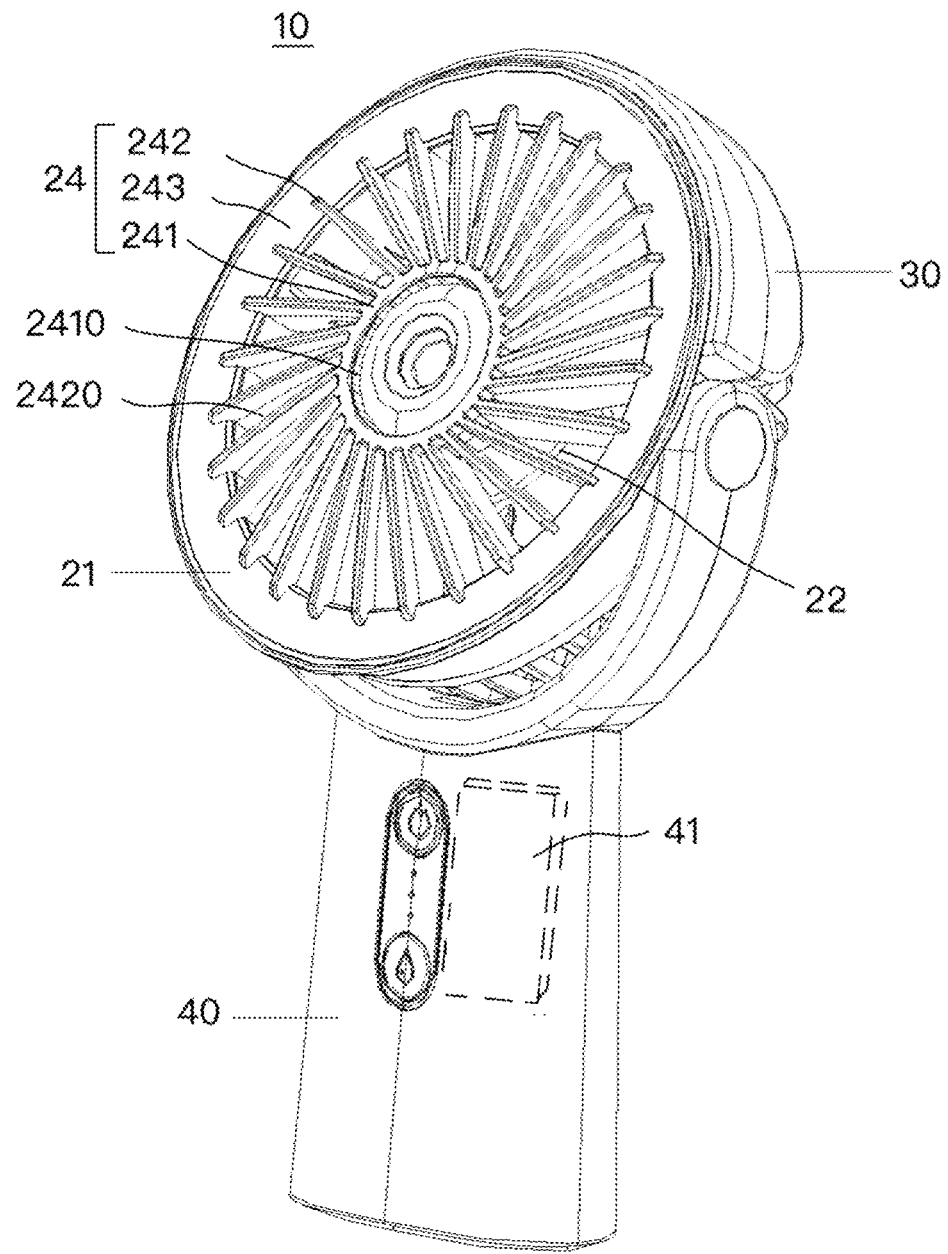
FIG. 2 is a schematic diagram of a fan assembly and a handheld housing of a misting fan according to a first embodiment of the present invention when rotated by a certain angle.
Figure 3:
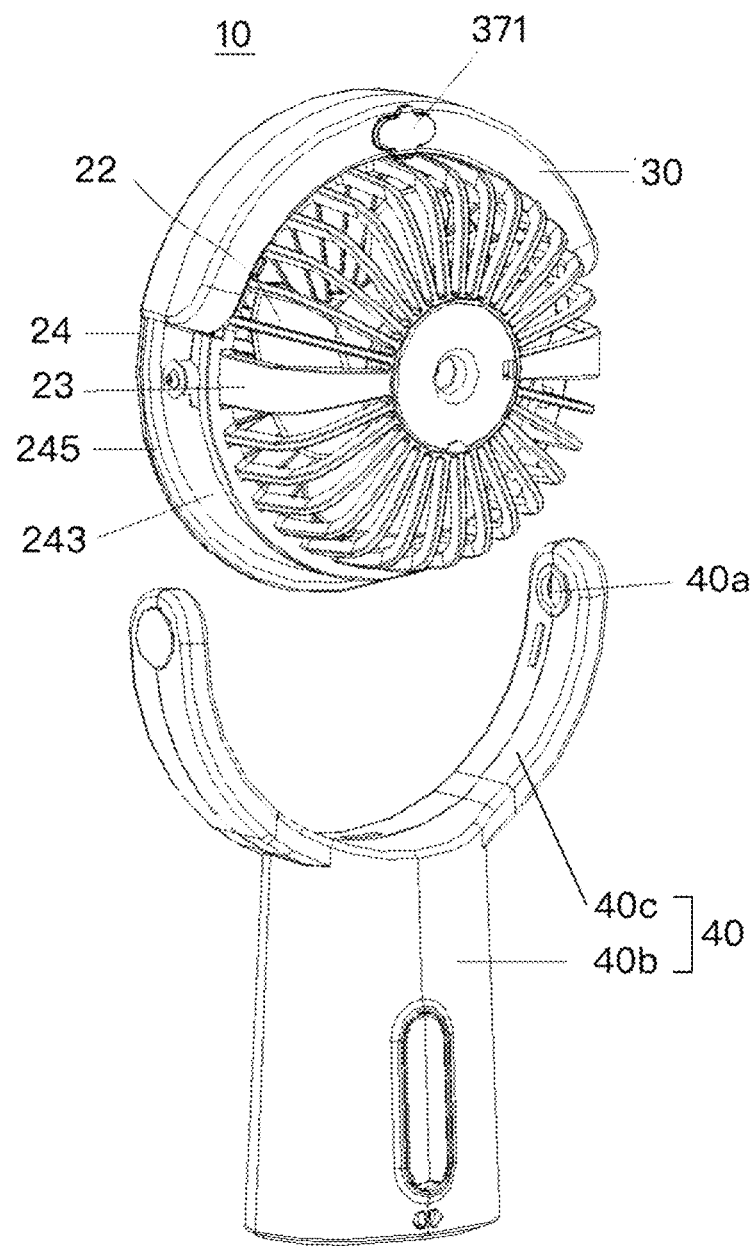
FIG. 3 is an exploded view of a fan assembly and a handheld housing of a misting fan according to a first embodiment of the present invention.
Figure 4:
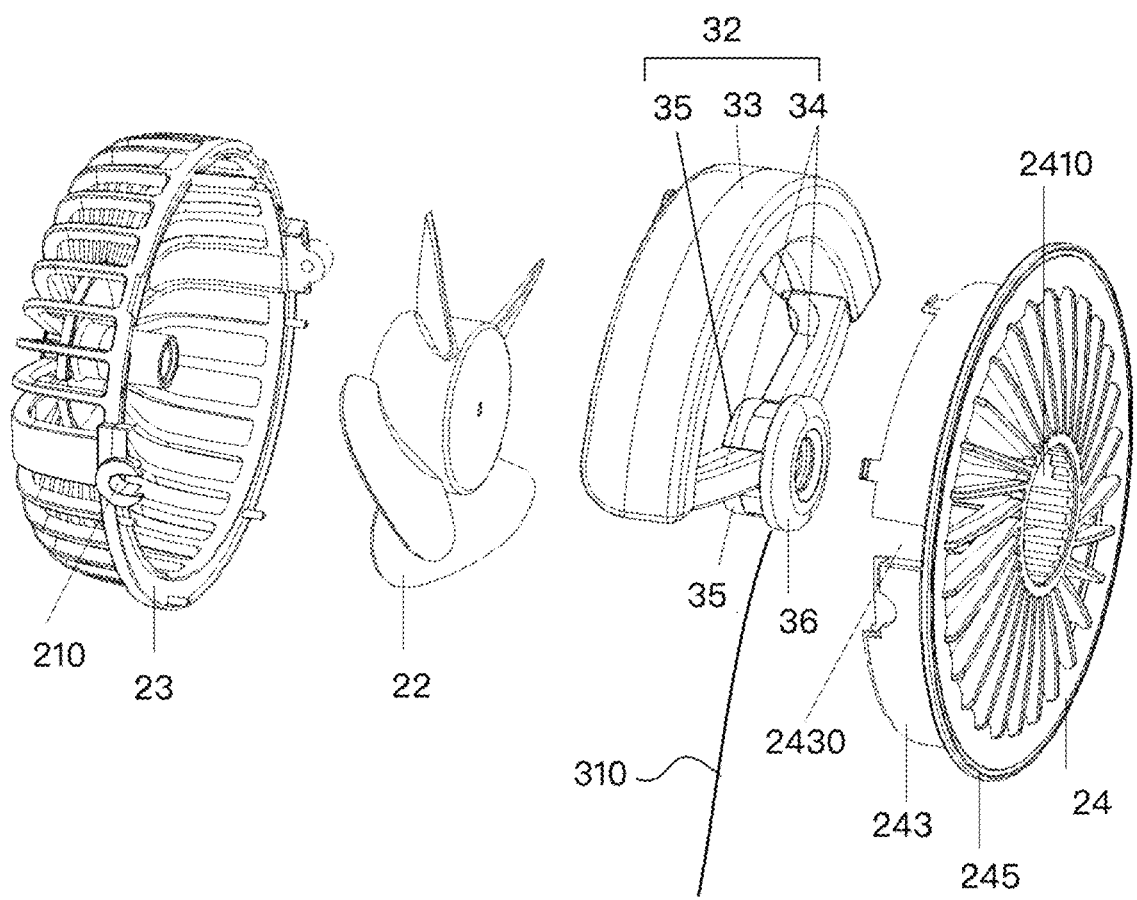
FIG. 4 is an exploded view of a fan assembly and a water tank of a misting fan according to a first embodiment of the present invention.
Figure 5:
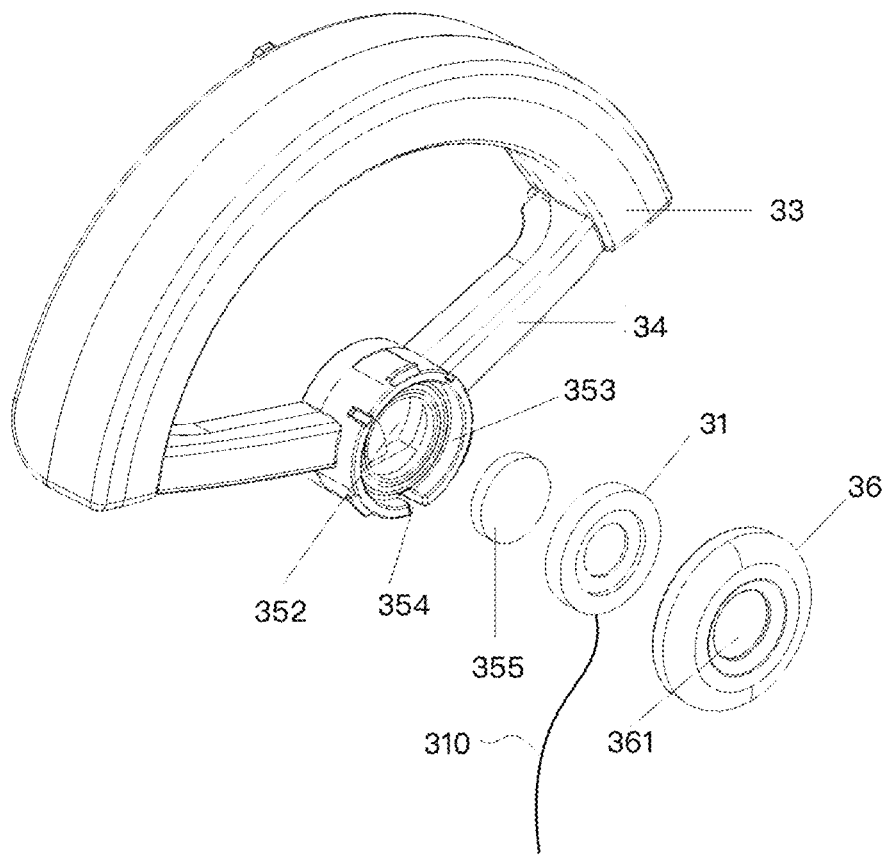
FIG. 5 is an exploded view of a water tank, an atomizing member and a water guide sheet of a misting fan according to a first embodiment of the present invention.
Figure 6:
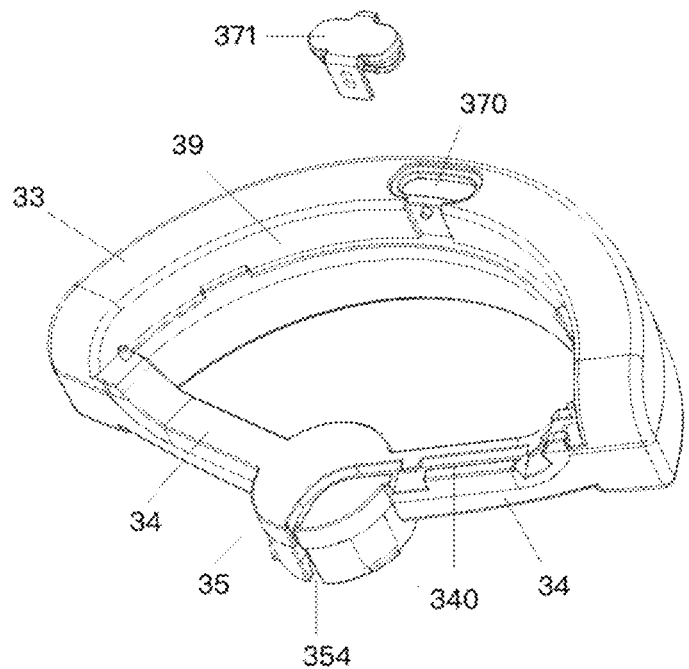
FIG. 6 is a structural diagram of a water tank of a misting fan according to a first embodiment of the present invention.
Figure 7:
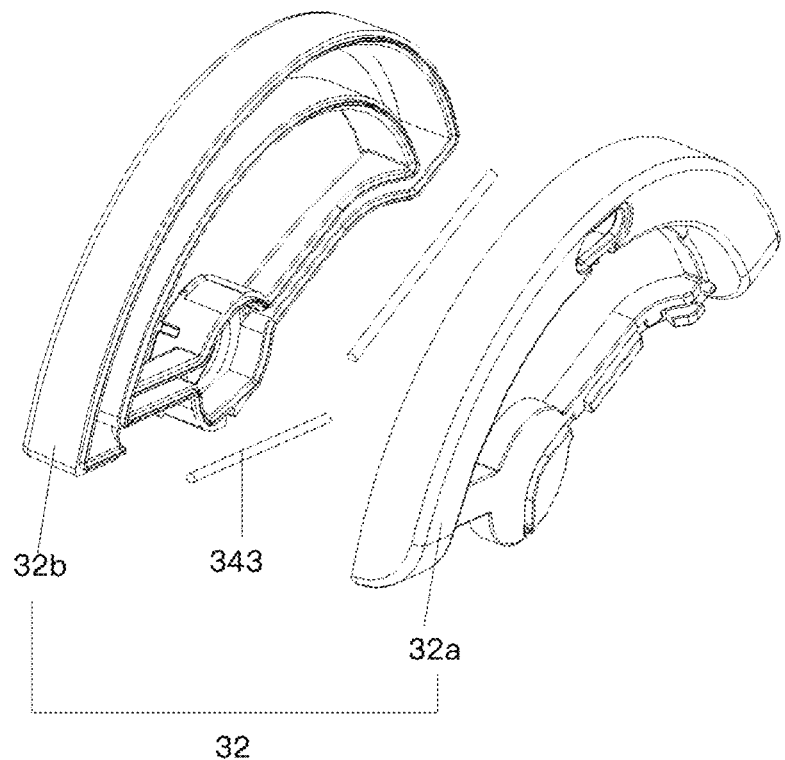
FIG. 7 is an exploded view of a water tank and a fiber liquid guide strip of a misting fan according to a first embodiment of the present invention.
Figure 8:
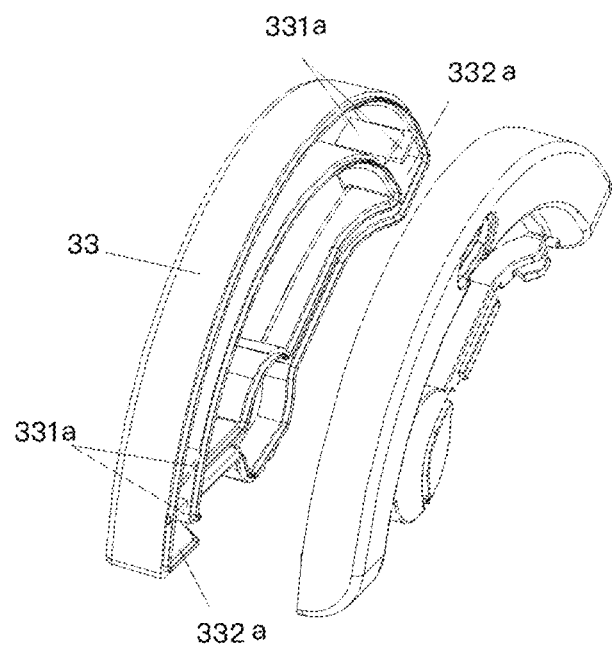
FIG. 8 is an exploded view of a water tank of a misting fan according to a first embodiment of the present invention.

The technical solutions in the embodiments of the present invention will be clearly and completely described below in conjunction with the accompanying drawings in the embodiments of the present invention. Apparently, the described embodiments are only a part of the embodiments of the present invention, rather than all the embodiments. Based on the embodiments in the present invention, all other embodiments obtained by those ordinarily skilled in the art without doing creative work shall fall within the protection scope of the present invention.

It should be noted that all directional indications (such as up, down, left, right, front, back . . . ) in the embodiments of the present invention are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present invention are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present invention.

First Embodiment

Please referring to FIG. 1 to FIG. 9, a first embodiment of the present invention provides a misting fan. Specifically, the misting fan 10 is a handheld misting fan, including a fan assembly 20, a misting assembly 30, and a handheld housing 40.

The misting assembly 30 includes a water tank 32 for storing water, and an atomizing member 31 for atomizing the water. The atomizing member 31 is arranged at a middle position of the fan assembly 20, or a position close to the middle. Specifically, the water tank 32 may be provided with an atomizing groove 352 communicating with the water tank 32 and an atomizing hole 351 communicating with the atomizing groove 352 at a middle position or a position close to the middle. The atomizing member 31 is mounted to correspond to the atomizing hole 351, and the fan assembly 20 is configured to drive generated airflow F to send out mist spray S generated by atomization of the atomizing member 31.

According to the present invention, as the atomizing member 31 is arranged at the middle position of the fan assembly 20 or the position close to the middle, when the fan assembly 20 blows air, the generated airflow can be blown out in an airflow direction after being fully mixed with water vapor generated by the atomizing member 31. Therefore, when a user uses the handheld fan provided by the present invention, an orientation of the fan assembly 20, i.e., a blowing direction, is an output direction of the mist spray S, the user can control the direction of the mist spray S convenient, thus solving the problem that a cooling effect cannot be achieved as a blowing direction of the mist spray S of the existing misting fan cannot be controlled well, the mist spray S can be controlled to blow to a desired position to achieve the cooling effect at a specified position.

Specifically, the water tank 32 is arranged on the fan assembly 20 and higher than the atomizing groove 352, thus facilitating the water in the water tank 32 to flow into the atomizing groove 352.

In the first embodiment, the water tank 32 includes an arc-shaped main tank body 33, and two water delivery pipes 34 respectively communicating with both ends of the main tank body 33. The two water delivery pipelines 34 communicate with the atomizing groove 352 at the ends away from the main tank body 33, thereby enabling the water in the main tank body 33 to enter the atomizing groove 352 through the water delivery pipeline 34. The main tank body 33 is arranged on the fan assembly 20. In other words, the water tank 32 is arranged on the fan assembly 20, and higher than the atomizing groove 352.

In the first embodiment, the fan assembly 20 includes an air outlet guard 24 at an air inlet side A and an air inlet guard 23 at an air outlet side B, the air outlet guard 24 and the air inlet guard 23 are connected and configured to press against the main tank body 33, thus fastening the water tank 32 to the fan assembly 20.

One side, close to the air inlet guard 23, of the air outlet guard 24 is provided with an outer frame 243, the top of the air outlet guard 24 is provided with a first stop block 245, one side, close to the air inlet guard 23, of the water tank 32 is provided with an insertion groove, and when the air outlet guard 24 is connected to the air outlet guard 23, the main tank body 33 is fastened through the mating of the first stop block 245 and the air outlet guard 24. The main tank body 33 is located at an outer side of the outer frame 243, the air inlet guard 23 is partially located in the insertion groove 39, a position, corresponding to the water delivery pipeline, of the outer frame 243 is provided with an avoidance opening 2430, and the water delivery pipeline 34 and the atomizing groove 342 are both located in the fan assembly 20 to play a role in protecting the atomizing member 31. Moreover, a space can be effectively utilized to minimize the volume of the handheld fan provided by the present invention in a case that the water tank 32 and the atomizing member 31 are provided, which is convenient for the user to carry.

The two water delivery pipelines 34, the atomizing groove 352 and the main tank body 33 form a fan-shaped structure, and one end, connected to the main tank body 33, of the water delivery pipeline is higher than one end connected to the atomizing groove 352, so that the water in the water tank 3 can be all placed in the atomizing groove 352 through the water delivery pipeline 34 and flow out through the atomizing hole 351, which is convenient for the atomizing member 31 to atomize the water. This helps improve a utilization rate of the water.

The fan assembly 20 further includes a fan blade assembly 22 arranged on the air inlet guard 23, the water delivery pipeline 34 and the atomizing groove 352 are both located in front of the fan blade assembly 22 to directly blow mist spray generated by the atomizing member 31 out through rotation of the fan assembly 22. A structure and principle of the fan assembly 22 are the prior art, and how the fan blade 22 rotates will be not described in detail here.

The handheld housing 40 is internally provided with a main circuit board 41 electrically connected to the atomizing member 31 through a wire, the air outlet guard 24 or the air inlet guard 23 is rotatably connected to the handheld housing 40, which is convenient for the user to adjust a direction of the fan assembly 20, and makes the use convenient.

The atomizing member 31 is an atomizing sheet, one end, close to the air outlet guard 24, of the atomizing portion 35 is provided with a mounting groove 353 in fit with the atomizing sheet, and the mounting groove 353 communicates with the atomizing groove 352 through the atomizing hole 351. The misting assembly further includes a decorative cover 36, the decorative cover 36 is in snap-fit with the mounting groove 353 to compress and fasten the atomizing member 31.

The decorative cover 36 is further provided with an opening 361 for exposing at least part of the atomizing member 31, thereby spraying out the mist spray S. The atomizing portion 35 is further provided with a first wire slot 354 communicating with the mounting groove, a back surface of one water delivery pipeline 34 is provided with a second wire channel 340, the air outlet guard 24 or the air inlet guard 23 is provided with a first wire hole 210 at a position rotatably connected to the handheld housing 40, the handheld housing 40 is provided with a second wire hole 40a in internal communication with the handheld housing 40 at a position rotatably connected to the air outlet guard 24 or the air inlet guard 23, a wire 310 for connecting the atomizing member 31 may be placed in the handheld housing 40 after passing through the first wire slot 354, the second wire channel 340, the first wire hole 210 and the second wire hole 40a in turn, and then is electrically connected to the main circuit board 41 in the handheld housing 40 to achieve electric connection between the atomizing member 31 and the main circuit board 41, so that on-off of the atomizing member 31 can be controlled through the main circuit board 41. In addition, the mist spray S generated by the atomizing member 31 is sprayed out from the mist outlet hole 2410, outlet airflow F of the multiple air outlet holes 2420 is annularly arranged about the mist spray S, and the wire 310 and the first wire slot 354 can be sealed by glue. To further reduce a thickness of the fan assembly 20, the middle of the air outlet guard 24 is provided with a mist outlet hole 2410, and the decorative cover 36 is placed in the mist outlet hole 2410.

In the first embodiment, the air outlet guard 24 and the air inlet guard 23 may be connected through snap-fit engagement or screw fastening. The position close to the top or the top of the main tank body 33 is provided with a water injection port 370. A sealing plug 371 is arranged at the water injection port 370 for blocking the water injection port 370 and preventing water from flowing out from the water injection port 370.

In the first embodiment, a fiber liquid guide strip 343 is arranged in the water delivery pipeline 34. Because air bubbles will be generated when the atomizing members atomizes the water by vibrating at a high frequency, the fiber liquid guide strip 343 can provide an attachment position for the air bubbles, and can guide the air bubbles to a water surface to eliminate the air bubbles, which can prevent the air bubbles from attaching to the atomizing sheet to cause the atomizing sheet to be isolated from water, and prevent a situation that the misting effect is affected due to spray interruption caused by a situation that the atomizing sheet cannot make contact with water and causing. The fiber liquid guide strip 343 may be a fiber cotton stick.

In the first embodiment, in the main tank body 33, a plurality of ribs 331a are arranged at positions close to both ends, and the ribs 331a are misaligned. The misaligned ribs 331a are configured to separate the water level to reduce a pressure of the water reaching the atomizing groove 352, thereby further reducing the generation of air bubbles in the water, and reducing a phenomenon of spray interruption of the atomizing part 31.

In the first embodiment, a water guide sheet 355 (i.e., a cotton sheet) is further arranged in the atomizing groove 352, which is located on a back surface of the atomizing member 31. The water guide sheet 355 can be configured to guide the water to the atomizing member 31, and then the water can be atomized by the atomizing member 31. In addition, the water guide sheet 355 can prevent the water from leaking out from an opening of the atomizing member 31 to prevent water leakage.

Specifically, in the first embodiment, the air inlet guard 24 includes a mist outlet portion 241, and multiple air outlet vanes 242 annularly connected around the mist outlet portion 241. The mist outlet portion 241 includes a mist outlet hole 2410, and multiple air outlet holes 2420 annularly arranged about the mist outlet hole 2410 are formed between the multiple air outlet vanes 242.

The atomizing member 31 is arranged in the fan housing 21 and corresponds to the mist outlet hole 2410, at least one water delivery pipeline 34 communicates between the main tank body 33 and the atomizing portion 35, the atomizing portion 35 corresponds to the atomizing member 31, and the atomizing portion 35 and the atomizing member 31 are located between the fan blade assembly 22 and the air outlet guard 24, so that the fan blade assembly 22 can blow air entering from the air inlet side A to sequentially pass through a periphery of the atomizing portion 35 and a periphery of the atomizing member 31 and then blow the air out through the multiple air outlet holes 2420. Liquid in the main tank body 33 can be provided to the atomizing member 31 through the at least one water delivery pipeline 34 and the atomizing portion 35, so that the atomizing member 31 can spray mist spray S formed by atomizing the liquid from the mist outlet hole 2410, and outlet airflow F from the multiple air outlet holes 2420 is arranged around the mist spray S.

In the misting fan 10 according to an embodiment of the present invention, the mist spray S formed by atomizing the liquid can be sprayed out from the mist outlet hole 2410 by the atomizing member 31, and the outlet airflow F of the multiple air outlet holes 2420 is arranged around the mist spray, and then the interference between the mist spray S and the outlet airflow F of the misting fan 10 is relatively small, the blowing and misting effects are both excellent, and the user experience is high.

Further, at least one inner wall 332a, close to one end of the at least one water delivery pipeline 34, of the main tank body 33 is higher than or equal to one end, connected to the main tank body 33, of the at least one water delivery pipeline 34 in a direction of gravity D2, one end, connected to the main tank body 33, of the at least one water delivery pipeline 34 is higher than or equal to one end, connected to the atomizing portion 35, of the at least one water delivery pipeline 34 in the direction of gravity D2, so that the liquid in the main tank body 33 can flow into the atomizing portion 35 through the at least one water delivery pipeline 34 under an action of gravity.

In this embodiment, the at least one water delivery pipeline 34 includes a first water delivery pipeline 341 and a second water delivery pipeline 342, the main tank body 33 includes an arc-shaped structure with a cavity, the first water delivery pipeline 341 communicates between one end of the main tank body 33 and the atomizing portion 35, and the second water delivery pipeline 342 communicates between the other end of the main tank body 33 and the atomizing portion 35.

In a direction from the fan blade assembly 22 to the air outlet guard 24 (i.e., an air outlet direction D1 of the air outlet hole 2420 and a direction from the air inlet side to the air outlet side), the water tank 32 composed of the main tank body 33, the first water delivery pipeline 341, the second water delivery pipeline 342 and the atomizing portion 34 is divided into a first part of housing 32a facing the fan blade assembly 22, and a second part of housing 32b facing the air outlet guard 24, the first part of housing 32a and the second part of housing 32b are hermetically connected into a whole, and the second part of housing 32b includes an atomizing hole 351 formed in the atomizing portion 35. The atomizing member 35 is arranged in the mounting groove 352 in the atomizing portion 34, the mist spray S is sprayed out through the atomizing hole 351 and the mist outlet hole 2410, or the atomizing member 31 is located outside the atomizing portion 35 and corresponds to the atomizing hole 351, so that the liquid in the water tank 32 can be atomized into the mist spray S through the atomizing hole 351 to be sprayed out through the mist outlet hole 2410. The air outlet guard 24 further includes an outer frame 243 for annularly connecting peripheries of the multiple air outlet vanes. The outer frame 243 is provided with an avoidance opening 2430 at a position corresponding to the at least one water delivery pipeline, and one end, connected to the main tank body 33, of the at least one water delivery pipeline 34 is inserted into the avoidance opening 2430.

In this embodiment, the atomizing member 31 is arranged in the mounting groove 353 outside the atomizing portion 35. However, in other embodiments, the atomizing member 31 may also be arranged in the mounting portion 35 (i.e., the atomizing groove 352).

It may be understood that one end of the fiber liquid guide strip 343 extends to the main tank body 33, and the other end of the fiber liquid guide strip 343 extends to the atomizing portion 35, and the fiber liquid guide strip is configured to guide the liquid in the main tank body 33 to the atomizing portion 35.

Figure 9:
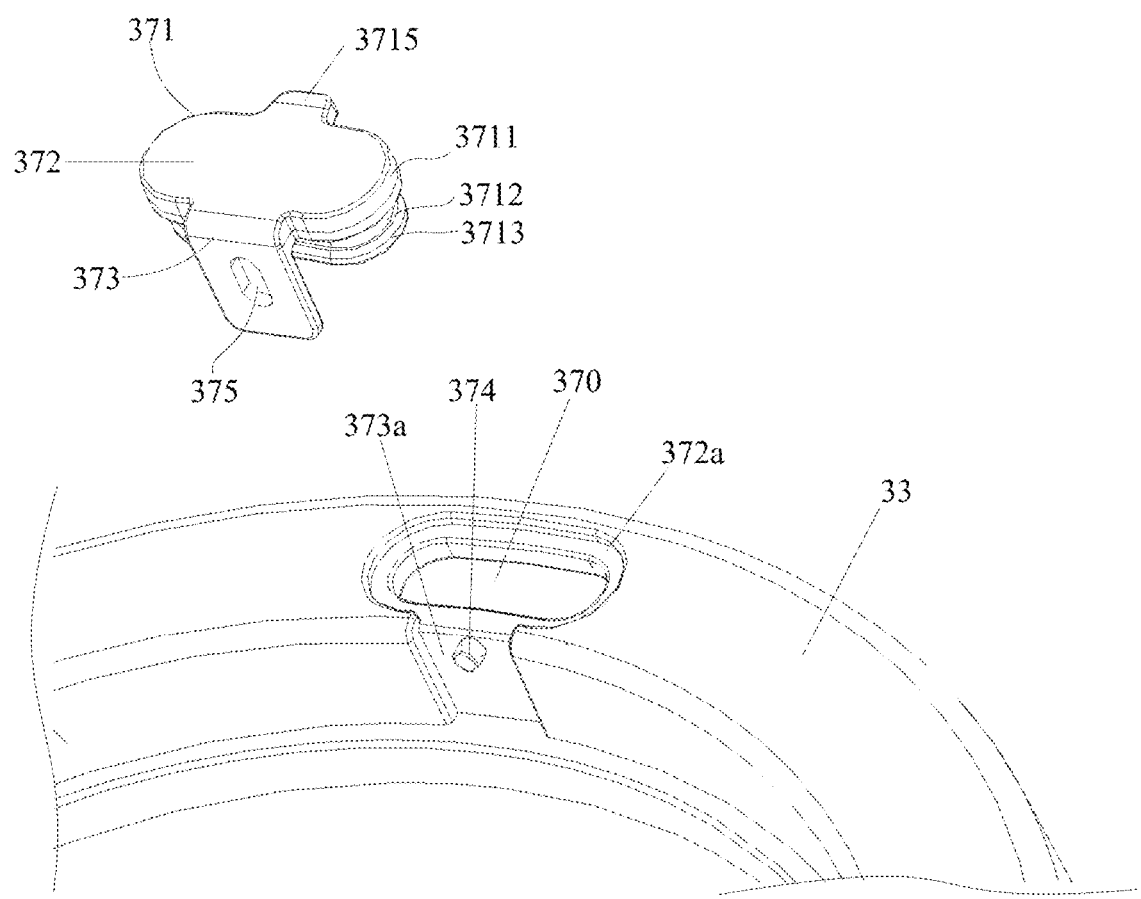
FIG. 9 is an enlarged view of part IX in FIG. 6.
Figure 10:
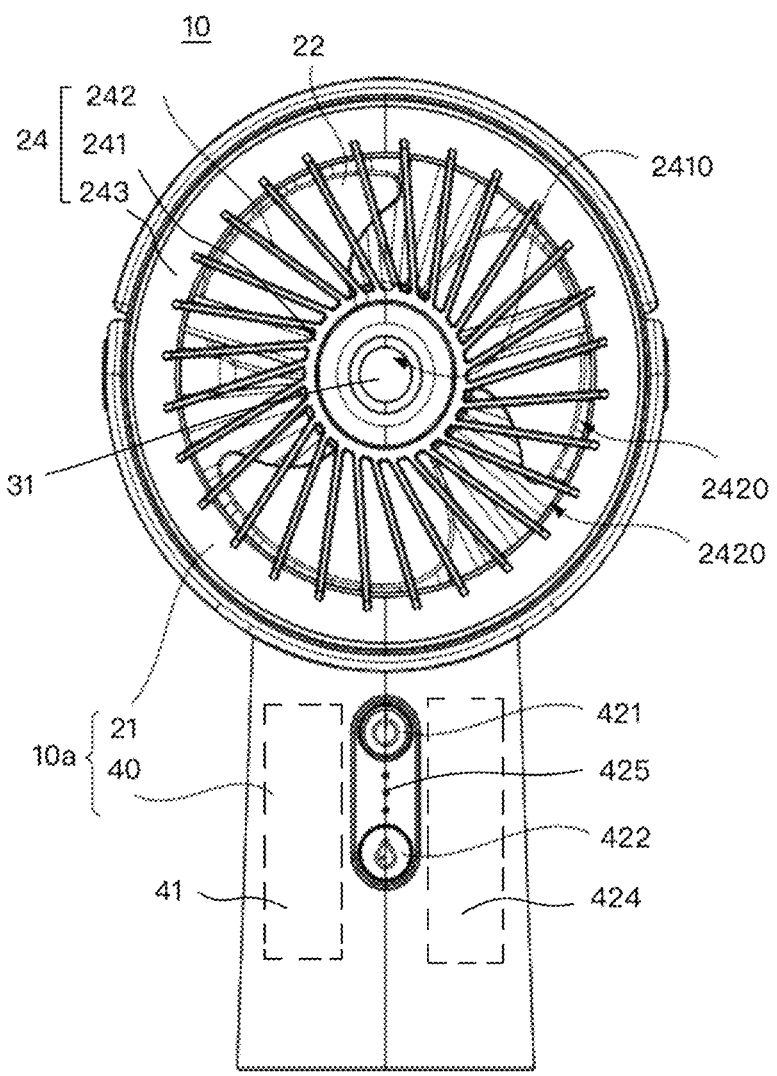
FIG. 10 is a structural diagram of a misting fan according to a second embodiment of the present invention.
Figure 11:
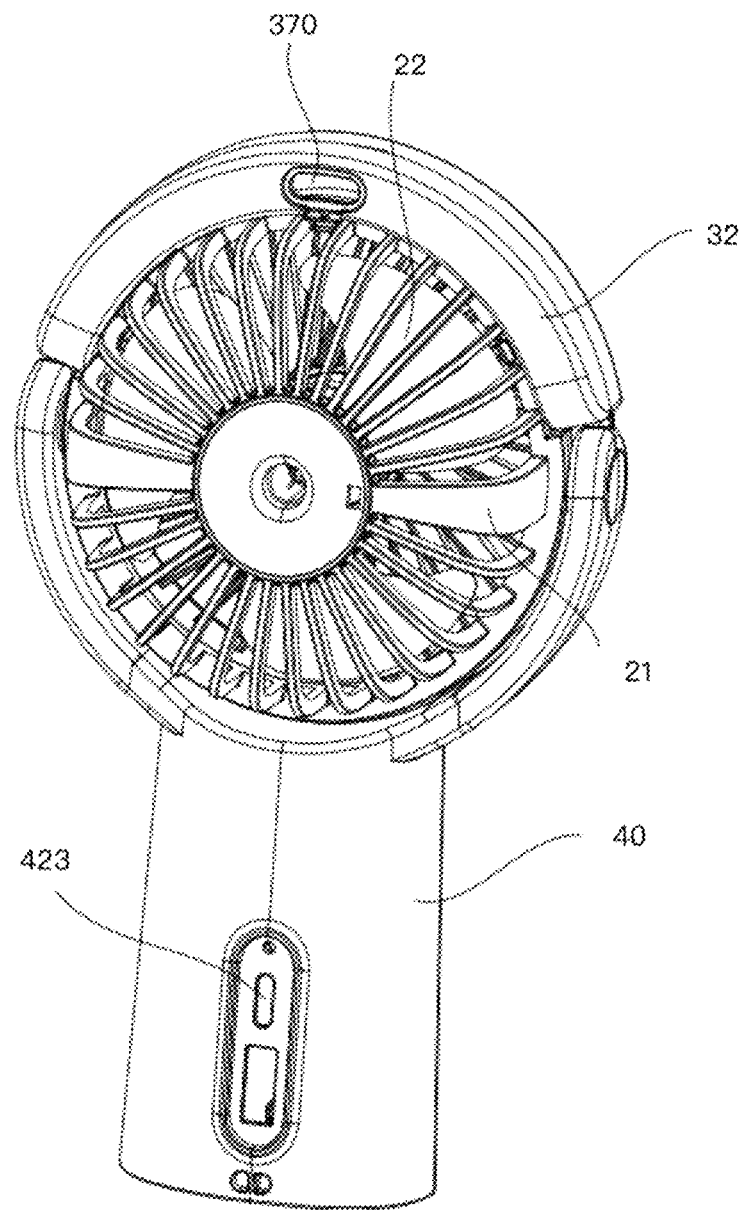
FIG. 11 is a structural diagram of a misting fan in FIG. 10 from another perspective.
Figure 12:
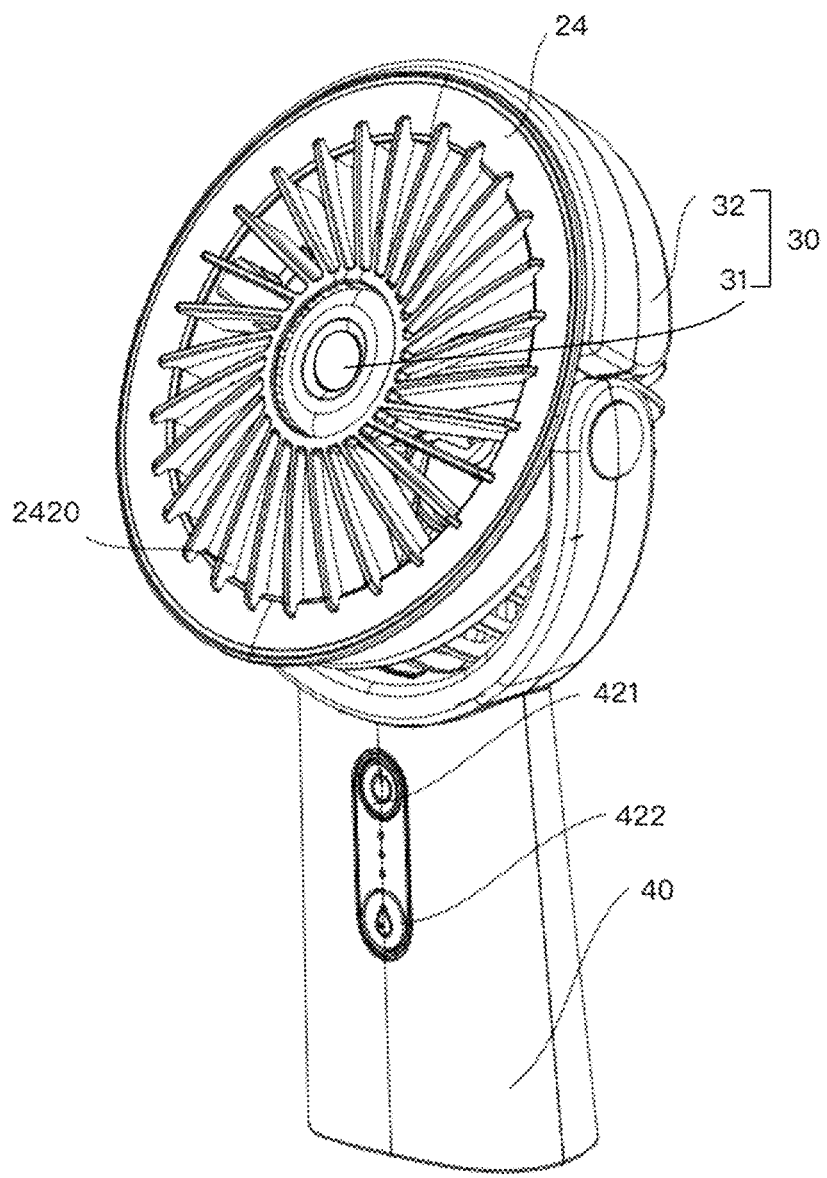
FIG. 12 is a structural diagram of an air outlet guard of a misting fan in FIG. 10 after rotating relative to a handle.
Figure 13:
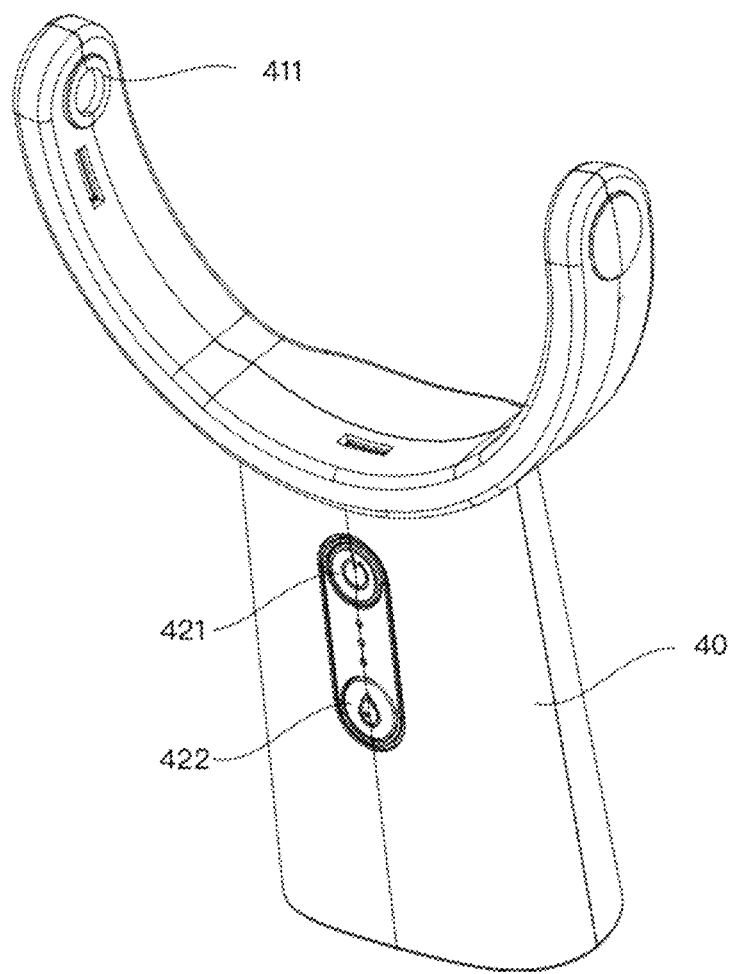
FIG. 13 is a structural schematic diagram of a handle of a misting fan in FIG. 10.
Figure 14:
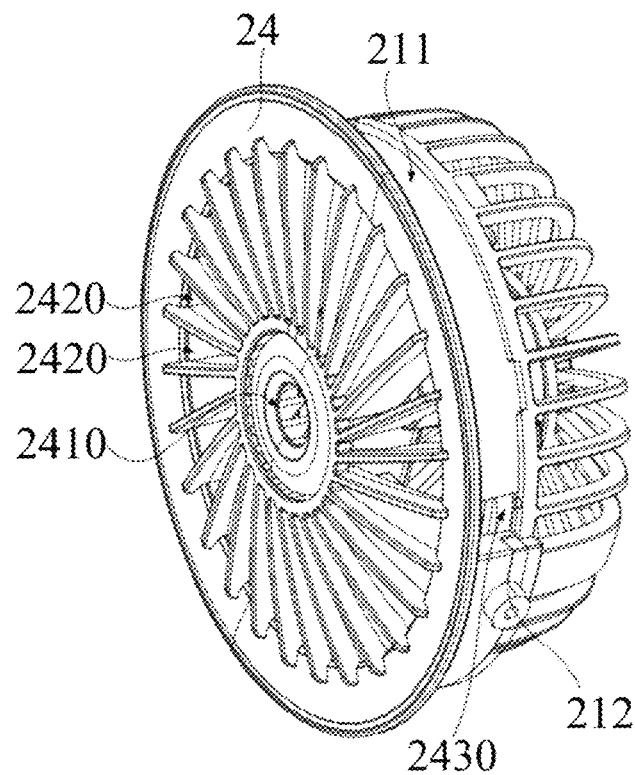
FIG. 14 is a structural diagram of a mounting housing of a misting fan in FIG. 10.
Figure 15:
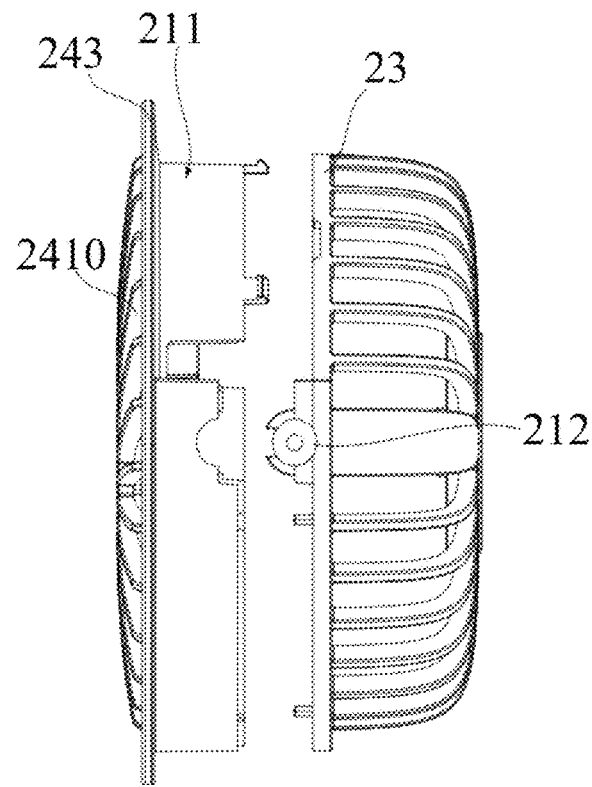
FIG. 15 is an exploded view of a mounting housing of a misting fan in FIG. 14.
Figure 16:
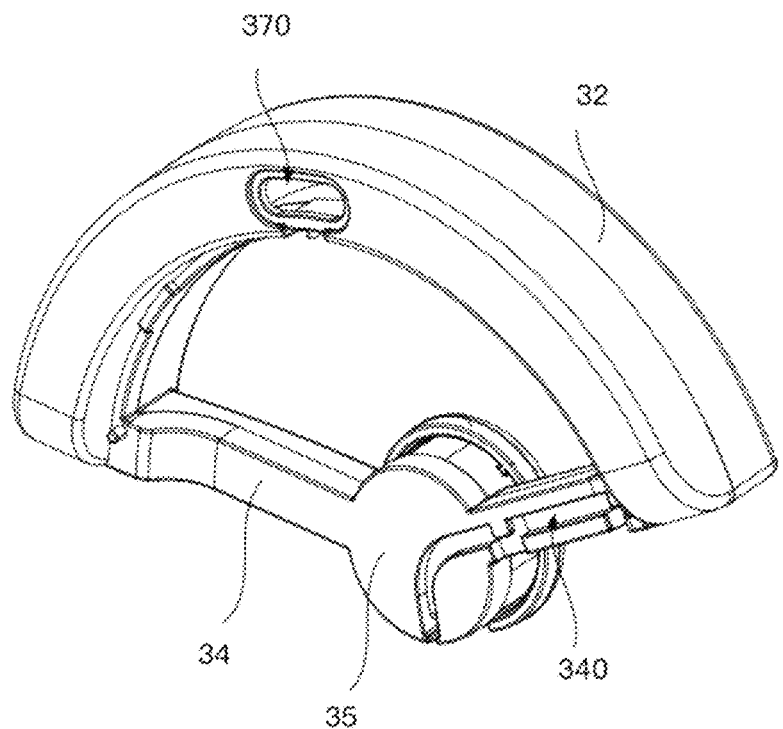
FIG. 16 is a structural diagram of a misting assembly of a misting fan in FIG. 11.
Figure 17:
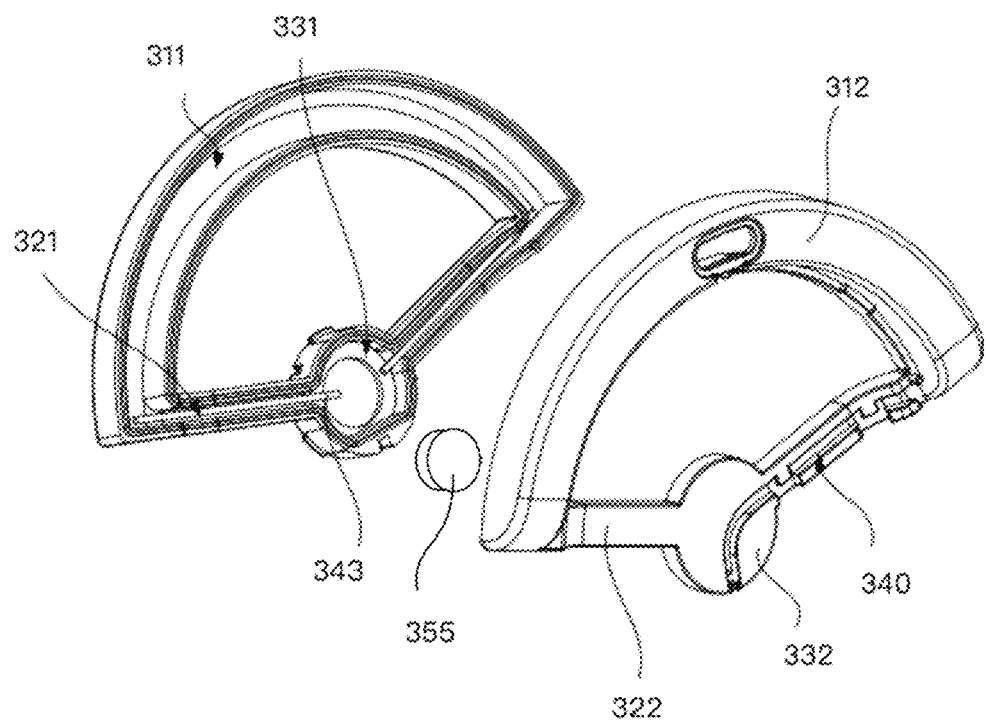
FIG. 17 is an exploded view of a misting assembly of a misting fan in FIG. 16.
Figure 18:
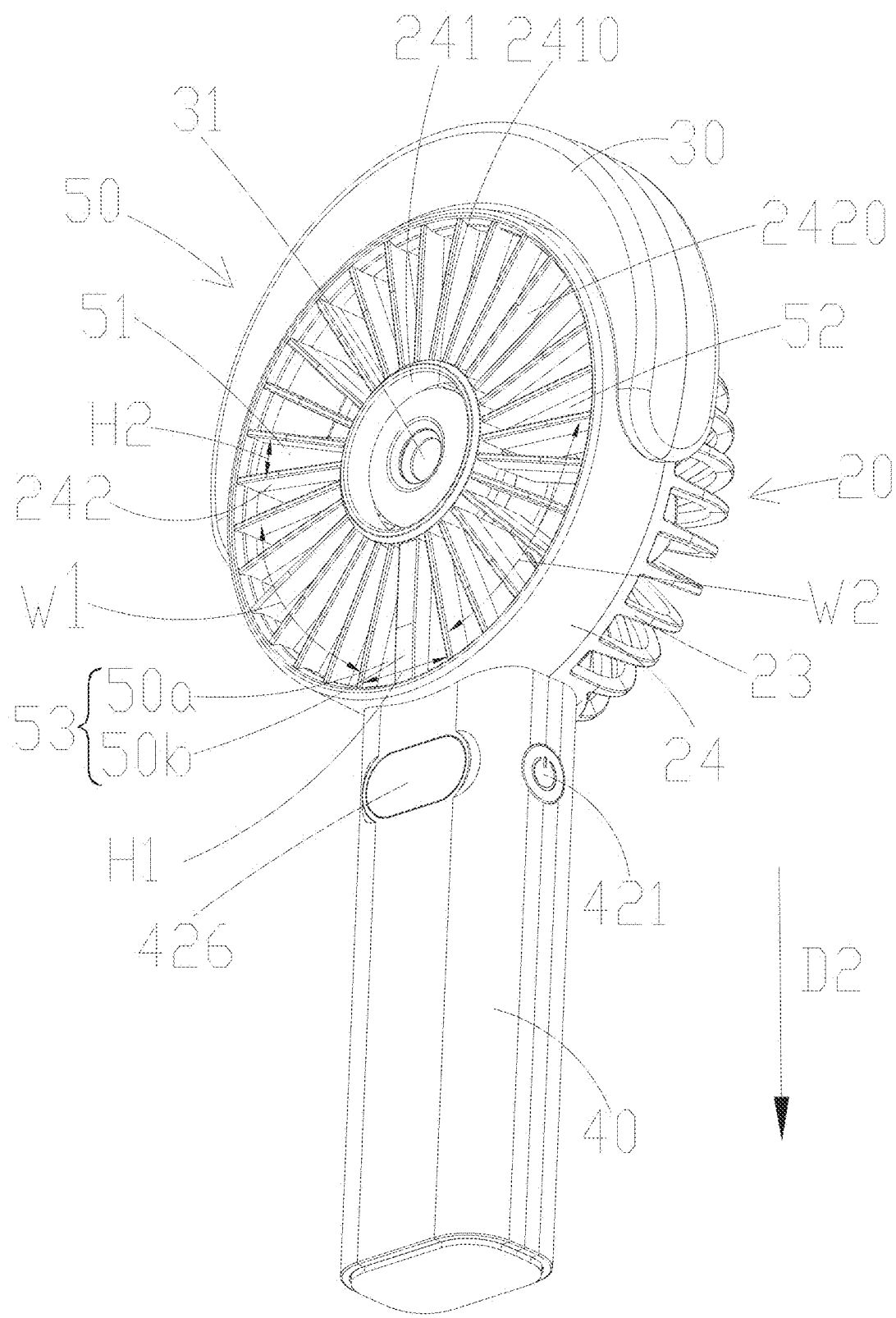
FIG. 18 is a three-dimensional diagram of a misting fan according to a third embodiment of the present invention.
Figure 19:
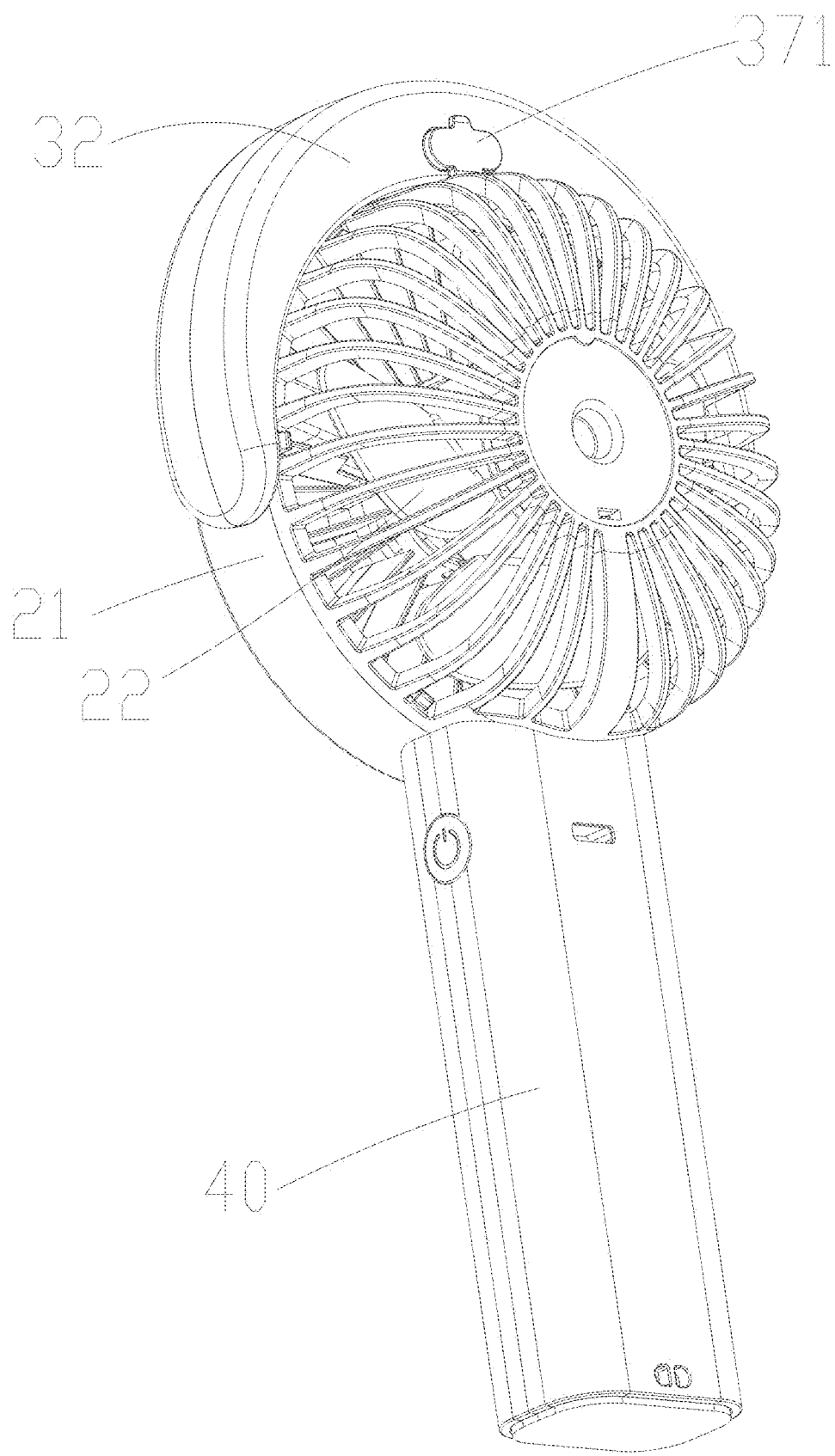
FIG. 19 is a three-dimensional diagram of a misting fan according to a third embodiment of the present invention from another perspective.
Figure 20:
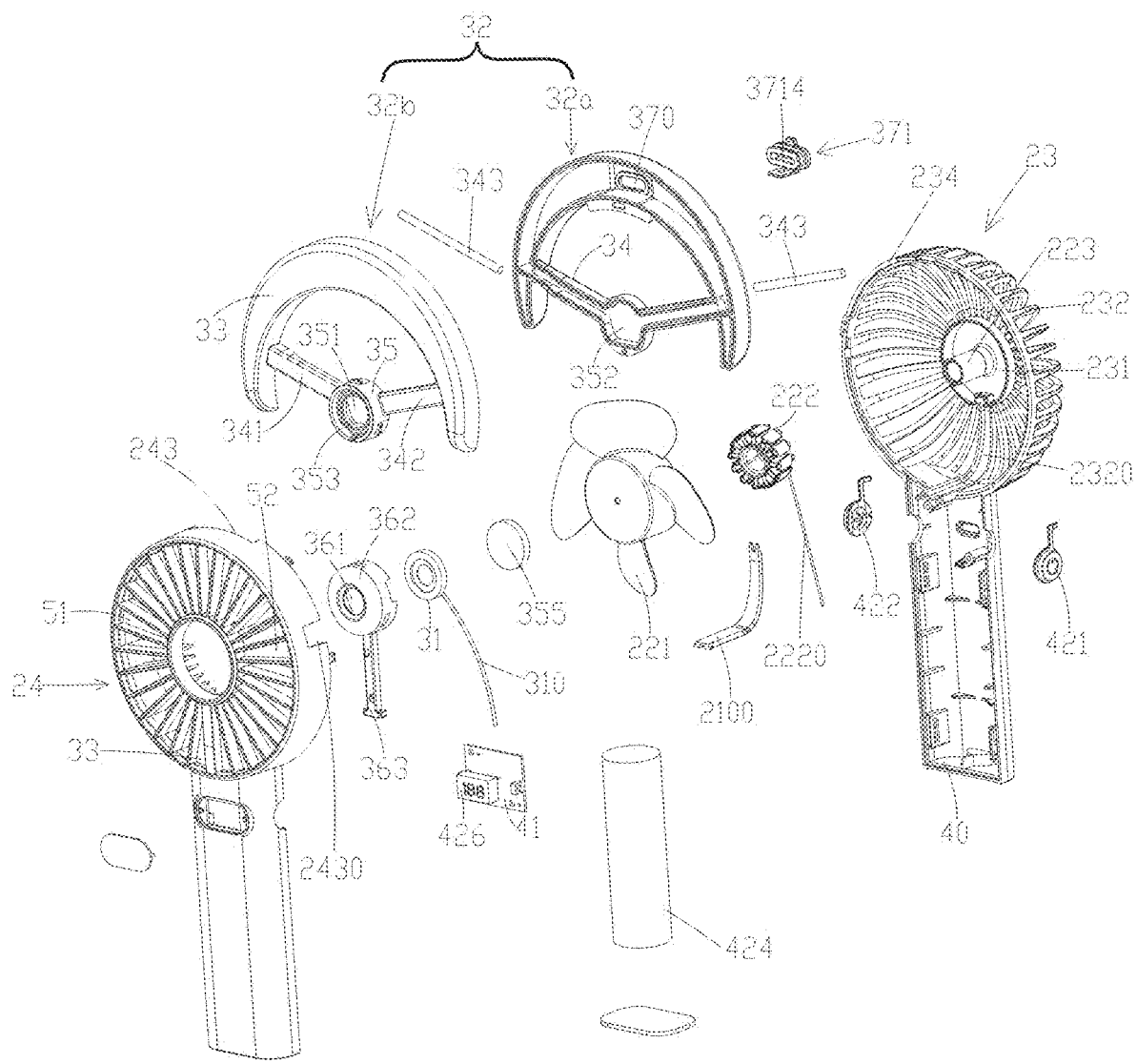
FIG. 20 is an exploded view of a misting fan according to a third embodiment of the present invention.
Figure 21:
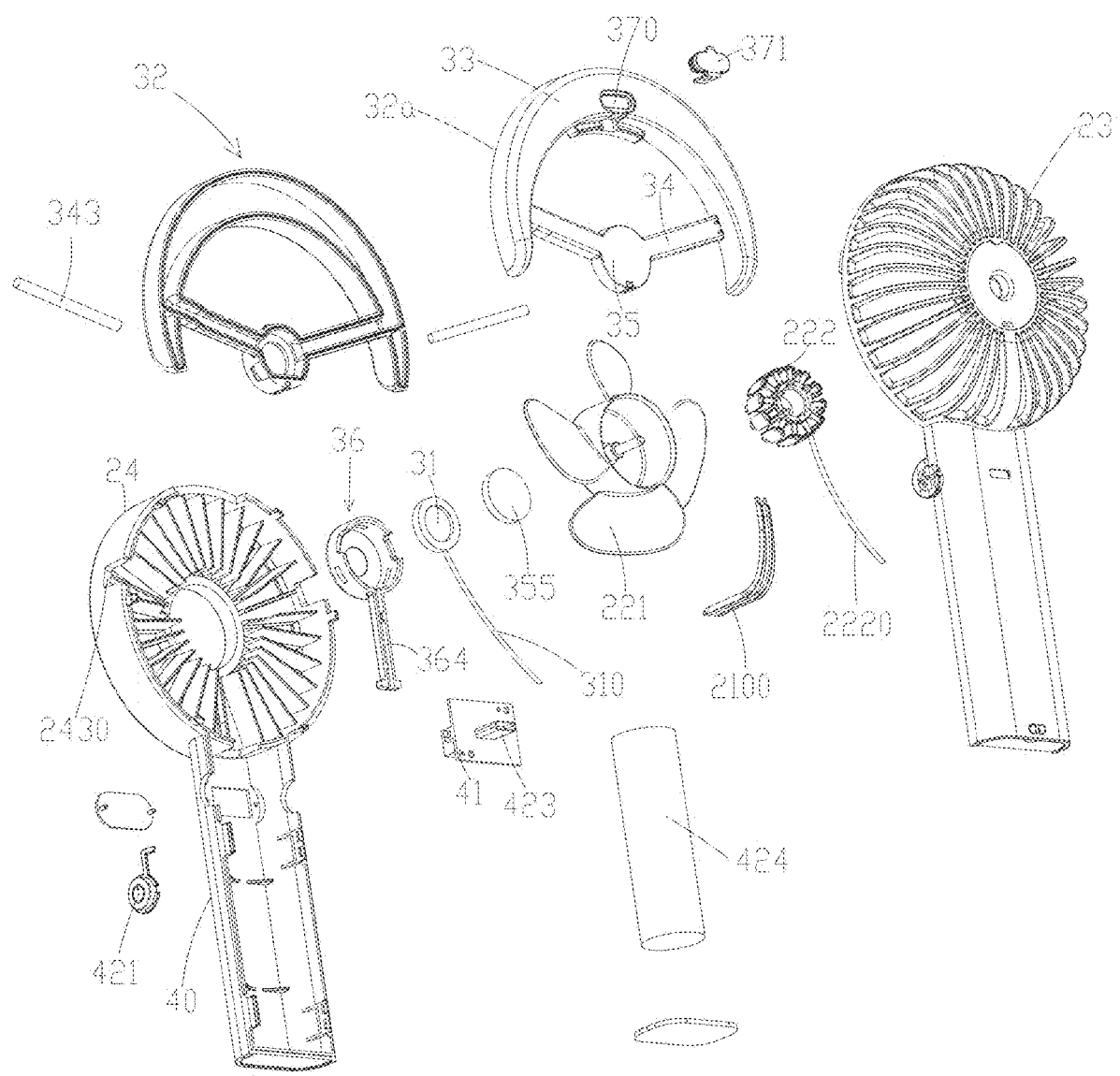
FIG. 21 is an exploded view of a misting fan according to a third embodiment of the present invention from another perspective.
Figure 22:
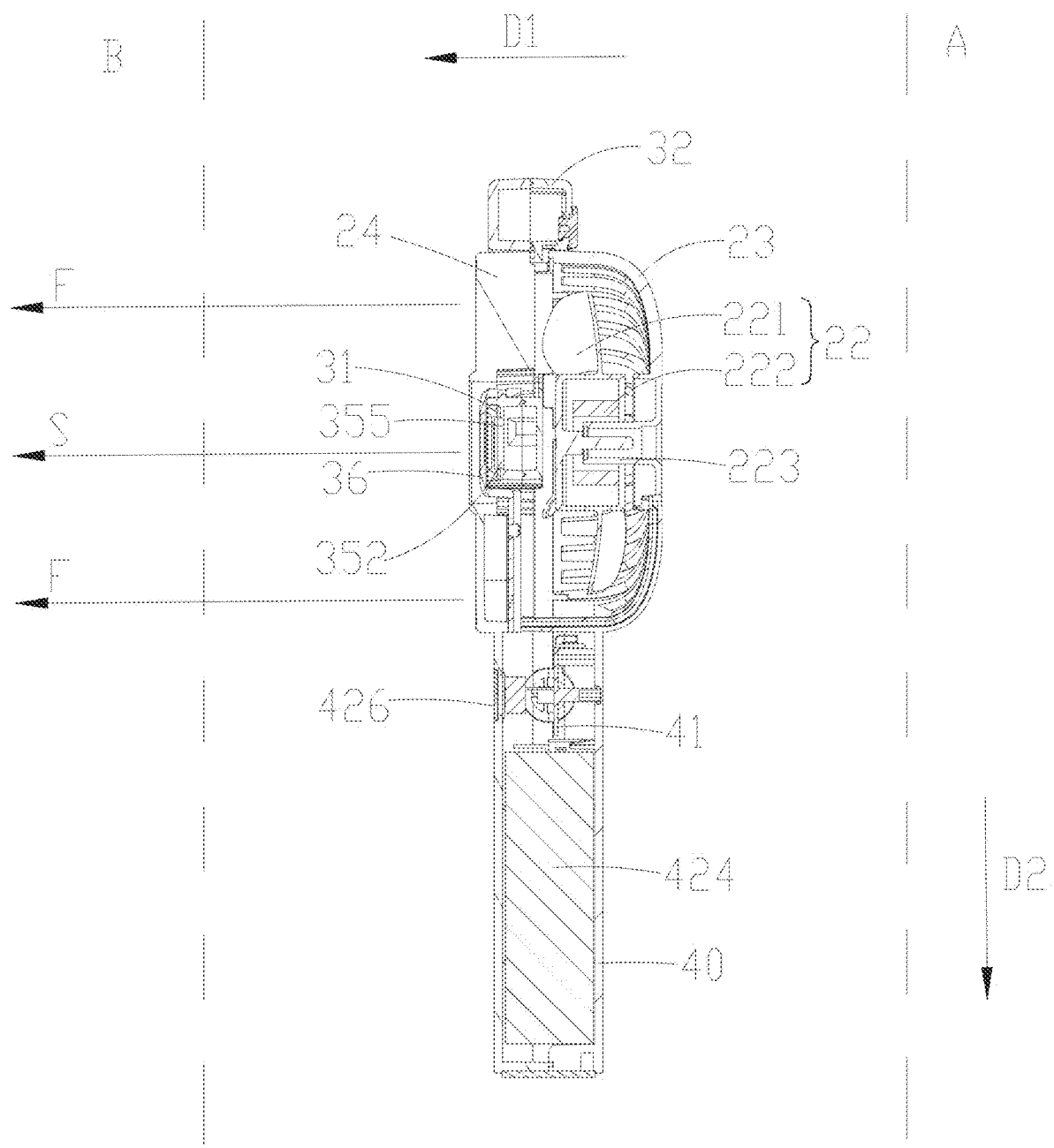
FIG. 22 is a sectional view of a misting fan according to a third embodiment of the present invention.
Figure 23:
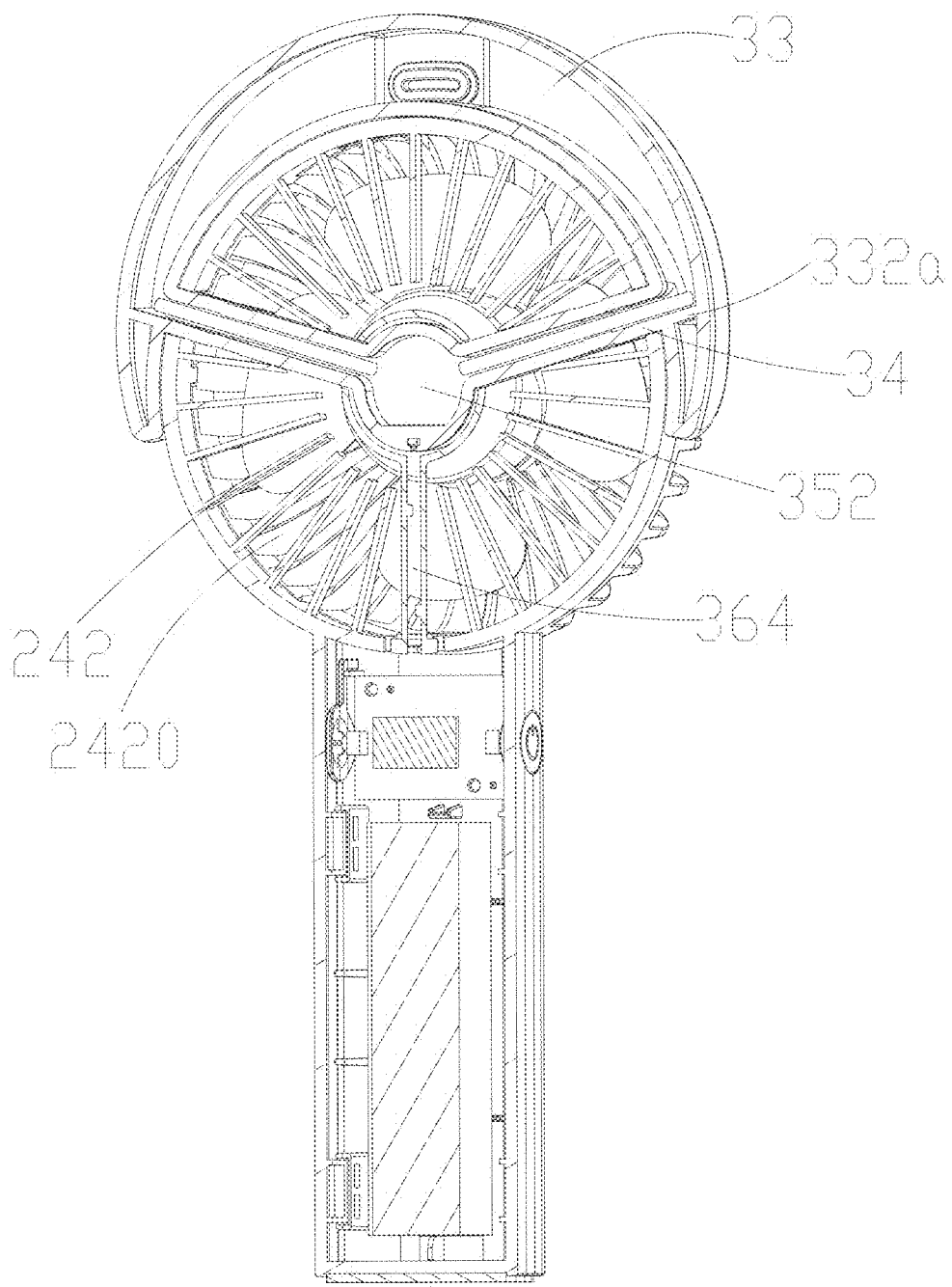
FIG. 23 is a sectional view of a misting fan according to a third embodiment of the present invention from another perspective.
Figure 24:
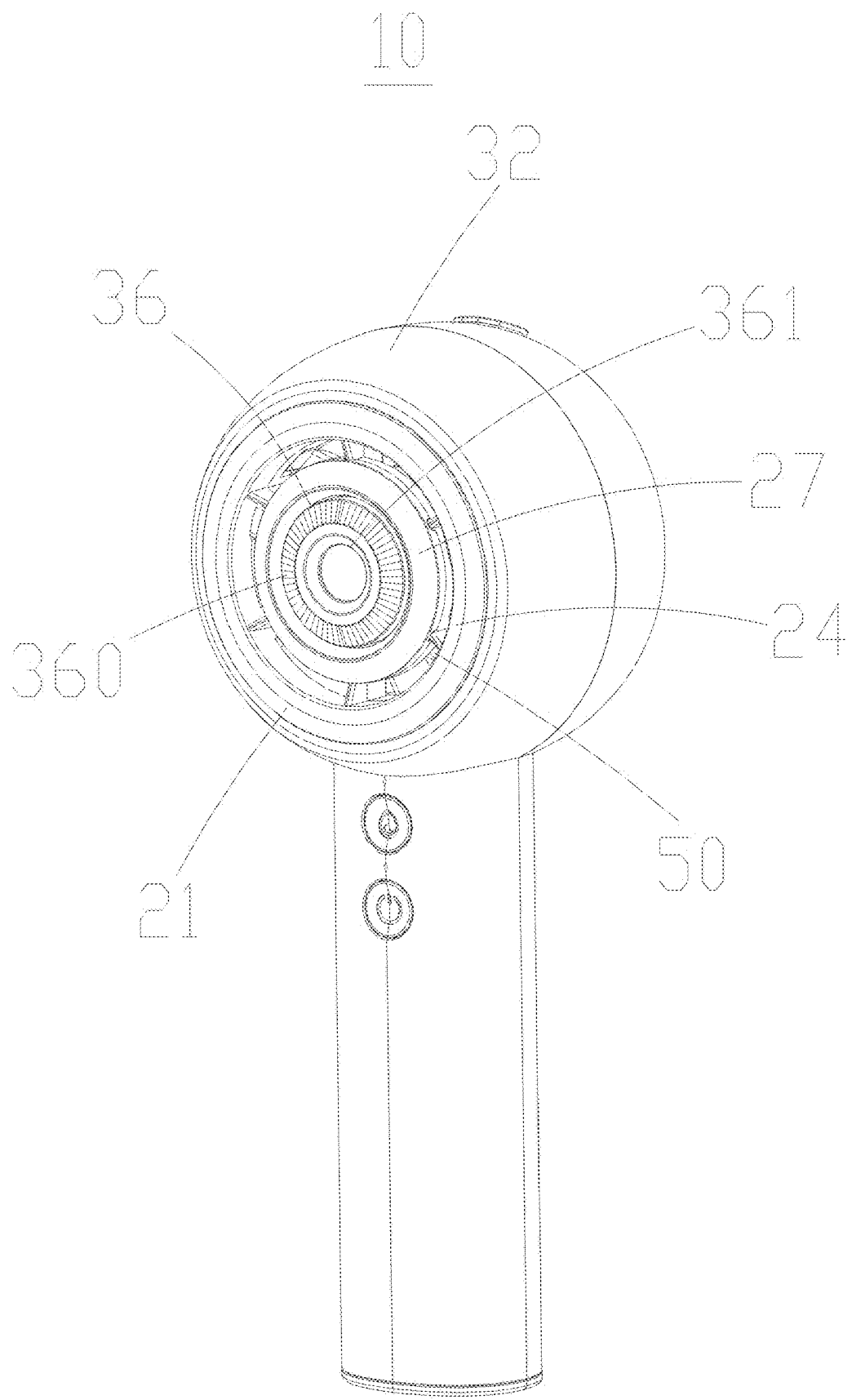
FIG. 24 is a three-dimensional diagram of a misting fan according to a fourth embodiment of the present invention.
Figure 25:
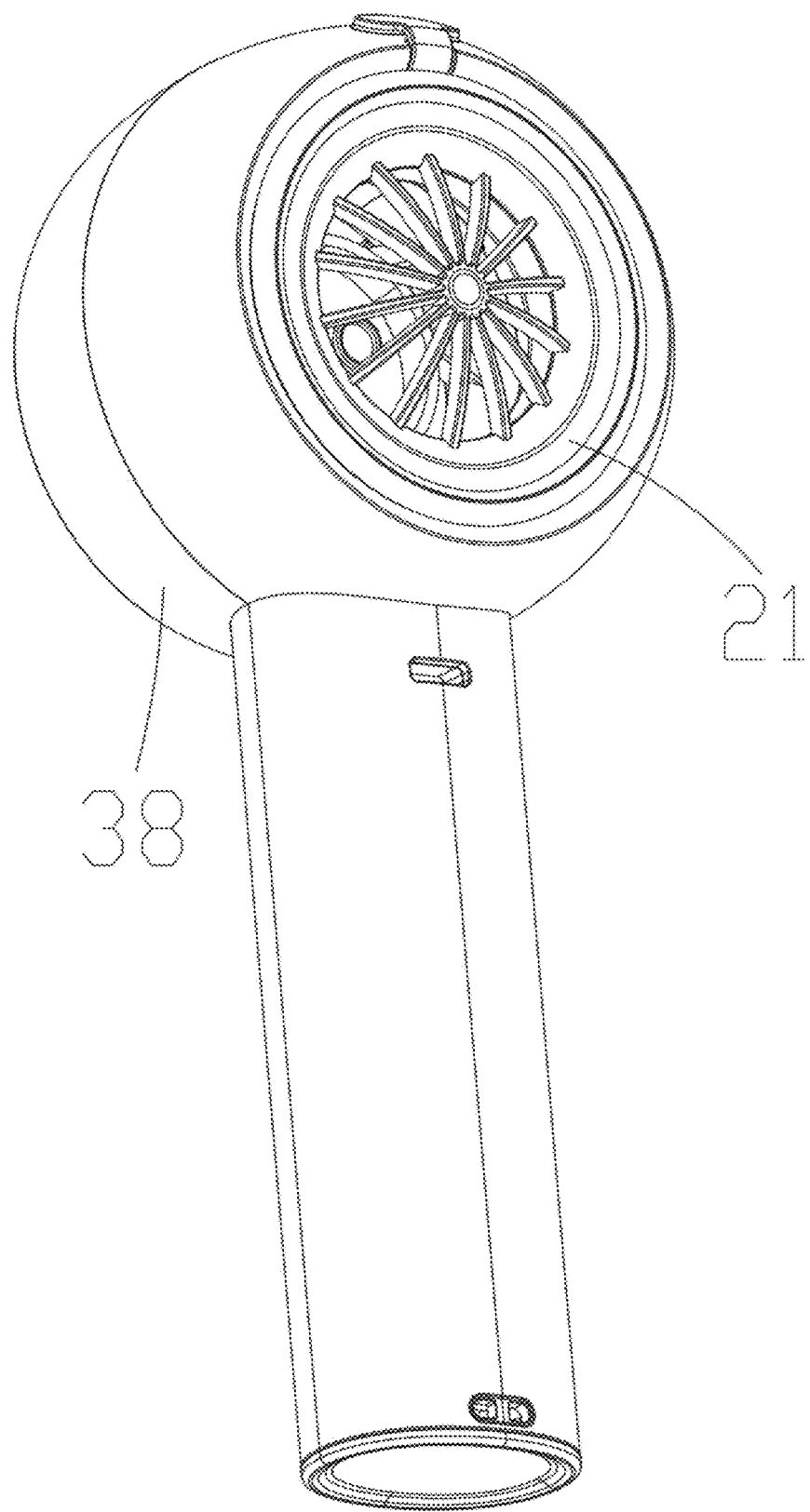
FIG. 25 is a three-dimensional diagram of a misting fan according to a fourth embodiment of the present invention from another perspective.
Figure 26:
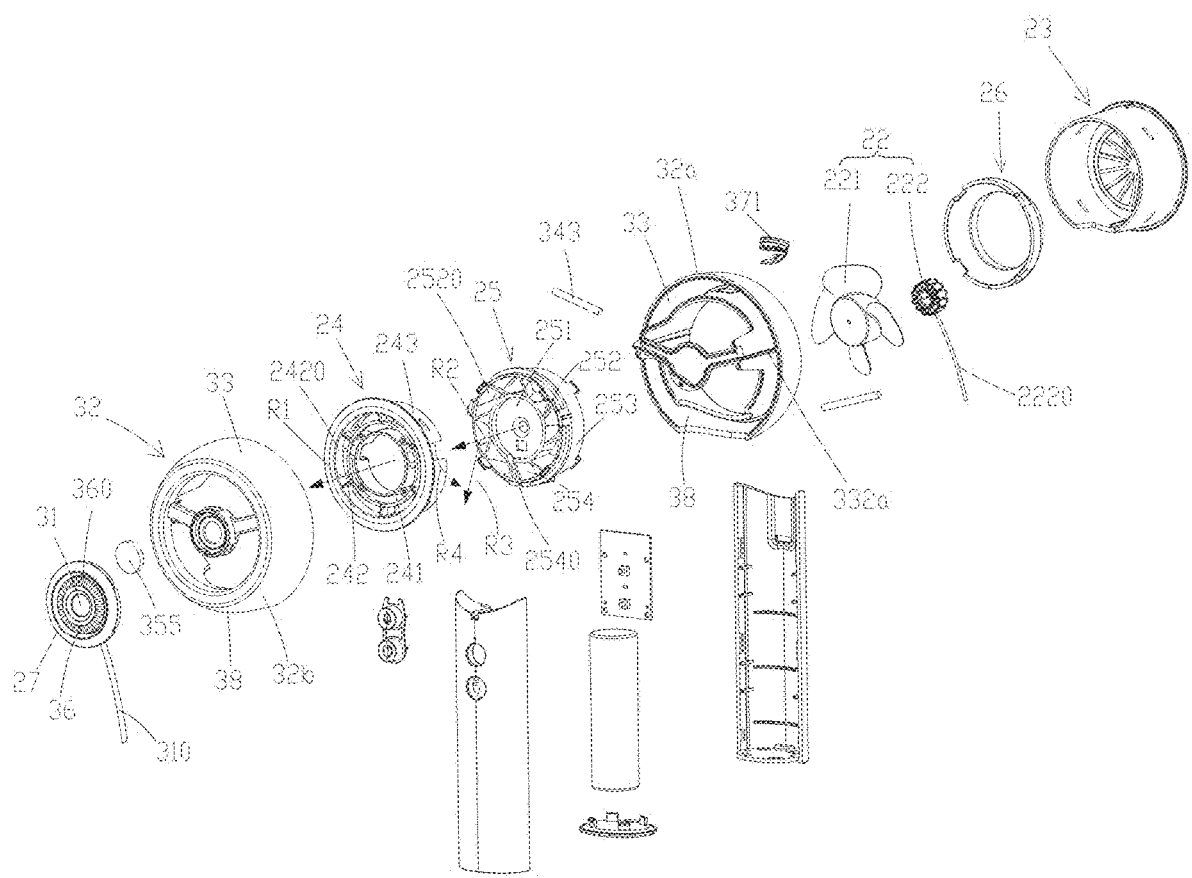
FIG. 26 is an exploded view of a misting fan according to a fourth embodiment of the present invention.
Figure 27:
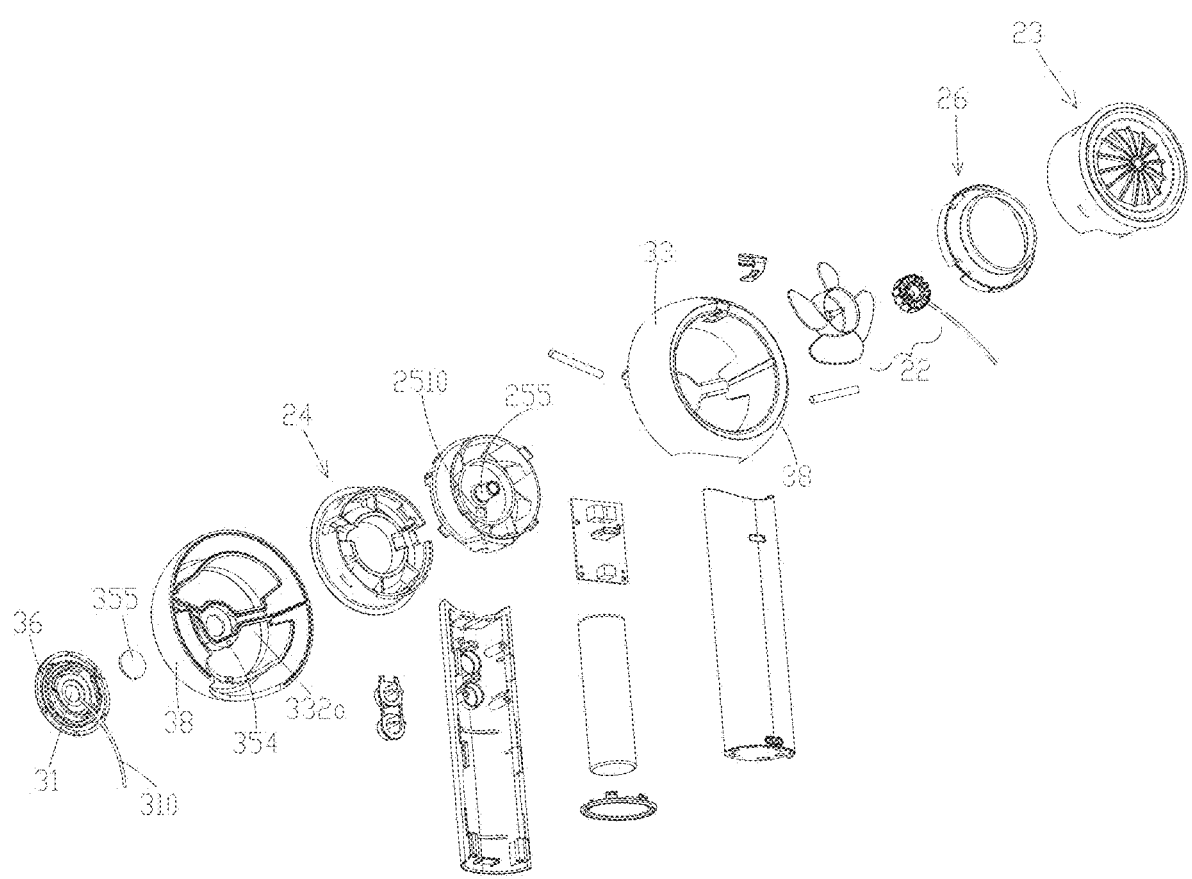
FIG. 27 is an exploded view of a misting fan according to a fourth embodiment of the present invention from another perspective.
Figure 28:
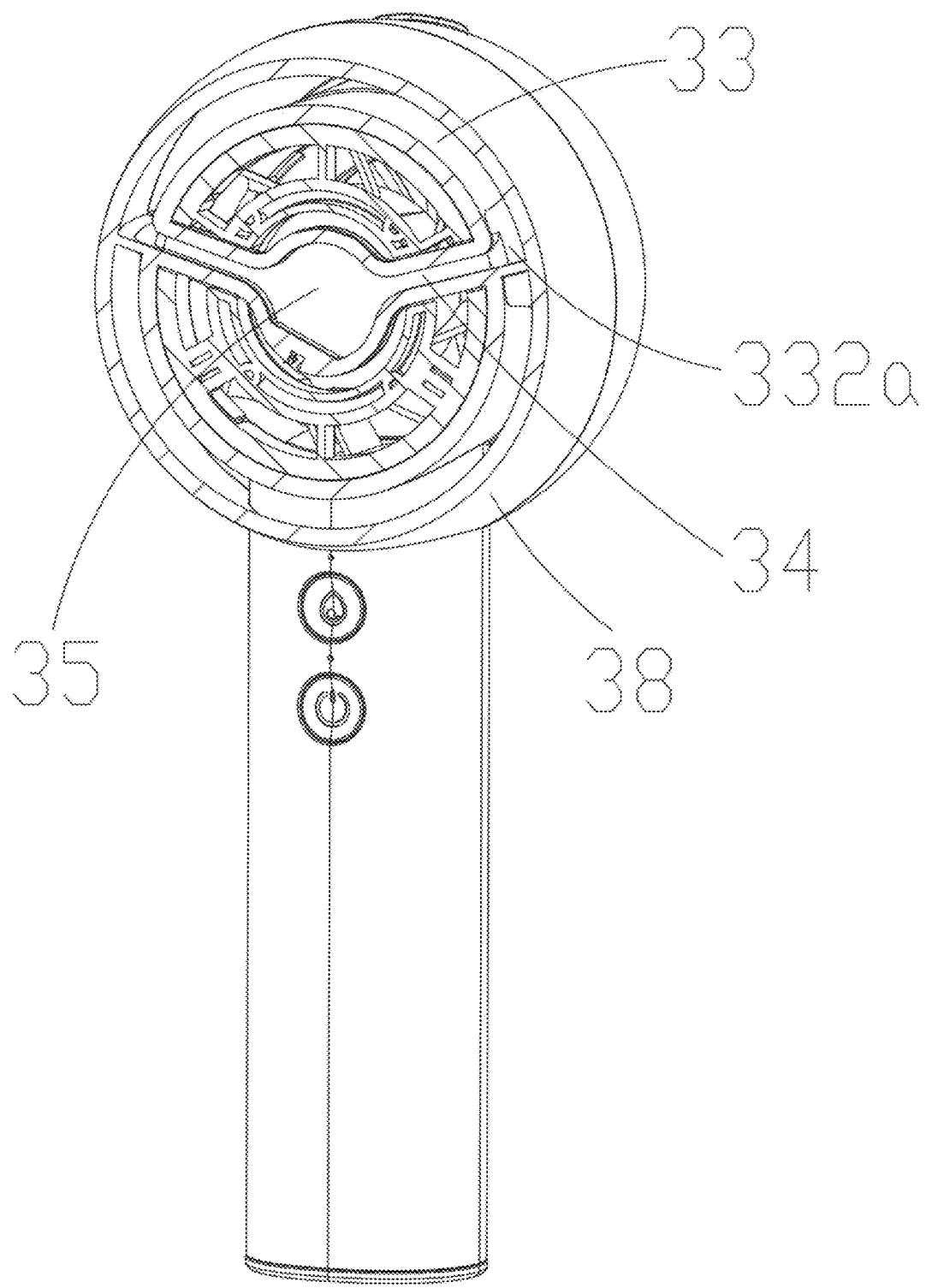
FIG. 28 is a sectional view of a misting fan according to a fourth embodiment of the present invention.
Figure 29:
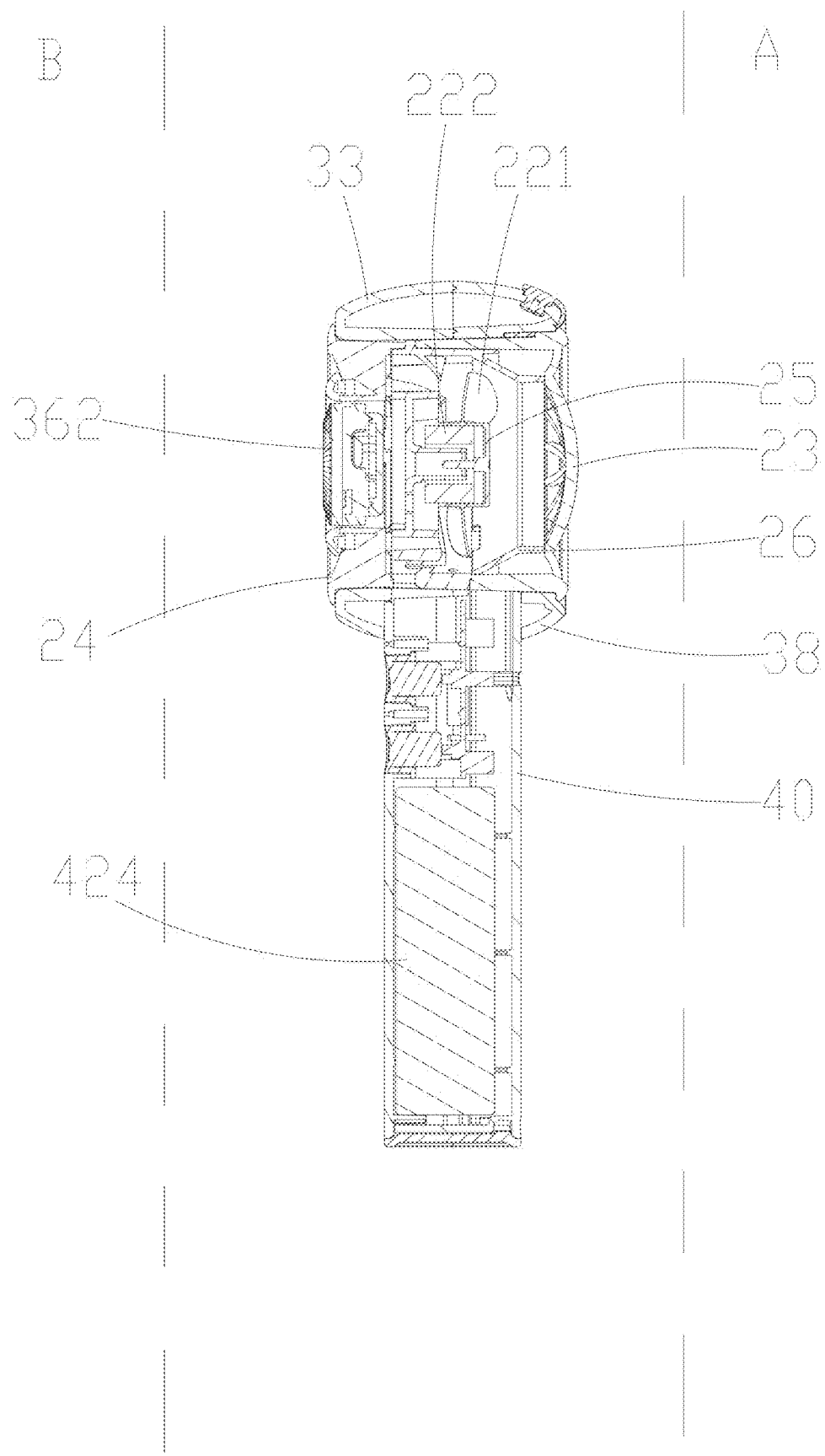
FIG. 29 is a sectional view of a misting fan according to a fourth embodiment of the present invention from another perspective.

Please referring to FIG. 9, the sealing plug 371 includes a sealing plug main body 372 arranged at the water injection port 370, and a connector 373 for connecting the sealing plug main body 372. One end, away from the sealing plug main body 372, of the connector 373 is sandwiched between the fan housing 21 (i.e., the outer frame 243 of the air outlet guard 24) and the water tank 32, the fan housing 21 or the water tank 32 is provided with a first fixing portion 374, one end, away from the sealing plug main body 372, of the connector 373 is provided with a second fixing portion 375, and the first fixing portion 374 and the second fixing portion 375 are fixedly connected to fasten the connector 373 between the fan housing 21 and the water tank 21. The sealing plug 371 is made of a flexible material, and the flexible material includes silicone or rubber. In this embodiment, one of the first fixing portion 374 and the second fixing portion 375 is a fixing post, the other of the first fixing portion 374 and the second fixing portion 375 is a fixing hole, and the fixing hole is sleeved on the fixing post. The sealing plug main body 372 includes a base plate 3711, a connecting portion 3712 connected to one side of the base plate 3711, and a sealing end 3713 for connecting one side, away from the base plate 3711, of the connecting portion 3712. Outer diameters of the sealing end 3713 and the base plate 3711 are greater than an outer diameter of the connecting portion 3712 and an outer diameter of the water injection port 370. The sealing end 3713 can deform to extend into the water tank 32 through the water injection port 370, the connecting portion 3712 is arranged in the water injection port 370, the sealing end 3713 and the base plate 3711 are configured to clamp the water tank 32 at an inner side and an outer side of the water tank 32, thereby sealing the water injection port 370. The sealing plug main body 372 further includes an extension portion 3715 connected to one side of the base plate 3711, and the extension portion 3714 is used for a user to fetch, so that the sealing plug main body 372 can be detached from the water injection port 370. Further, the water tank 32 is further provided with a first accommodating groove 372a adjacent to the water injection port 370, and the first accommodating groove 372a is configured to store and fasten the base plate 3711. The main tank body 33 of the water tank 32 is further provided with a second accommodating groove 373a, the second accommodating groove 373a is configured to store and fasten one end, away from the sealing plug main body 372, of the connector 373, and the first fixing portion 374 is arranged at the bottom of the second accommodating groove 373a.

Second Embodiment

Please referring to FIG. 10 to FIG. 17, a second embodiment of the present invention also provides a misting fan 10, and the misting fan 10 is also a handheld misting fan. It may be understood that parts of the misting fan in the second embodiment that have essentially the same structure as those of the misting fan of the first embodiment may not be described in detail in the second embodiment, but the description of the basically the same structure of the two embodiments in the first embodiment can be essentially appliable to the second embodiment.

The misting fan 10 includes a housing assembly 10a, a fan blade assembly 22, and a misting assembly 30. The housing assembly 10a is provided with a handheld housing 40, an air passage located at one end of the handheld housing 40, and an air outlet guard 24 arranged at one end of the air passage. It may be understood that one end of the handheld housing 40 is connected to the fan housing 21, and the fan housing 21 encloses an air passage and includes an air inlet guard 23 and an air outlet guard 24. The air outlet guard 24 is provided with a mist outlet hole 2410, and multiple air outlet holes 2420 annularly arranged at a periphery of the mist outlet hole 2410. The fan blade assembly 22 is mounted in the air passage. The misting assembly 30 includes a water tank 32, a water delivery pipeline 34, an atomizing portion 35, a fiber liquid guide strip 343, and an atomizing member 31. The water tank 32 is arranged at the housing assembly 10a, the water delivery pipeline 34 is connected between the water tank 32 and the atomizing portion 34, the atomizing portion 35 is located at the mist outlet hole 2410, and the atomizing member 31 is mounted at the atomizing portion 35 and exposed outside through the mist outlet hole 2410.

The fiber liquid guide strip 343 is mounted in the water delivery pipeline 34, one end of the fiber liquid guide strip 343 extends into the water tank 32, and the other end of the fiber liquid guide strip 343 extends to an atomizing sheet.

Specifically, during use, a fan apparatus blows air in the fan, and meanwhile, water in the water tank 32 is transported into the atomizing part 35 along the fiber liquid guide strip 343 in the water delivery pipeline 34, and then the water in the atomizing portion 35 is atomized by the atomizing sheet, and then mist spray is sprayed out through the mist outlet hole 2410. In this way, the mist outlet hole 2410 is in the middle of the multiple air outlet holes 2420, so the mist spray is in the middle of the airflow blown by the fan assembly 20, and the sprayed water mist will not be blown away. In addition, the fiber liquid guide strip 343 can stably transport the water to the atomizing sheet, so the spray interruption can be avoided, and stability of the spray mist is better.

According to the technical solution of the present invention, a housing assembly 10a, a fan assembly 20 and a misting assembly 30 are disposed. The housing assembly 10a is provided with a hand-held housing 40 and an air passage at one end of the hand-held housing 40, the fan assembly 20 is mounted in the air passage, and one end of the air passage is further provided with an air outlet guard 24. The air outlet guard 24 is provided with a mist outlet hole 2410, and multiple air outlet holes 2420 annularly arranged about the mist outlet hole 2410. The misting assembly 30 includes a water tank 32, at least one water delivery pipeline 34, an atomizing portion 35, a fiber liquid guide strip 343 and an atomizing sheet. The water tank 32 is arranged in the housing assembly 10a, and the water delivery pipeline 34 is connected between the water tank 32 and the atomizing portion 35. The atomizing portion 35 is located at the mist outlet hole 2410, the atomizing sheet is mounted at the atomizing portion 35 and exposed through the mist outlet hole 2410. The fiber liquid guide strip 343 is mounted in the water delivery pipeline 34, one end of the fiber liquid guide strip 343 extends into the water tank 32, and the other end of the fiber liquid guide strip 343 extends to the atomizing member 31. In this way, even if the water delivery pipeline 34 is narrow, the fiber liquid guide strip 343 can continuously guide the water in the water tank 32 to the atomizing member 31 in the atomizing portion 35, and the spray interruption can be avoided during the spraying of the atomizing member 31. Moreover, the atomizing portion 35 is located at the mist outlet hole 2410, and the mist outlet hole 2410 is in the middle of the multiple air outlet holes 2420. In this way, the mist spray is in the middle of the fan assembly 20. Compared with a situation that the mist spraying position is located above or below the airflow, the mist spray will not be blown to deviate, and can be better integrated with the airflow, making the stability better.

As above, the housing assembly 10a includes a fan housing 21 and a handheld housing 40. The fan housing 21 is mounted at one end of the handheld housing 40, and provided with an air passage. The water tank 32 is arranged at one side, away from the handheld housing 40, of the fan housing 21. Specifically, the water tank 32 is arranged at a position of the fan housing 21 and located at one side away from the handheld housing 40, which can prevent the water tank 32 from being installed on the handheld housing 40, which would make the handheld housing too bulky and inconvenient for a user to hold. When air bubbles are generated in the atomizing portion 35, the air bubbles close to the fiber liquid guide strip will be absorbed by the fiber liquid guide strip 343 and float to an upper end of the fiber liquid guide strip 343 along the fiber liquid guide strip 343, so that unsmooth water flow caused by accumulation of air bubbles at the atomizing portion 35 and the water delivery pipeline 34 can be avoided.

In some embodiments, the fan housing 21 is arranged in a circular shape, the water tank 32 is arc-shaped, and is adaptively mounted at one side, away from the handheld housing 40, of the fan housing 21. Specifically, the air outlet guard 24 and the water tank 32 are both arc-shaped and in cooperation with each other. Compared with a conventional water tank 32, the water tank 32 can be prevented from protruding from an outer side of the air outlet guard 24.

In some embodiments, the number of the at least one water delivery pipeline 34 is two, which are arranged on both sides of the atomizing portion 35, respectively. One water delivery pipeline 34 is configured to communicate the atomizing portion 35 and one end of the water tank 32, and the other of the water delivery pipelines 34 is configured to communicate the atomizing portion 35 and the other end of the water tank 32. Specifically, the two water delivery pipes 34 are both provided with fiber liquid guide strips 343 to transport the water in the water tank 32 to the atomizing part 31, so that the water guide is faster, and the water guide efficiency is higher.

It may be understood that one side (e.g., an outer frame 243 of the air outlet guard 24), away from the handheld housing 40, of the fan housing 21 may be provided with a mounting groove 211, and the water tank 32 is at least partially arranged in the mounting groove 211. Specifically, the water tank 32 is partially arranged in the mounting groove 211, making a part of the water tank 32 protruding from the fan housing 21 small. Moreover, the water tank 32 is limited by the air outlet guard 24, which can prevent the water tank 32 from shaking during use, and makes the structure of the water tank 32 firmer. In this way, the use of the handheld misting fan is more stable.

As above, the fan housing 21 includes an air outlet guard 24, and an air inlet guard 23. A rear side of the air outlet guard 24 is provided with an avoidance opening 2430, one side, away from the handheld housing 40, of the air outlet guard 24 is provided with a mounting groove 211, the water tank 32 is arranged in the mounting groove 211, and the water delivery pipeline 34 extends into the air outlet guard 24 through the avoidance opening 2430. The air inlet guard 23 is mounted on the rear side of the air outlet guard 24 to cover the avoidance opening 2430 and the rear side of the mounting groove 211. Specifically, the water tank 32 and the water delivery pipeline 34 can be placed between the air outlet guard 24 and the air inlet guard 23, and then the air outlet guard 24 and the air inlet guard 23 are mounted together, and the water delivery pipeline 34 extends into the avoidance opening 2430. The air inlet guard 23 and the mounting groove 211 form the installation groove 211, and the water tank 32 is arranged in the mounting groove 211. In this way, the air outlet guard 24 and the air inlet guard 23 are simple in structure and convenient to form, and convenient to assemble.

In some embodiments, the fan housing 21 is rotatably mounted on the handheld housing 40. Specifically, the fan assembly 20 includes a motor, and a blade assembly. The motor is mounted in the air outlet guard 24, and the blade assembly is mounted on a rotating shaft of the motor. When the air outlet guard 24 rotates relative to the handheld housing 40, the motor and the blade assembly rotate together with the air outlet guard 24. Therefore, the airflow blown out by the blade assembly can rotate accordingly, a blowing pitch angle of the fan assembly 20 can be adjusted by rotating the air outlet guard 24, and the user can use the fan more conveniently. Specifically, the handheld housing 40 includes a handheld main body 40b, and an arc-shaped bracket portion 40c connected to the handheld main body 40b, both ends of the arc-shaped bracket portion 40a are rotatably connected to two opposite sides of the fan housing 21, respectively, so that the fan assembly 20 can be arranged in a storage space of the arc-shaped bracket portion 40c and rotate relative to the handheld housing 40 to adjust a pitch blowing angle of the fan assembly 21.

Specifically, the handheld housing 40 may include two mounting portions 411 arranged at one end of the handheld housing 40, the two mounting portions 411 are arranged spaced apart from each other, rotation portions 212 are disposed on two opposite sides of the fan housing 21, and the two rotation portions 212 are coaxially arranged. The fan housing 21 is located between the two mounting portions 411, and each mounting portion 411 is rotatably connected to one mounting portion 411 correspondingly. Specifically, the fan housing 21 is mounted on the two mounting portions 411 through the rotating portions 212 on both sides. Compared with a way of mounting the fan housing 21 with only one rotating portion 212 and one mounting portion 411, the fan housing 21 is more stable and has a stronger structure when rotating.

Further, the water tank 32 may include a first trough body 311 and a first cover plate 322, the water delivery pipeline 34 includes a second trough body 312 and a second cover plate 331, and the atomizing portion 35 includes a third trough body 321 and a third cover plate 332. The first trough body 311, the second trough body 312 and the third trough body 321 are integrally formed, and the second trough body 312 is connected between the first trough body 311 and the third trough body 321. The first cover plate 322, the second cover plate 331 and the third cover plate 332 are integrally formed, the first cover plate 322 is correspondingly mounted on the first trough body 311, the second cover plate 331 is correspondingly mounted on the second trough body 312, and the third cover plate 332 is correspondingly mounted on the third trough body 321.

Specifically, after integrally forming the first trough body 311, the second trough body 312 and the third trough body 321, and integrally forming the first cover plate 322, second cover plate 331 and third cover plate 332, the water tank 32, the water delivery pipeline 34 and the atomizing portion 35 can be formed by covering the first trough body 311, the second trough body 312 and the third trough body 321 with the first cover plate 322, the second cover plate 331 and the third cover plate 333. Moreover, the mounting of the fiber liquid guide strip 343 is convenient, and the mounting of the fiber liquid guide strip 343 can be completed by placing a limit water guide strip between the second trough body 312 and the second cover plate 331 and then mounting the second trough body 312 and the second cover plate 331.

In some embodiments, the water tank 32, the water delivery pipeline 34 and the atomizing portion 35 are connected into a whole. Specifically, the molding of the water tank 32, the water delivery pipeline 34 and the atomizing portion 35 is relatively simple, and the assembling of the handheld misting fan is relatively convenient.

Further, the misting assembly 30 further includes a water guide sheet 355, the water guide sheet 355 is arranged in the atomizing portion 35 and attached to a back surface of the atomizing member 31. Specifically, when the water tank 32 is located above the atomizing portion 35, a water pressure at the mist outlet hole 2410 is large. In this way, the water guide sheet 355 can prevent the water in the atomizing portion 35 from seeping out the mist outlet hole 2410. The water guide sheet 355 may be a cotton sheet.

It may be understood that the specific structures of the water tank 32, the water guide sheet 355, the fiber liquid guide strip 343, the atomizing member 31, the decorative cover 36 and the like of the misting assembly 30 in this embodiment are basically the same as those in the first embodiment, and the description thereof will not be repeated here.

Further, the handheld housing 40 is internally provided with a main circuit board 41, the fan blade assembly 22 and the atomizing member 32 are both electrically connected to the main circuit board 41. The handheld housing 40 is provided with a first key 421 and a second key 422 that are exposed outside, and the first key 421 and the second key 422 are both electrically connected to the main circuit board 41. The first key 421 is configured to control on/off and/or airflow volume of the fan blade assembly 22, and the second key 422 is configured to control the on/off of the atomizing member 31. Specifically, the user can respectively control the fan assembly 20 and the misting assembly 30 through the two keys, the fan assembly 20 can be independently started to blow air, or the misting assembly 30 can be independently started to spray mist, which makes the use of the user more conveniently.

Further, the handheld housing 40 is internally provided with a charging battery 424, the charging battery 424 is electrically connected to the main circuit board 41, the handheld housing 40 is provided with a port assembly 423 exposed outside, and the port assembly 423 is electrically connected to the main circuit board 41 and connected to an external power supply for charging. Specifically, the handheld misting fan can be repeatedly charged for use, and there is no need for the user to additionally purchase a battery for replacement.

Further, the water injection port 370 of the water tank 32 is provided with a detachable sealing plug. In this way, the sealing effect of the water tank 32 is good, and compared with a method of disposing a threaded cap at the water injection port 370, such a water injection port 370 can be opened and closed more conveniently. In addition, in other embodiments, the water injection port 370 of the water tank 32 may be provided with a threaded cap. The sealing plug has the basically same structure as the sealing plug 371 in the first embodiment, and will not be described in detail here.

Further, a rear side of the water delivery pipeline 34 is provided with a second wire channel 340. In this way, an electric connection line between the atomizing sheet and the main circuit board 41 can pass through the second wire channel 340, which can prevent the electric connection line from being directly exposed to the outer side of the water delivery pipeline 34 and interfering with the motor or blade assembly.

Further, the rotation portion 212 is internally provided with a wire passing hole 210, the wire passing hole 210 communicates the second wire channel 340 and the inside of the handheld housing 40. In this way, an electric connection wire between the atomization sheet and the main circuit board 41 can enter the handheld housing 40 after passing through the second wire channel 340, then is connected to the main circuit board 41.

In some embodiments, the handheld housing 40 may include a first housing and a second housing, the first housing is provided with a snap-fit fastener, the second housing is provided with a snap-fit groove, and the first housing and the second housing are detachably mounted through the snap-fit fastener and the snap-fit groove. Further, the first housing and the second housing are fastened by a bolt.

Further, the handheld housing may also be provided with at least one or more indicator lamps connected to the main circuit board 41. In this way, a remaining power of the battery 424 can be observed through bright and dark states of the multiple indicator lamps 425 or a color state of at least one indicator lamp 425.

Third Embodiment

Please referring to FIG. 18 to FIG. 23, the third embodiment of the present invention also provides a misting fan 10, and the misting fan 10 is also a handheld misting fan. It may be understood that parts of the misting fan 10 in the third embodiment that have essentially the same structure as those of the misting fans 10 in the first and second embodiment may not be described in detail in the third embodiment, but the descriptions in the first and second embodiments about basically the same structure as the third embodiment can be essentially appliable to the third embodiment.

In this embodiment, the misting fan 10 includes a fan assembly 20, a misting assembly 30, and a handheld housing 40. The fan assembly 20 includes a fan housing 21 and a fan blade assembly 22 arranged in the fan housing 21. The fan housing 21 includes an air inlet guard 23 located at an air inlet side A and an air outlet guard 24 located at an air outlet side B, the air outlet guard 24 includes a mist outlet portion 241 and multiple air outlet vanes 242 annularly connected around the mist outlet portion 241. The mist outlet portion 241 includes a mist outlet hole 2410, and multiple air outlet holes 2420 annularly arranged about the mist outlet hole 2410 are formed among the multiple air outlet vanes 242.

The atomizing assembly 30 includes an atomizing member 31, and a water tank k32. The atomizing member 31 is arranged in the fan housing 21 and corresponds to the mist outlet hole 2410. The water tank 32 includes a main tank body 33, at least one water delivery pipeline 34, and an atomizing portion 35. The at least one water delivery pipeline 34 communicates between the main tank body 33 and the atomizing portion 35, the atomizing portion 35 corresponds to the atomizing member 31, and the atomizing portion 35 and the atomizing member 31 are located between the fan blade assembly 22 and the air outlet guard 24, so that the fan blade assembly 22 can blow air from the air inlet side A to pass through a periphery of the atomizing portion 35 and a periphery of the atomizing member 31 and spray the air out through the multiple air outlet holes 2420. Liquid in the main tank body 33 can be provided to the atomizing member 31 through the at least one water delivery pipeline 34 and the atomizing portion 35, so that mist spray S formed by atomizing the liquid can be sprayed out from the mist outlet hole 2410 by the atomizing member 31, and outlet airflow F from the multiple air outlet holes is annularly arranged about the mist spray S.

In the misting fan 10 in an embodiment of the present invention, the mist spray S formed by atomizing the liquid can be sprayed out from the mist outlet hole 2410 by the atomizing member 31, the outlet airflow F of the multiple air outlet holes 2420 is annularly arranged about the mist spray, which makes the interference between the mist spray S of the misting fan 10 and the outlet airflow F relatively small, the air blowing and misting effects are both excellent, and the user experience is high.

At least one water delivery pipeline 34 is located at one side of the air outlet hole 2420. When viewed from an air outlet direction D1 of the air outlet hole 2420, a projection of the at least one water delivery pipeline 34 overlaps with that of at least one of the multiple air outlet holes 2420 or that of at least one of the air outlet vanes 242. In this embodiment, the misting fan 10 further includes at least one wind shield structure 50. When viewed from the air outlet direction D1, a projection of the at least one wind shield structure 50 overlaps with or is staggered from the projection of the at least one water delivery pipeline 34, and the at least one wind shield structure 50 is configured to balance the outlet airflow of the multiple air outlet holes disrupted by at least one water delivery pipeline 34, making the outlet airflow of the multiple air outlet holes basically uniformly arranged around the mist spray S. A direction of the mist spray S is basically along a central axis of the mist outlet hole 2410. Because the airflow F of the multiple air outlet holes 2420 is basically uniformly arranged around the mist spray S, the mist spray S can be basically sprayed out along the air outlet direction D1, which not only has a good spraying effect, but also can avoid a phenomenon of water accumulation on the water outlet guard 24 or an element in front of the atomizing member 31 (such as an outer surface of the decorative cover 36) caused by the deviation of the mist spray from the air outlet direction, making the user experience better.

It may be understood that when the number of the at least one water delivery pipeline 34 is multiple, and the multiple water delivery pipelines 34 are basically uniformly distributed in a circumferential direction of the air outlet guard 24, the number of the at least one wind shield structure 50 may be the same as that of the at least one water delivery pipeline 34, and the projection of the wind shield structure overlaps with that of the water delivery pipe, thereby achieving the effect of balancing the outlet airflow of the multiple air outlet holes 2420.

It may be understood that when the number of at least one water delivery pipeline 34 is one or more, and the water delivery pipelines are unevenly distributed in a circumferential direction of the air outlet guard 24, the number of at least one wind shield structure 50 may be the same as or different from the number of at least one water delivery pipeline 34, but the projections of the wind shield structure and the water delivery pipeline are staggered. In addition, the at least one wind shield structure 50 and the at least one water delivery pipeline 34 are generally uniformly distributed in the circumferential direction of the air outlet guard 24, thereby achieving the effect of balancing the outlet airflow of the multiple air outlet holes 2420.

Specifically, the main tank body 33 is located above the fan housing 21, and the at least one water delivery pipeline 34 is located at an upper half side of the fan housing 21 in a direction of gravity D2. The foregoing arrangement can enable the liquid in the main tank body 33 to flow into the atomizing portion 35 through the at least one water delivery pipeline 34 under the action of gravity. At least one wind shield structure 50 includes a first wind shield structure 51, and the first wind shield structure 51 is located at a lower half side of the fan housing 21 in the direction of gravity D2.

Further, at least one inner wall 332a, close to one end of the at least one water delivery pipeline 34, of the main tank body 33 is higher than or equal to one end, connected to the main tank body 33, of the at least one water delivery pipeline 34 in the direction of gravity D2, one end, connected to the main tank body 33, of the at least one water delivery pipeline 34 is higher than or equal to one end, connected to the atomizing portion 35, of the at least one water delivery pipeline 34 in the direction of gravity D2, so that the liquid in the main tank body 33 can flow into the atomizing portion 35 through the at least one water delivery pipeline 34 under the action of gravity.

In this embodiment, the at least one water delivery pipeline 34 includes a first water delivery pipeline 341 and a second water delivery pipeline 342. The main tank body 33 includes an arc-shaped structure with a cavity, the first water delivery pipeline 341 communicates between one end of the main tank body 33 and the atomizing portion 35, and the second water delivery pipeline 342 communicates between the other end of the main tank body 33 and the atomizing portion 35. In a direction from the fan blade assembly 22 to the air outlet guard 24 (i.e., an air outlet direction D1), the water tank 32 composed of the main tank body 33, the first water delivery pipeline 341, the second water delivery pipeline 342 and the atomizing portion 35 is divided into a first part of housing 32a facing the fan blade assembly 22, and a second part of housing 32b facing the air outlet guard 24, the first part of housing 32a and the second part of housing 32b are hermetically connected into a whole, and the second part of housing 32b includes an atomizing hole 351 formed in the atomizing portion 35. The atomizing member 35 is arranged in a mounting groove 352 in the atomizing portion 34, the mist spray S is sprayed out through the atomizing hole 351 and the mist outlet hole 2410, or the atomizing member 31 is located outside the atomizing portion 35 and corresponds to the atomizing hole 351, thereby atomizing the liquid in the water tank 32 into the mist spray S through the atomizing hole 351, and spraying out the mist spray S through the mist outlet hole 2410. The air outlet guard 24 further includes an outer frame 243 for annularly connecting peripheries of the multiple air outlet vanes. The outer frame 243 is provided with an avoidance opening 2430 at a position corresponding to the at least one water delivery pipeline 34, one end, connected to the main tank body 22, of the at least one water delivery pipeline 34 is inserted into the avoidance opening 2430, and the at least one wind shield structure 50 is arranged at the air outlet guard 24 and connected between the mist outlet portion 241 and the outer frame 243.

Specifically, in this embodiment, at least one wind shield structure 50 includes a first wind shield structure 51, a second wind shield structure 52, and a third wind shield structure 53. When viewed from the air outlet direction D1, the first wind shield structure 51 and the second wind shield structure 52 correspond to the first water delivery pipeline 341 and the second water delivery pipeline 342, respectively. When viewed from a circumferential direction of the air outlet guard 24, a circumferential distance W1 between the third wind shield structure 53 and the first wind shield structure 51 is equal to a circumferential distance W2 between the third wind shield structure 53 and the second wind shield structure 52, and a width H1 of the third wind shield structure 53 is greater than or equal to a width H2 of the first wind shield structure 51 and a width H2 of the second wind shield structure 52. Further, an extension direction of the third wind shield structure 53 may be approximately along the direction of gravity D2. Through the foregoing three wind shield structures 51, 52, and 53, the airflow F of the multiple air outlet holes 2420 can be balanced, especially, the width H1 of the third wind shield structure 53 is greater than or equal to the width H2 of the first wind shield structure 51 and the width of the second wind shield structure 52, which can make the balance effect better.

It may be understood that each wind shield structure 51, 52 or 53 may include a wind shield 50a, the wind shield 50a may be connected between two adjacent air outlet vanes 242, and the wind shield plate 50a and the two adjacent air outlet vanes 242 may form a groove structure facing outward to achieve a concealed effect and enhance the aesthetic appearance of the air outlet guard 24. In this embodiment, when the width of the third wind shield structure 53 is large, the third wind shield structure 53 may further include two wind shields 50a and a convex structure 50b connected to the two wind shields 50a, which can achieve a concealed effect and enhance the aesthetic appearance of the air outlet guard 24.

In this embodiment, the atomizing member 31 is located outside the atomizing portion 35, a surface, close to the air outlet guard 24, of the atomizing portion 35 is provided with a mounting groove 353, and the atomizing member 31 is located in the mounting groove 353. The atomizing portion 35 is further provided with a first wire slot 354 communicating with the mounting groove 353, and a wire 310 of the atomizing member 31 extends out through the first wire slot 354. The misting assembly 30 also includes a decorative cover 36, which is mounted on one side, close to the air outlet guard 24, of the atomizing member 31, and the decorative cover 36 is in snap-fit with the atomizing portion 35. The decorative cover 36 includes a main body portion 362 with an opening 361. The main body portion 362 is mounted on one side, close to the air outlet guard 24, of the atomizing member 31 and is in snap-fit with the atomizing portion 35. The mist spray of the atomizing member 31 is sprayed out through the opening 361.

Further, the decorative cover 36 further includes a wiring portion 363 connected to the main body portion 362, one side, away from the air outlet side, of the wiring portion 363 is provided with a second wire channel 364, and a wire 310 of the atomizing member 31 extends out through the first wire slot and the second wire channel 363 in turn.

In this embodiment, the inner inlet guard 23 includes a mounting portion 231, multiple air inlet vanes 232 annularly connected about the mounting portion 231, and a frame body 234 connected to peripheries of the multiple air inlet vanes 232. One side, close to the air outlet guard 24, of the mounting portion 231 is provided with a mounting structure 233, and the fan blade assembly 22 is fastened to the air inlet guard 23 through the mounting structure 233. The fan blade assembly 22 includes a motor 222 and a blade assembly 221. The motor 222 is mounted on the mounting structure 223 and connected to the blade assembly 221, an inner surface of at least one of the multiple air inlet vanes 232 is provided with a second wire channel 2320, and a wire 2220 of the motor 222 extends out through the second wire channel 2320. The fan housing 21 may further include a wiring cover 2100, which is mounted on the second wire channel 2320.

As in the first embodiment and the second embodiment, the misting assembly 30 may also include a water guide sheet 355 and a fiber liquid guide strip 343. The water guide sheet 355 is disposed on a liquid inlet side of the atomizing member 31 and configured to guide the liquid of the atomizing portion 35 into the atomizing member 31. The at least one fiber liquid guide strip 343 is arranged in the at least one water delivery pipeline 34. One end of the fiber liquid guide strip 343 extends to the main tank body 33, and the other end of the fiber liquid guide strip 343 extends to the atomizing portion 35 for guiding the liquid in the main tank body 33 to the atomizing portion 35.

The water tank 32 is further provided with a water injection port 370. The misting assembly 30 further includes a sealing plug 371 that is at least partially detachably arranged at the water inject portion 370. A specific structure of the sealing plug 371 is basically the same as that of the sealing plug 371 in the first embodiment, and will not be described in detail here. Further, a sealing end 3713 may be provided with a groove 3714, the groove 3714 can extend into the connecting portion 3712 from a surface, away from the connecting portion 3712, of the sealing end 3713, and the groove 3714 is convenient for the sealing end 3713 to deform to extend into the water tank 32 from the water injection port 370.

In this embodiment, the misting fan 10 further includes a main circuit board 41 and a battery 424 arranged in the handheld housing 40, at least one key 421 or 422 arranged in at least one key hole of the handheld housing 40, and a port assembly 423 arranged in a charging aperture of the handheld housing 40. The at least one key 421 or 422, the battery 424, a wire 310 of the atomizing member 31, a wire 2220 of the fan blade assembly 22 and the port assembly 423 are all electrically connected to the main circuit board 41. At least one key includes a first key 421 and a second key 422. The first key 421 is configured to control on/off of the fan blade assembly 22 and/or airflow volume, and the second key 422 is configured to control the on/off of the atomizing member 31.

The misting fan 10 further includes a display screen 426, the display screen 426 is mounted to correspond to a display opening of the handheld housing 40, the display screen 426 is electrically connected to the main circuit board 41, and the display screen 426 is configured to display an operating state of the misting fan 10, such as fan speed setting of the misting fan and/or electric quantity of the battery 424. This helps improve the user experience.

Fourth Embodiment

Please referring to FIG. 24 to FIG. 31, the fourth embodiment of the present invention also provides a misting fan 10, and the misting fan 10 is also a handheld misting fan. It may be understood that parts of the misting fan 10 in the fourth embodiment that have essentially the same structure as those of the misting fans 10 in the first to third embodiment may not be described in detail in the fourth embodiment, but the descriptions in the first to third embodiments about essentially the same structure as the fourth embodiment can be essentially appliable to the fourth embodiment. The following mainly introduces the key parts of the misting fan 10 in the fourth embodiment or the differences from the misting fans 10 in the first to third embodiments.

In the fourth embodiment, in the misting fan 10, a fan housing 21 is different from that in each of the first to third embodiments. Specifically, in addition to the air inlet guard 23 and the air outlet guard 24, the fan housing 21 further includes an inner guard body 25. The inner guard body 25 includes an inner frame 253 corresponding to the outer frame 243, multiple inner vanes 252 corresponding to multiple air outlet vanes 242, and an inner plate portion 251 corresponding to the mist outlet portion 241. The multiple inner vanes 252 are connected between the inner plate portion 251 and the inner frame 253, the water tank 32 is arranged between the air outlet guard 24 and the inner guard body 25. The inner guard body 25 further includes a wiring portion 254 connected between the inner plate portion 251 and the inner frame 253. One side, close to the air outlet guard 24, of the wiring portion 254 is provided with a second wire channel 2540, and a wire 310 of the atomizing member 31 extends out through the first wire slot 354 and the second wire channel 2540 in turn.

The inner guard body 25 further includes a mounting structure 255 arranged at one side, away from the air outlet guard 24, of the inner plate portion 251. The fan blade assembly 22 is fastened to the inner guard body 25 through the mounting structure 255. The fan blade assembly 22 includes a motor 222, and a blade assembly 221. The motor 222 is mounted on the mounting structure 255 and connected to the blade assembly 221. The inner plate portion 251 is provided with a wire hole 2510, and a wire 2220 of the motor 222 extends out through the wire hole 2510, the first wire slot 354 and the second wire channel 2540.

The water tank 32 further includes a decorative tank body 38, the decorative tank body 38 is arranged below the fan housing 21, and both ends of the decorative tank body 38 are connected to both ends of the main tank body 33 to form an annular structure arranged around the fan housing 21. At least one inner wall 332a includes two inner walls 332a, and the two inner walls 332a are located on both ends of the main tank body 33 and both ends of the decorative tank body 38, respectively. Each inner wall 332a is located between the cavity of the main tank body 33 and a cavity of the decorative tank body 38, and configured to separate the cavity of the main tank body 33 from the cavity of the decorative tank body 38. The fan housing 21 further includes an air guide housing 26, the air guide housing 26 is arranged between the air inlet guard 23 and the fan blade assembly 22, and an inner diameter of the air guide housing 26 gradually increases from the air inlet side A to the air outlet side B, and the air guide housing 26 is configured to guide the air from the air inlet guard 23 into the fan blade assembly 22.

In this embodiment, at least one wind shield structure 50 includes a first wind shield structure 51 and a second wind shield structure 52. When viewed from an air outlet direction, the first wind shield structure 51 and the second wind shield structure 52 are located at a lower half side of the fan housing 21 in the direction of gravity D2. The first wind shield structure 51 and the second wind shield structure 52 are symmetrically arranged with the first water delivery pipeline 341 and the second water delivery pipeline 342, respectively.

Figure 30:
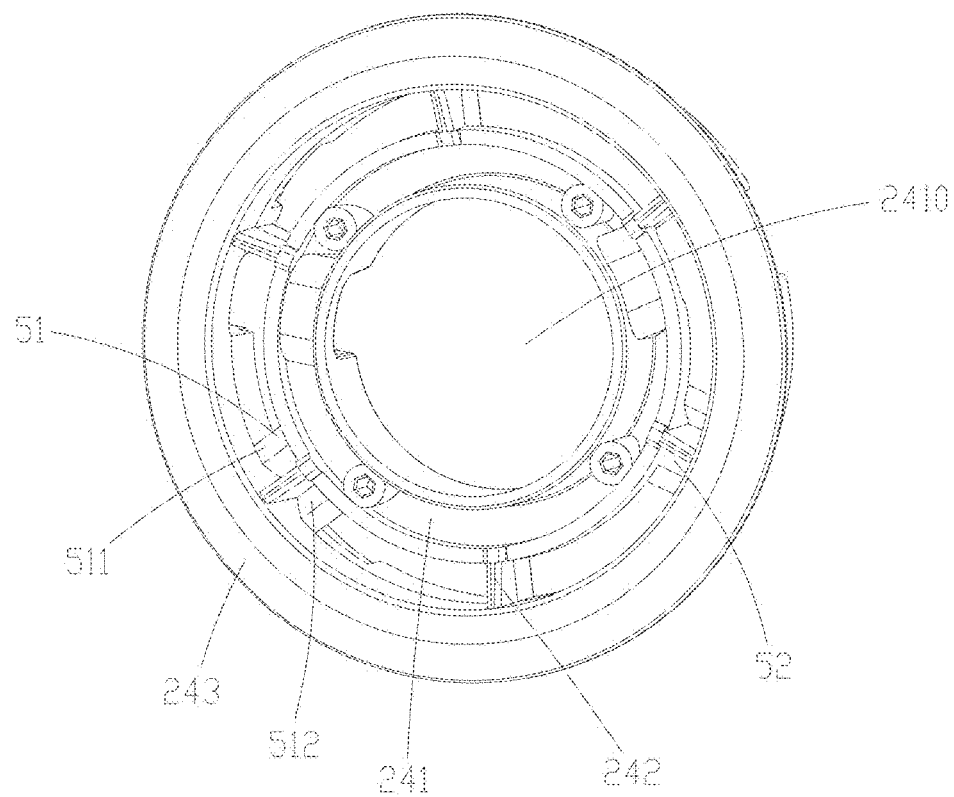
FIG. 30 is a three-dimensional diagram of an air outlet guard of a misting fan according to a fourth embodiment of the present invention.
Figure 31:
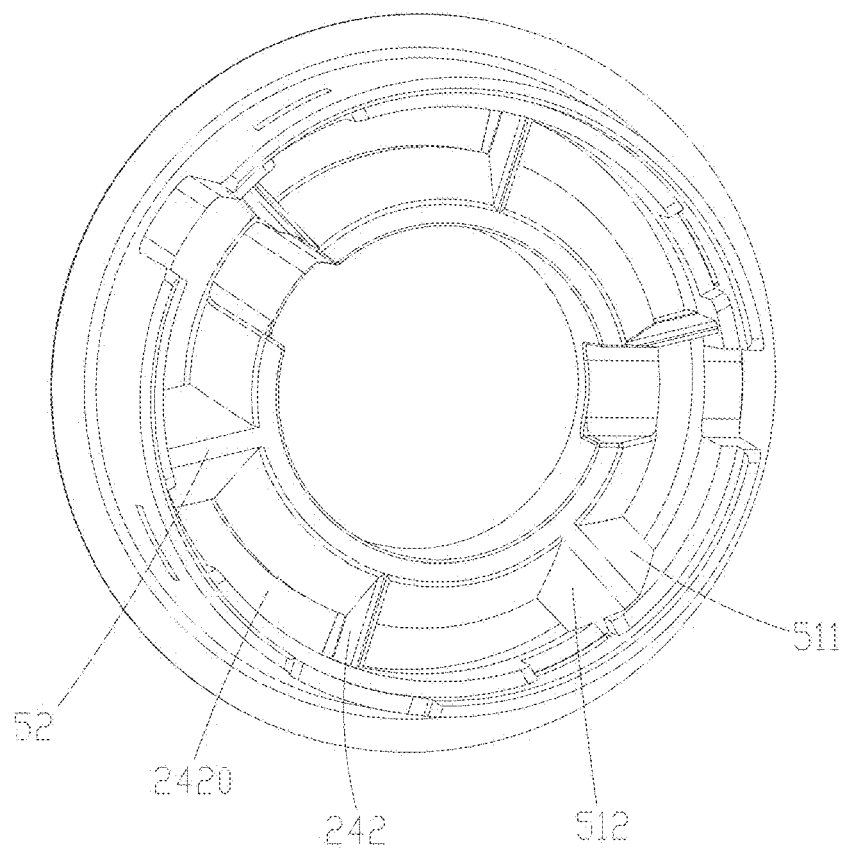
FIG. 31 is a three-dimensional diagram of an air outlet guard of a misting fan according to a fourth embodiment of the present invention from another perspective.
Figure 32:
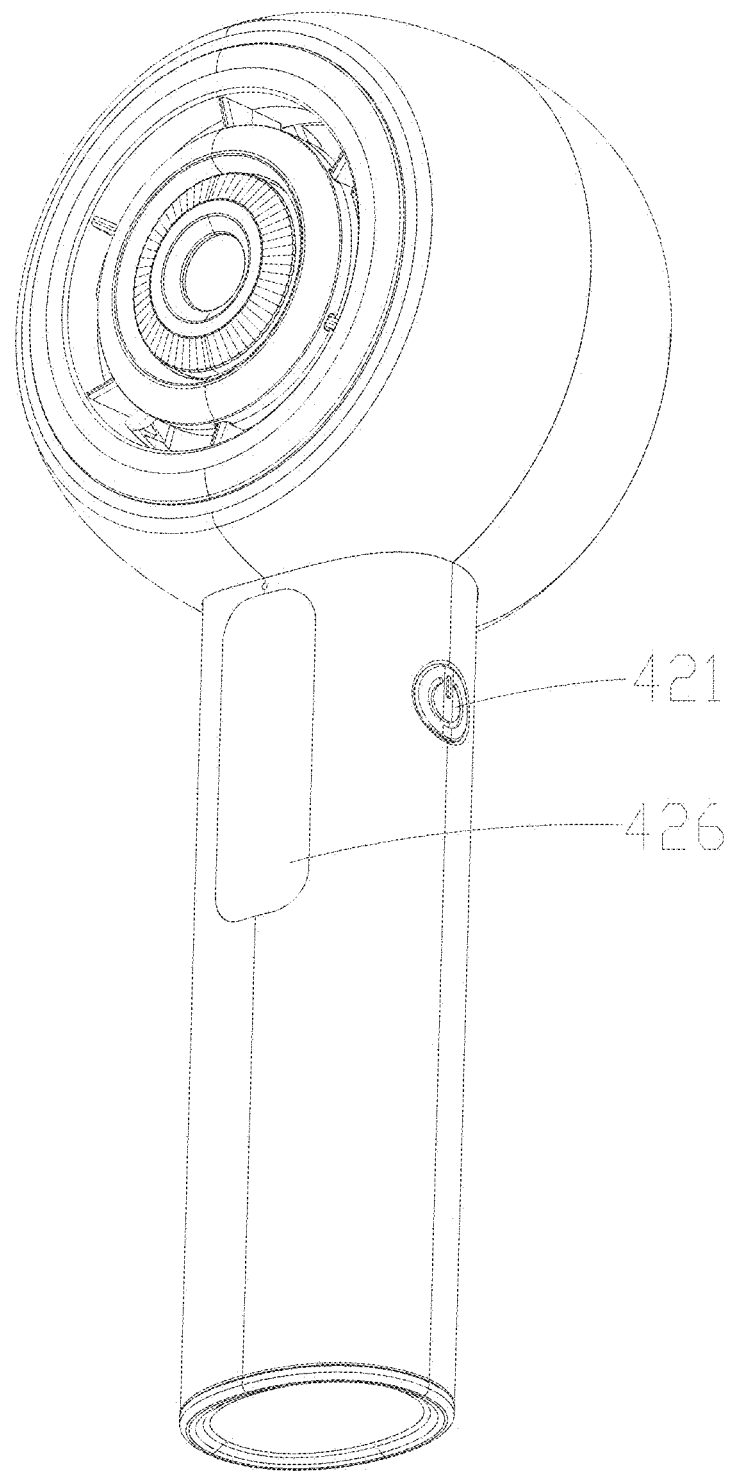
FIG. 32 is a three-dimensional diagram of a misting fan according to a fifth embodiment of the present invention.
Figure 33:
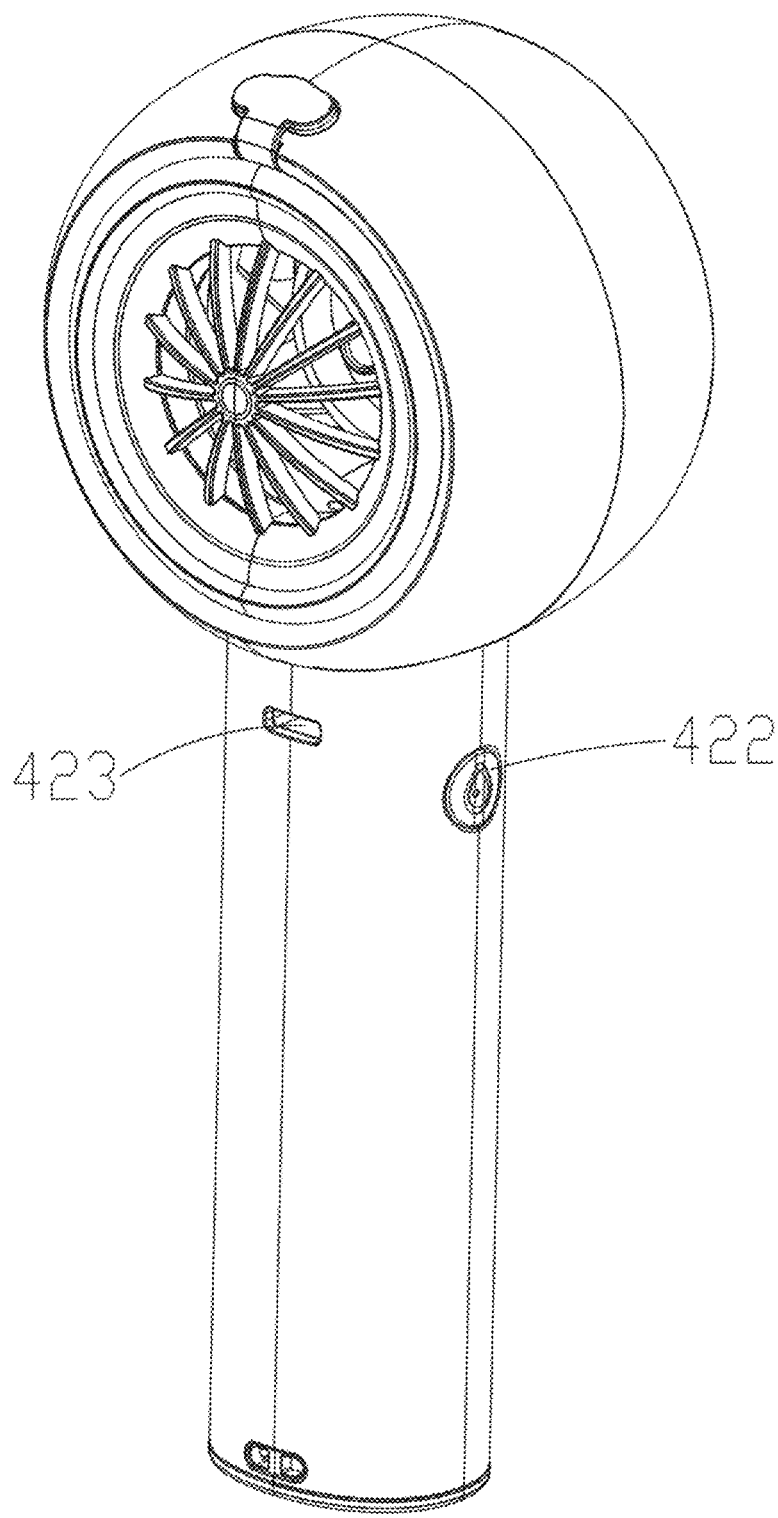
FIG. 33 is a three-dimensional diagram of a misting fan according to a fifth embodiment of the present invention from another perspective.
Figure 34:
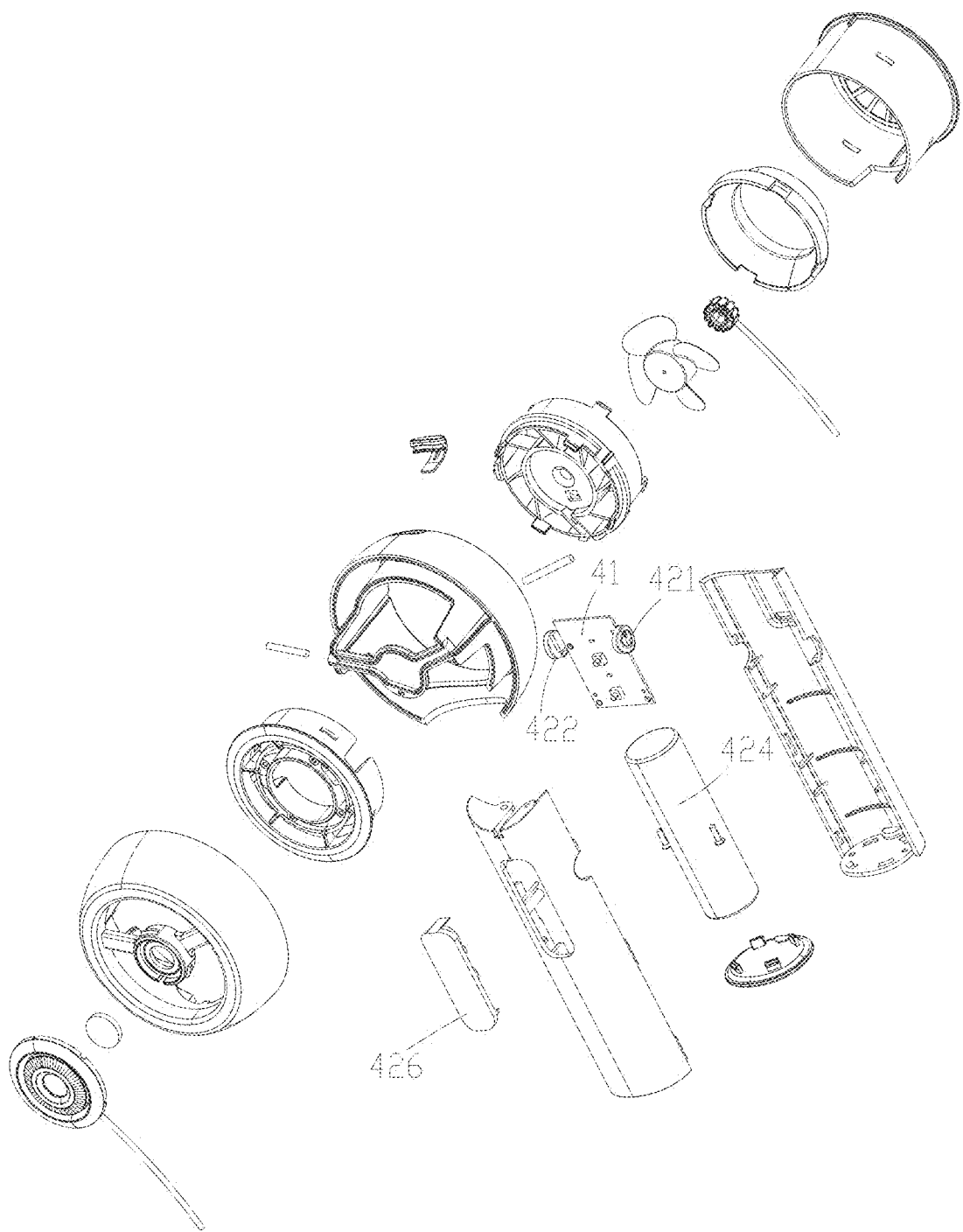
FIG. 34 is an exploded view of a misting fan according to a fifth embodiment of the present invention.
Figure 35:
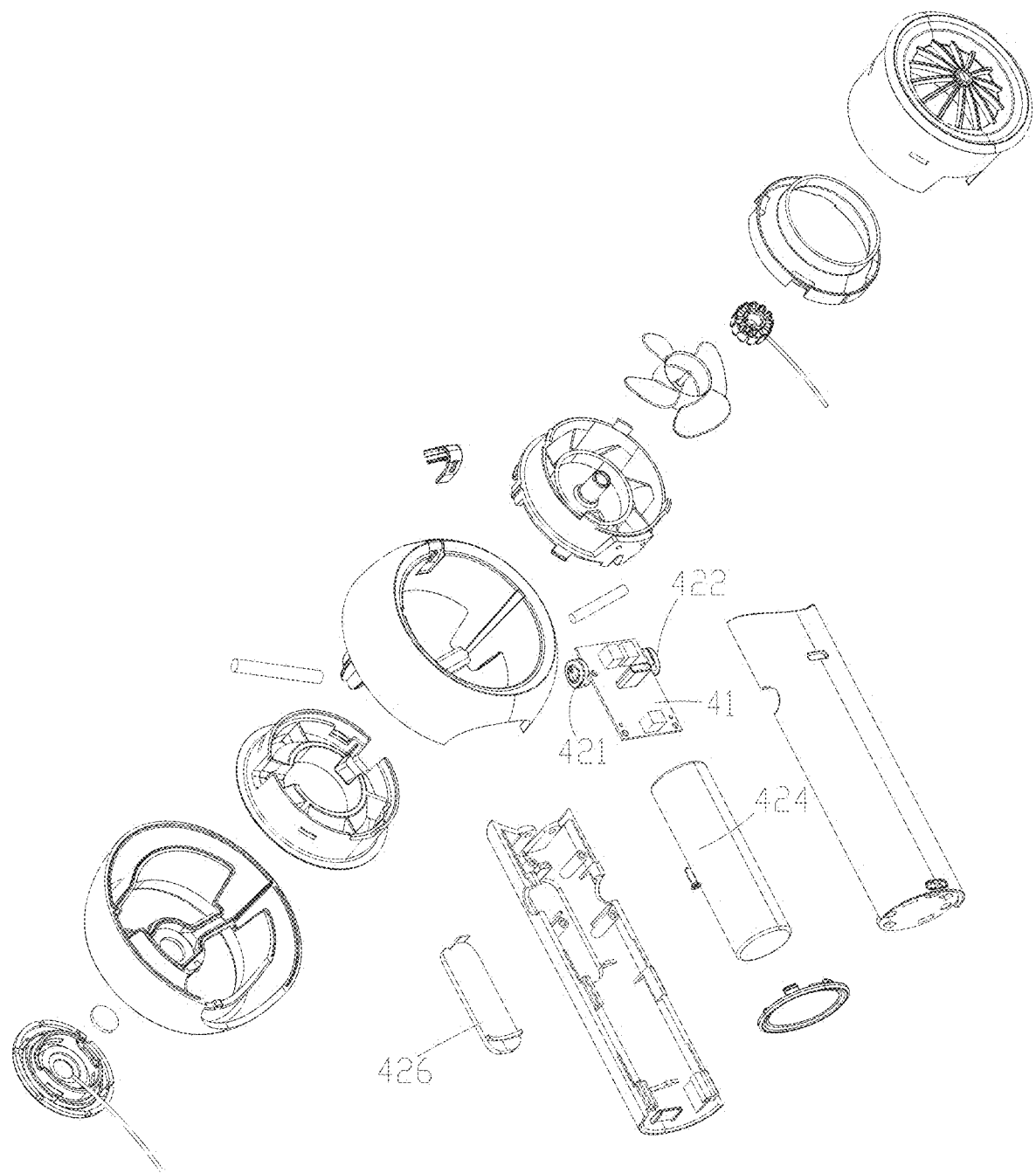
FIG. 35 is an exploded view of a misting fan according to a fifth embodiment of the present invention from another perspective.

Specifically, as shown in FIG. 30 and FIG. 31, the first wind shield structure 51 and the second wind shield structure 52 may include a first wind shield 511 and a second wind shield 512, the ends, close to the fan blade assembly 22, of the first wind shield 511 and the second wind shield 512 are connected. Specifically, the first wind shield 511 and the second wind shield 512 may be connected at a certain angle, but is not limited to the above, so that widths of the first wind shield structure 51 and the second wind shield structure 52 can gradually increase along air outlet direction. In addition, maximum widths of the first wind shield structure 51 and the second wind shield structure 52 may be essentially the same as those of the first water delivery pipeline 341 and the second water delivery pipeline 342, thereby achieving a better wind balance effect.

It may be understood that the first wind shield structure 51 and the second wind shield structure 52 may also form air outlet holes 2420 with the air outlet vanes 242 on both sides.

Further, the fan housing 21 may also include a decorative hood 27, the decorative hood 27 is connected to one side, away from the fan blade assembly 22, of the atomizing portion 241 of the air outlet guard 24. The decorative hood 27 may be a decorative ring, and the decorative ring may be in snap fit with the mist outlet portion 241 through the fixing hole and the fixing post.

It may be understood that in this embodiment, the decorative cover 36 may be made of a metal material, multiple ribs 360 may be disposed on an outer surface of the decorative cover 36, and the multiple ribs 360 are annularly arranged on the outer surface of the decorative cover 36 to improve a water accumulation phenomenon of the mist spray S on the outer surface of the decorative cover 36, which is conducive to improving the product reliability.

Further, in this embodiment, an inner guard body 25 and an air outlet guard 24 are arranged on the air outlet side of the fan blade assembly 22 in turn. The air outlet guard 24 is provided with an atomizing portion 241, an outer frame 243 and air outlet vanes 242 connected between the atomizing portion 241 and the outer frame 243. The inner guard body 25 includes an inner frame 253 corresponding to the outer frame 243, multiple inner vanes 252 corresponding to the multiple air outlet vanes 242, and an inner plate portion 251 corresponding to the mist outlet portion 241. The multiple inner vanes 252 are connected between the inner plate portion 251 and the inner frame 253.

Multiple air outlet holes 2420 are formed among the multiple air outlet vanes 242, and multiple air holes 2520 are also formed between the multiple inner vanes 252.

The multiple air outlet vanes 242 are basically uniformly distributed in a circumferential direction of the air outlet guard 24, and each air outlet vane 242 is approximately arranged in a radius direction of the center of the annular structure of the air outlet guard 24. That is, a straight line where an extension direction R1 of each air outlet vane 242 is located passes through the center of the annular structure of the air outlet guard 24.

The multiple inner vanes 252 are basically uniformly distributed in a circumferential direction of the inner guard body 25, and each inner vane 252 deviates from a radius direction R2 of the center of the annular structure of the inner guard body 25 (the radius direction R2 is the same as the extension direction R1). That is, a straight line where an extension direction R3 of each inner vane 252 is located deviates from the center of the annular structure of the inner guard body 25, thereby being different from the extension direction R1 of each corresponding air outlet vane 242. In other words, the extension direction R3 of each inner vane 252 is different from the extension direction R1 of each corresponding air outlet vane 242, and an outer end of each inner vane 252 in the extension direction R3 (the end away from the center of the annular structure) deviates from the extension direction R1 toward a rotation direction R4 side of the fan blade assembly 22.

The extension direction R3 of each inner vane 252 is different from the extension direction R1 of each corresponding air outlet vane 242, so that the inner guard body 25 and the air outlet guard 24 form two air-gathering structures successively relative to the fan blade assembly 22. That is, the multiple inner vanes 252 and the multiple air outlet vanes 24 sequentially compress the outlet airflow of the fan blade assembly 22, so that the compressed outlet airflow can be blown out more concentratedly, which can effectively increase the airflow force to bring a cooler experience to the user.

In particular, the outer end of each inner vane plate 252 in the extension direction R3 (the end away from the center of the annular structure) deviates from the extension direction R1 toward a rotation direction R4 side of the fan blade assembly 22, which can further improve the compression effect of the outlet airflow, thereby increasing the airflow force.

Fifth Embodiment

Please referring to FIG. 32 to FIG. 35, the fifth embodiment of the present invention provides a misting fan 10, and the misting fan 10 is also a handheld misting fan. It may be understood that parts of the misting fan 10 in the fifth embodiment that have essentially the same structure as those of the misting fans 10 in the first to fourth embodiment may not be described in detail in the fifth embodiment, but the descriptions in the first to fourth embodiments about essentially the same structure as the fifth embodiment can be essentially appliable to the fifth embodiment. The following mainly introduces the key parts of the misting fan 10 in the fifth embodiment or the differences from the misting fan 10 in the fourth embodiment.

In addition, in the fifth embodiment, a first key 421 and a second key 422 are arranged on left and right sides of a handheld housing 40, respectively, a display window on an air outlet side of the handheld housing 40 is provided with a display screen 426, the display screen 426 is connected to a main circuit board 41 to display an operating state of the misting fan 10, such as fan speed setting, and/or electric quantity of a battery 424. This helps improving the user experience.

Sixth Embodiment

Figure 36:
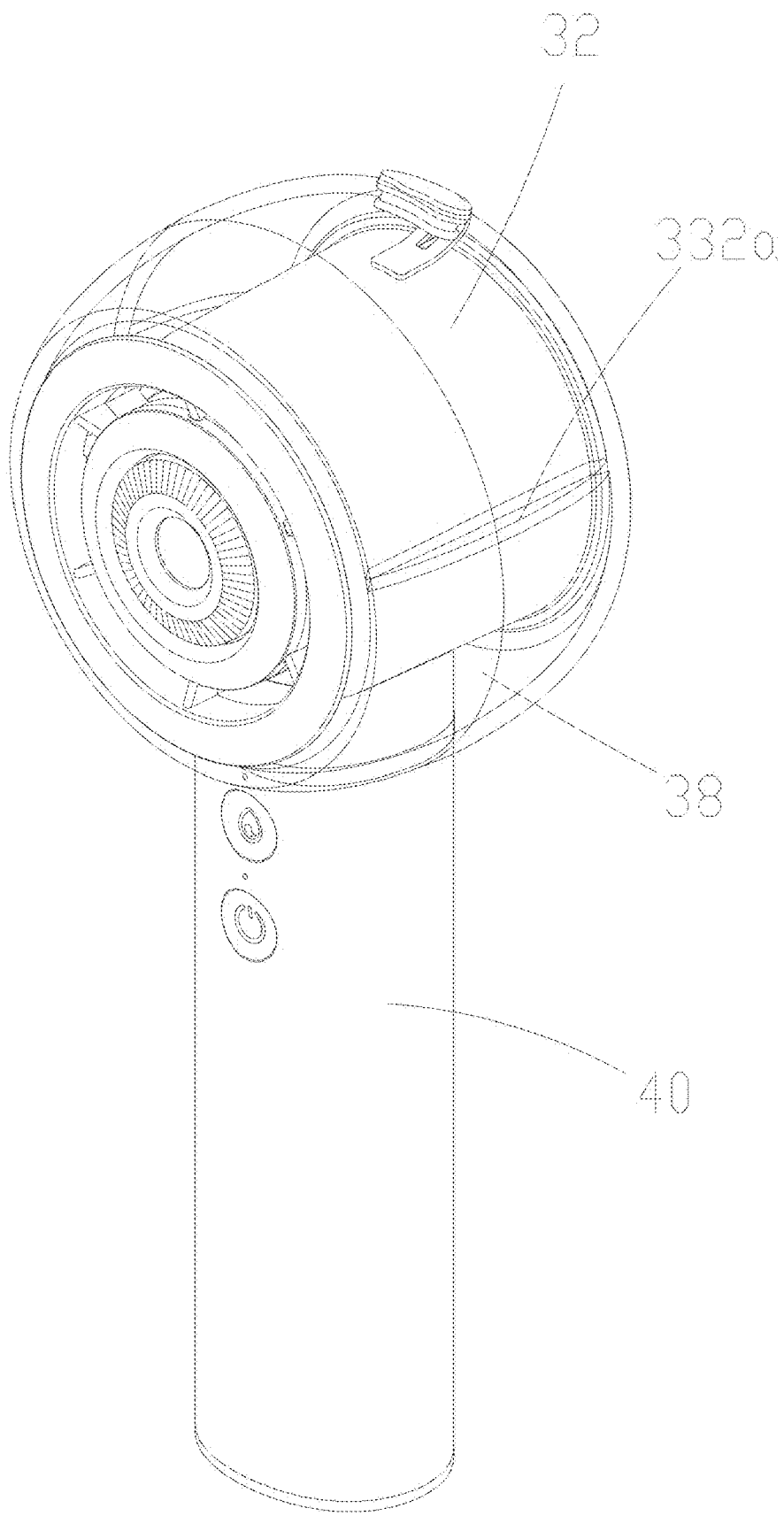
FIG. 36 is a three-dimensional diagram of a misting fan according to a sixth embodiment of the present invention.
Figure 37:
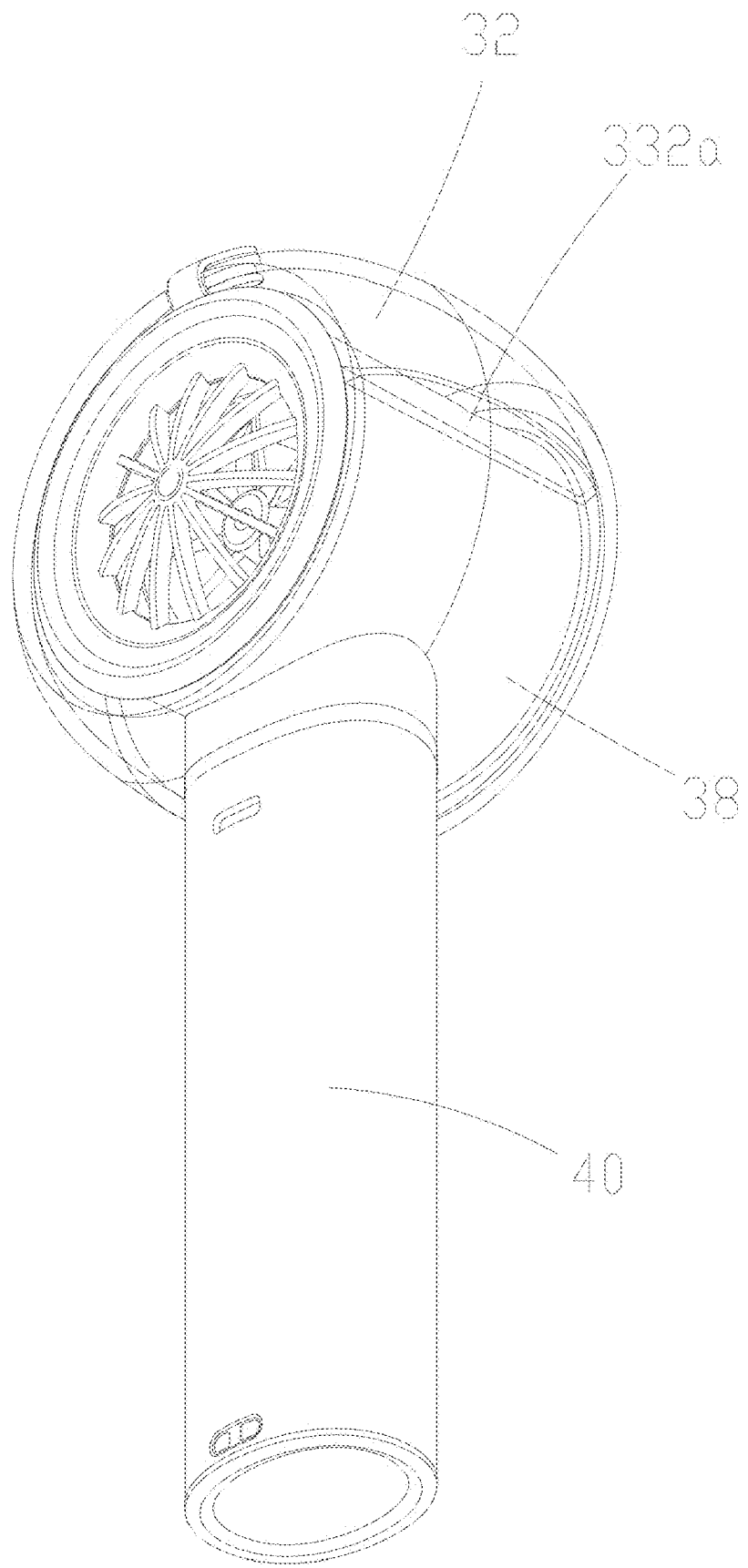
FIG. 37 is a three-dimensional diagram of a misting fan according to a sixth embodiment of the present invention from another perspective.
Figure 38:
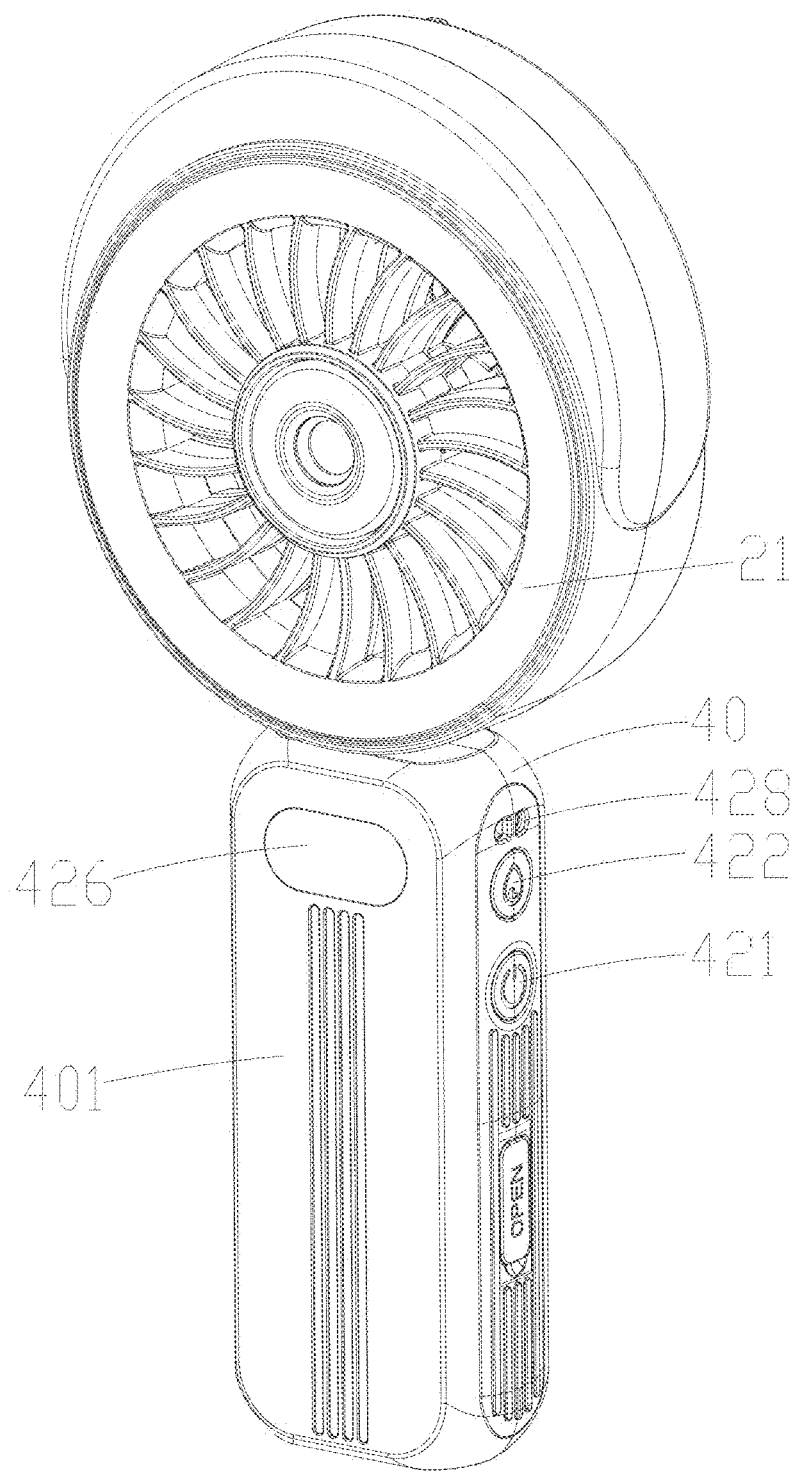
FIG. 38 is a three-dimensional diagram of a misting fan according to a seventh embodiment of the present invention.
Figure 39:
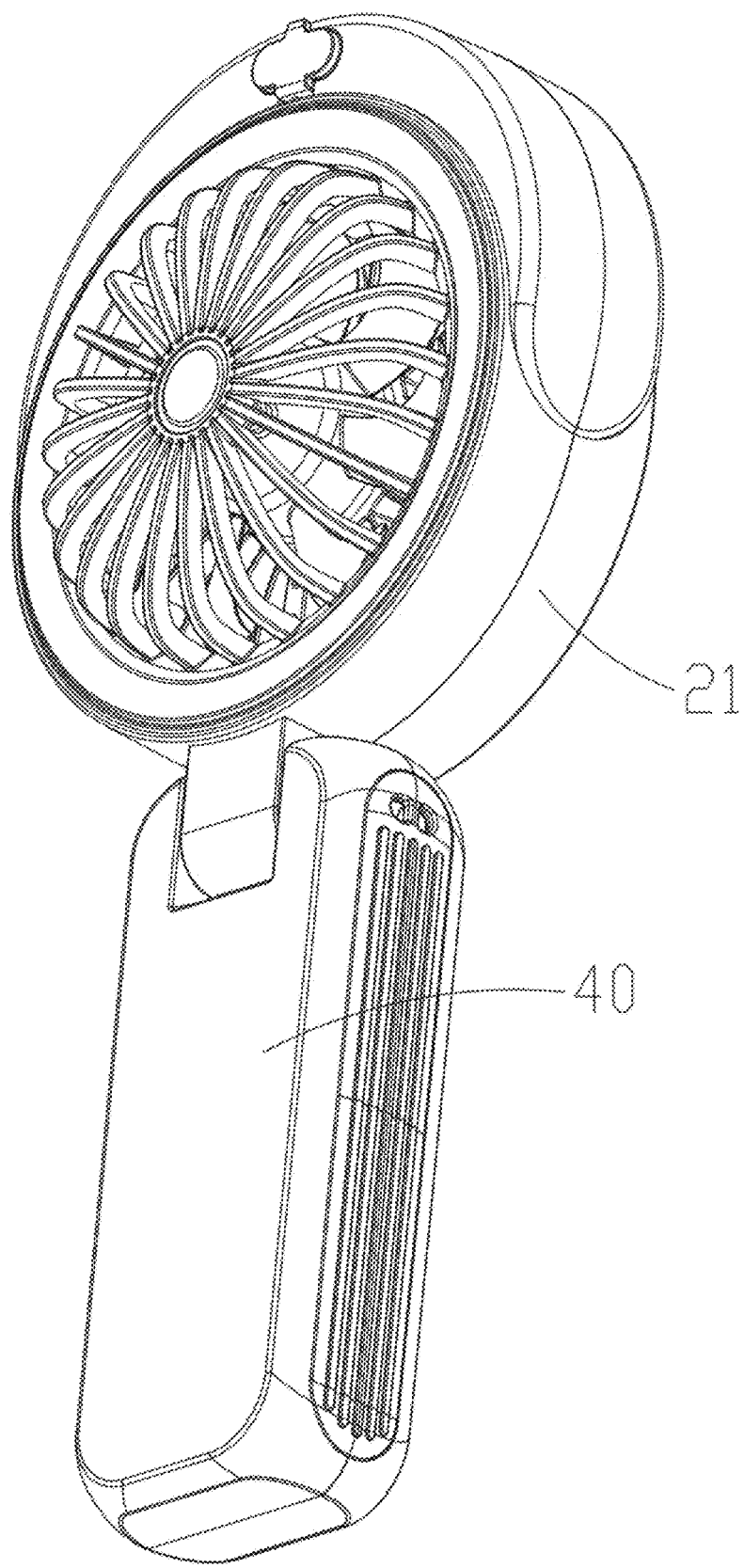
FIG. 39 is a three-dimensional diagram of a misting fan according to a seventh embodiment of the present invention from another perspective.
Figure 40:
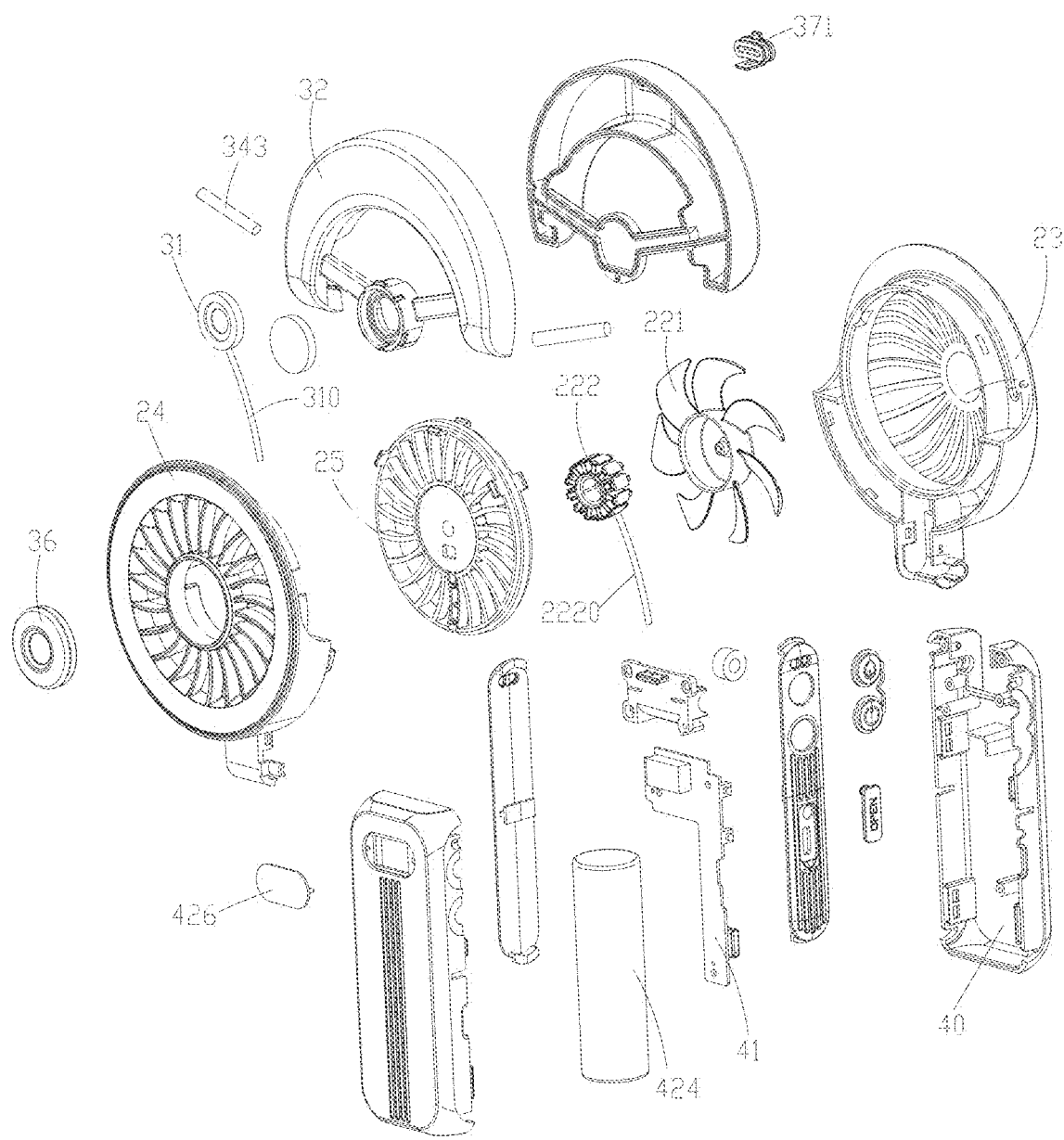
FIG. 40 is an exploded view of a misting fan according to a seventh embodiment of the present invention.
Figure 41:
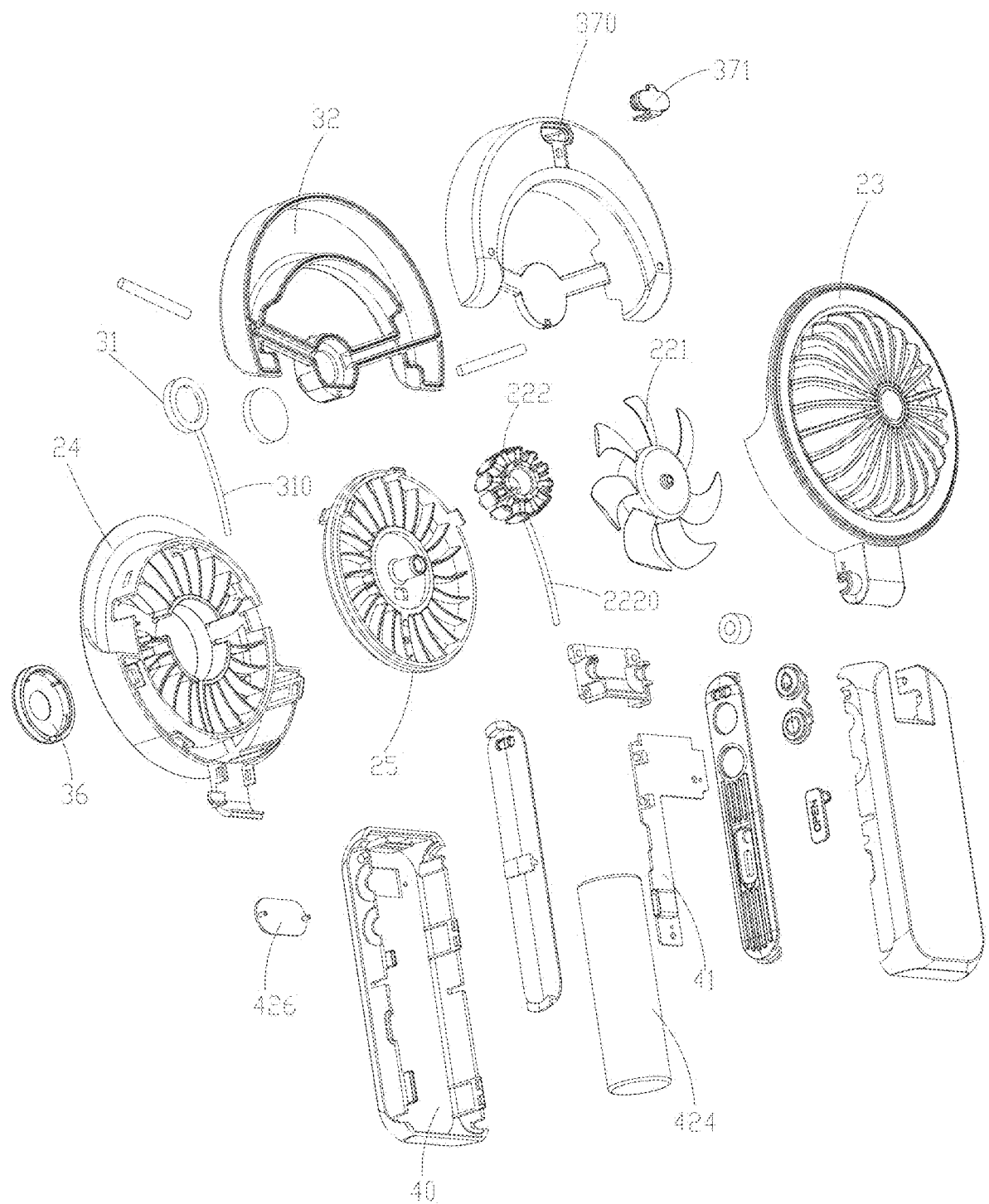
FIG. 41 is an exploded view of a misting fan according to a seventh embodiment of the present invention from another perspective.
Figure 42:
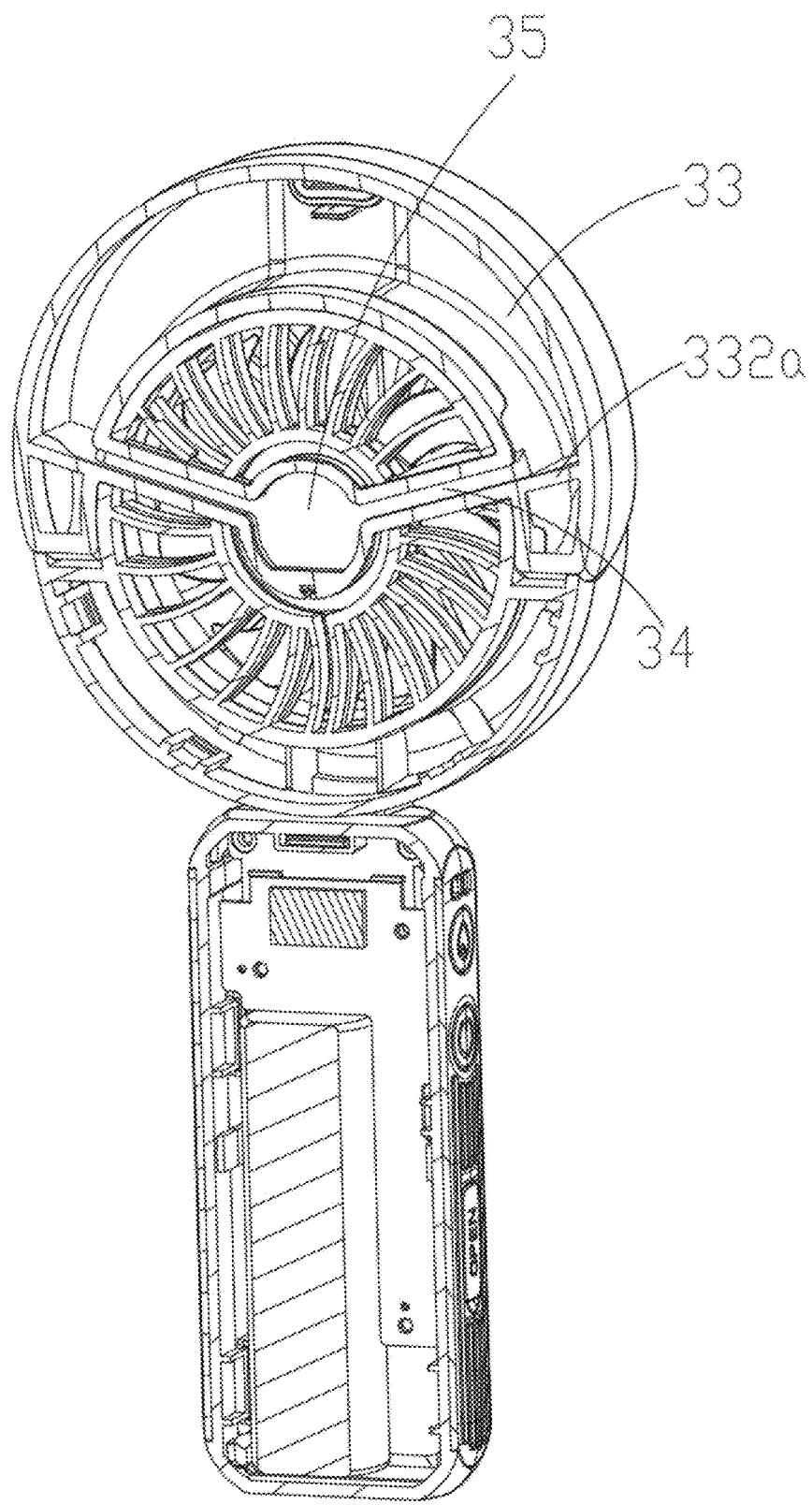
FIG. 42 is a sectional view of a misting fan according to a seventh embodiment of the present invention.
Figure 43:
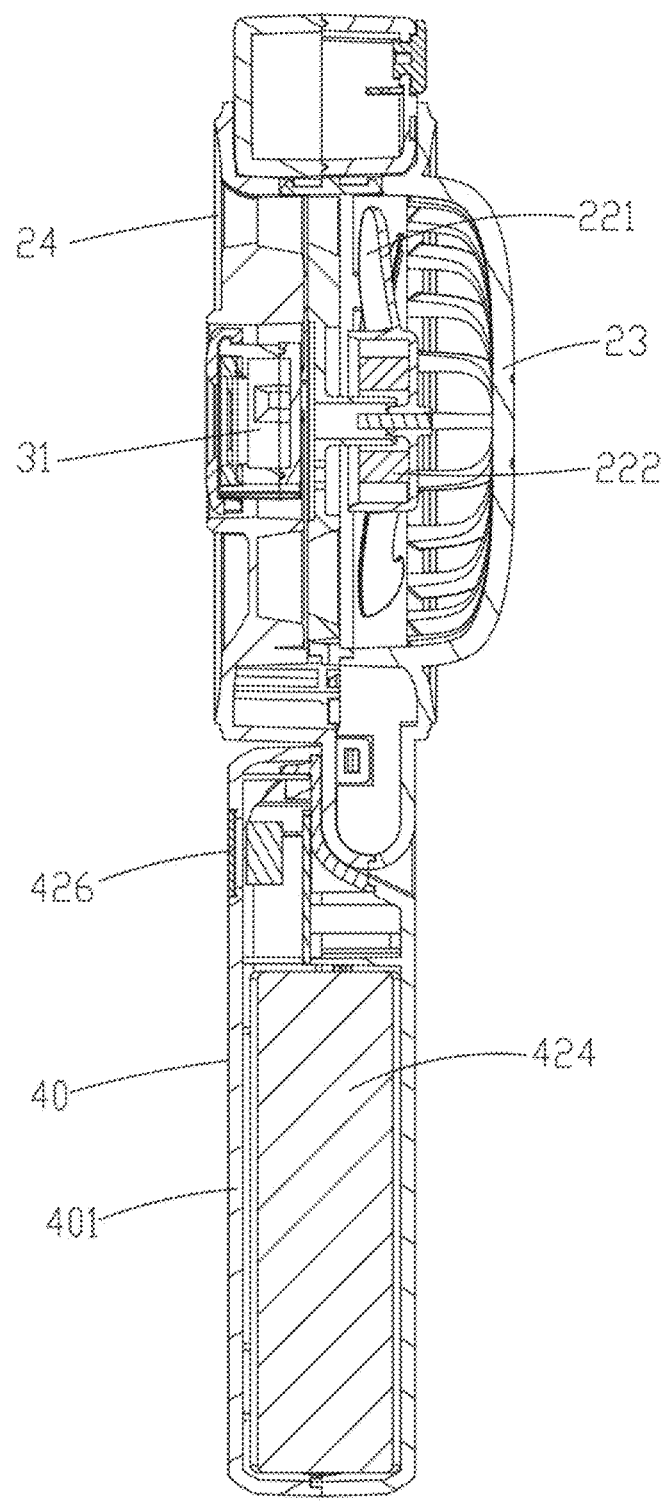
FIG. 43 is a sectional view of a misting fan according to a seventh embodiment of the present invention from another perspective.
Figure 44:
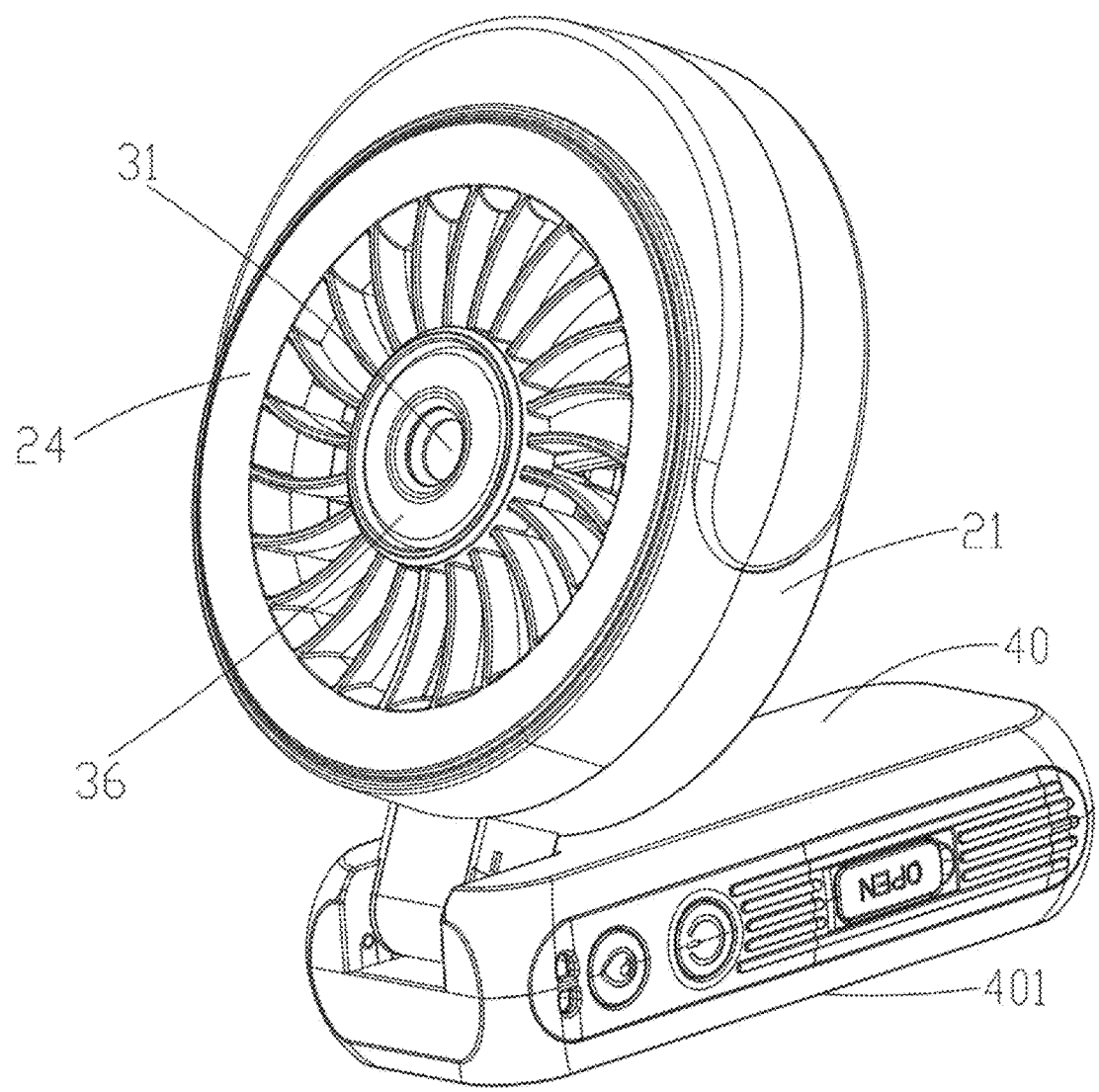
FIG. 44 is a three-dimensional diagram of a misting fan according to a seventh embodiment of the present invention in a folded state.
Figure 45:
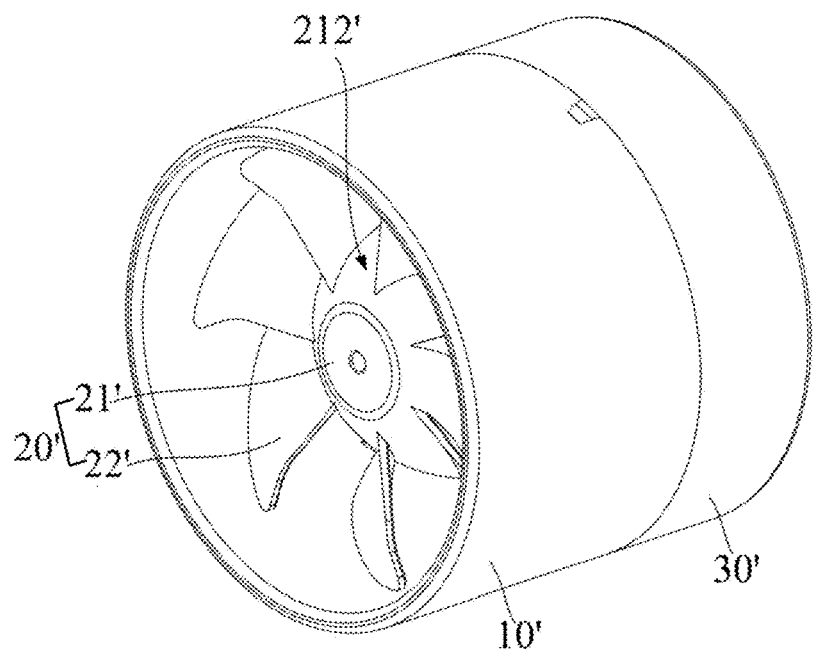
FIG. 45 is a diagram of a partial structure of a fan assembly of a misting fan according to an eighth embodiment of the present invention.
Figure 46:
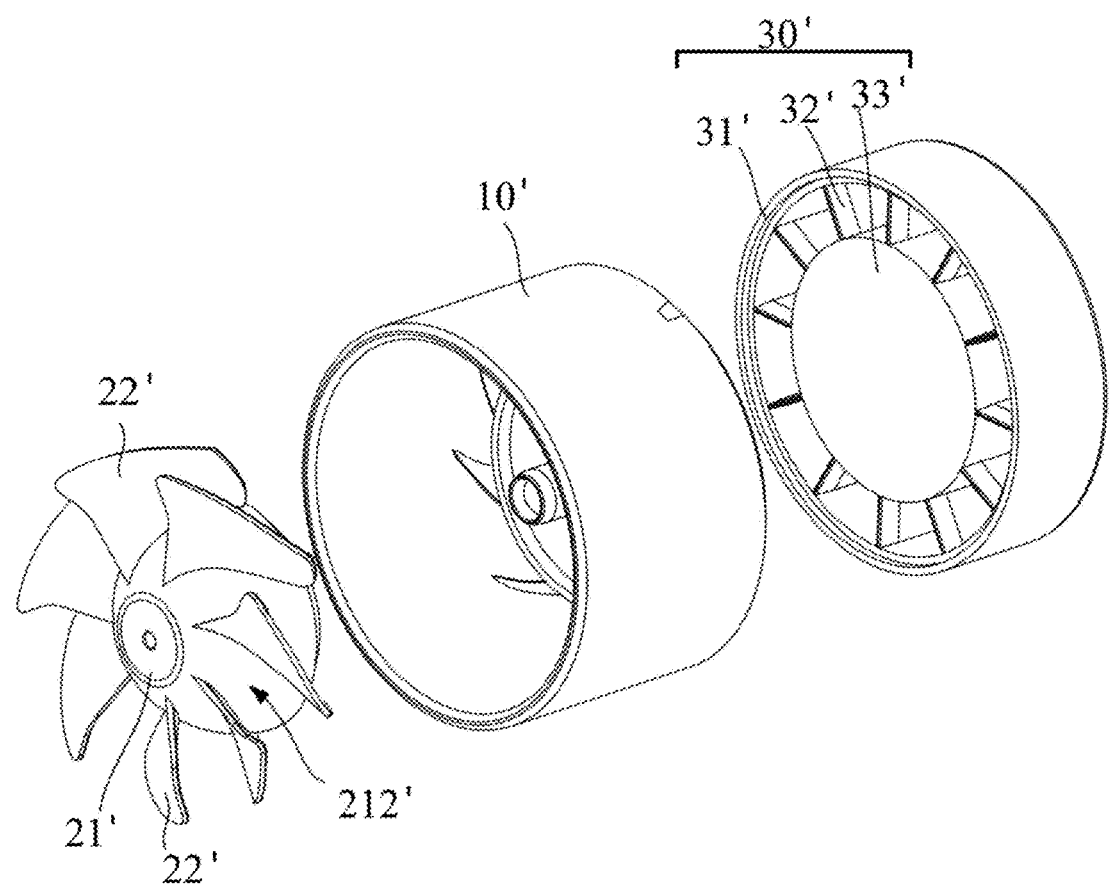
FIG. 46 is an exploded view of a fan assembly shown in FIG. 45.
Figure 47:
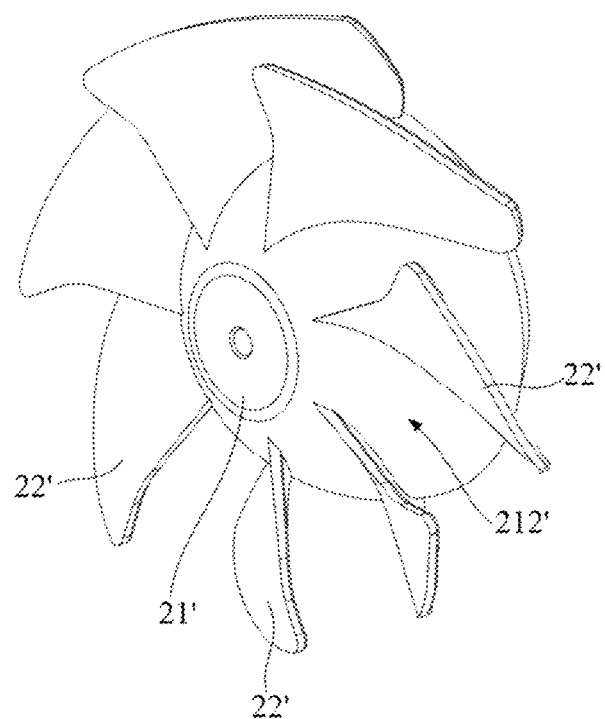
FIG. 47 is a sectional view of a fan assembly shown in FIG. 45.
Figure 48:
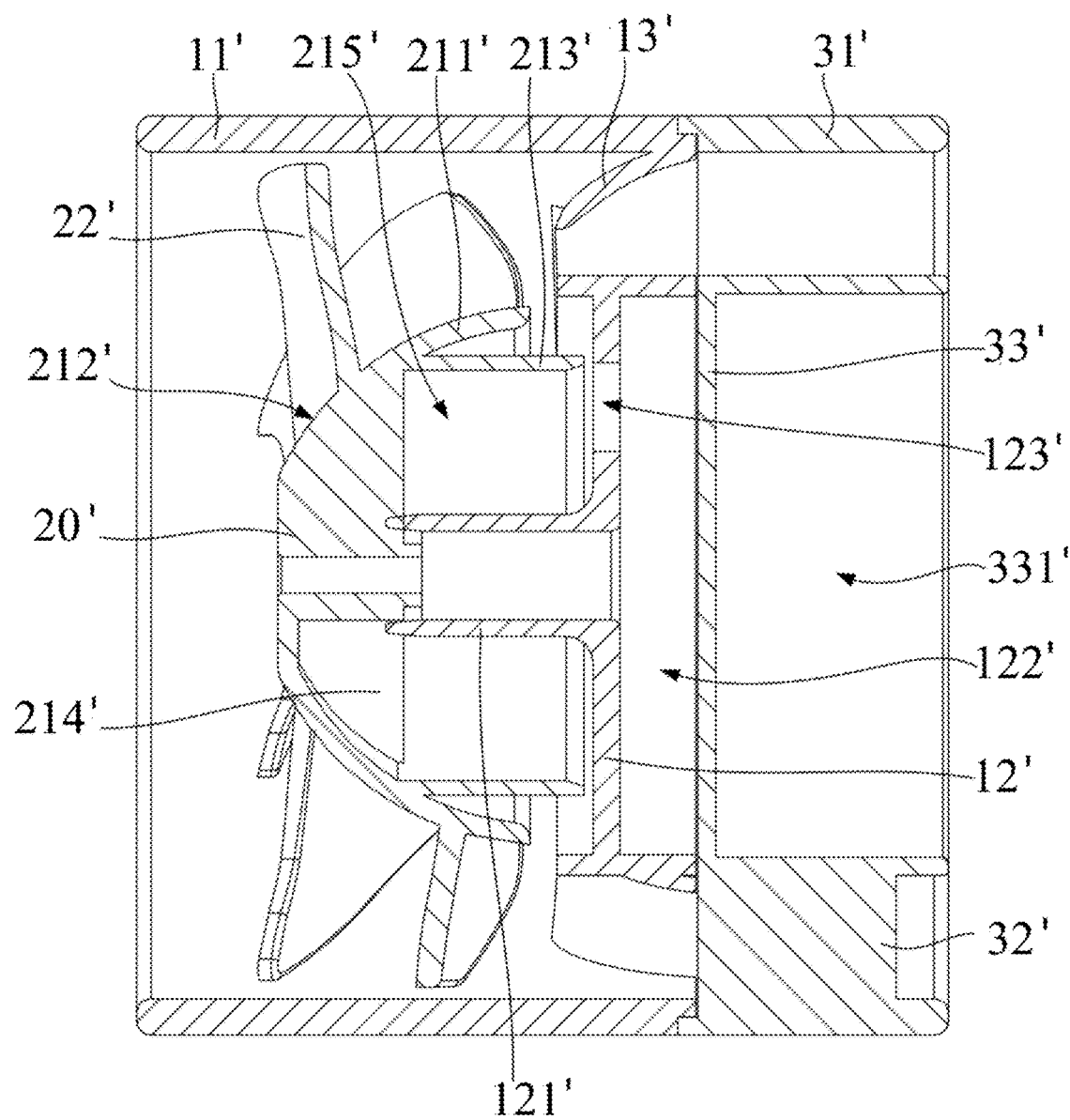
FIG. 48 is a three-dimensional diagram of a blade assembly of a fan assembly shown in FIG. 45.

Please referring to FIG. 36 to FIG. 37, the sixth embodiment of the present invention also provides a misting fan 10, and the misting fan 10 is also a handheld misting fan. It may be understood that parts of the misting fan 10 in the sixth embodiment that have essentially the same structure as those of the misting fans 10 in the first to fifth embodiment may not be described in detail in the sixth embodiment, but the descriptions in the first to fifth embodiments about essentially the same structure as the sixth embodiment can be essentially appliable to the sixth embodiment. The following mainly introduces the key parts of the misting fan 10 in the sixth embodiment or the differences from the misting fan 10 in the fifth embodiment.

In this embodiment, a water tank 32, a decorative tank body 38 and an inner wall 332a connected between the water tank 32 and the decorative tank body 38 are made of a transparent material, so that a liquid situation in the water tank 32 can be directly observed visually. In addition, the exterior of the misting fan 10 can be more beautiful. It may be understood that in the first to fifth embodiments, the water tank 32 may be made of a transparent material, and thus the liquid condition in the water tank 32 can be directly observed visually.

Seventh Embodiment

Please referring to FIG. 38 to FIG. 44, the seventh embodiment of the present invention also provides a misting fan 10, and the misting fan 10 is a handheld foldable misting fan. It may be understood that parts of the misting fan 10 in the seventh embodiment that have essentially the same structure as those of the misting fan 10 in the sixth embodiment may not be described in detail in the seventh embodiment, but the descriptions in the first to sixth embodiments about essentially the same structure as the seventh embodiment can be essentially appliable to the seventh embodiment. The following mainly introduces the key parts of the misting fan 10 in the seventh embodiment or the differences from the misting fan 10 in the third embodiment.

In this embodiment, a handheld housing 40 is rotatably connected to a fan housing 21, so that the handheld housing 40 can rotate relative to the fan housing 21 to switch between a handheld state and a bent connection state. The handheld housing 40 includes a support surface 401, when the handheld housing 40 and the fan housing 21 are in the bent connection state, the support surface 401 is configured to be arranged on an external object, so that the handheld housing 40 can support the fan housing 21

Further, a first key 421 and a second key 422 are both arranged on a same side of the handheld housing 40. A display screen 426 is disposed on the support surface 401. A side wall of the handheld housing 40 is also provided with a sling hole 428.

Eighth Embodiment

Please referring to FIG. 45 to FIG. 49, the eighth embodiment of the present invention also provides a misting fan 10, and the misting fan 10 is a handheld foldable misting fan. It may be understood that parts of the misting fan 10 in the eighth embodiment that have essentially the same structure as those of the misting fans 10 in the first to seventh embodiment may not be described in detail in the eighth embodiment, but the descriptions in the first to seventh embodiments about essentially the same structure as the eighth embodiment can be essentially appliable to the eighth embodiment. The following mainly introduces the key parts of the misting fan 10 in the eighth embodiment or the differences from the misting fan 10 in the fourth embodiment.

Specifically, in the eighth embodiment, the fan assembly includes an air duct 10' (which is equivalent to the inner guard body 25 in the fourth embodiment) and a blade assembly 20'. The air duct 10' includes an outer duct body 11', a mounting portion 12' and multiple first blades 13'. The mounting portion 12' is located inside the outer duct body 11', and spaced apart from an inner wall surface of the outer duct body 11'. The multiple first blades 13' are connected between the outer duct body 11' and the mounting portion 12', and distributed at intervals in a circumferential direction of the mounting portion 12', and the outer duct body 11' is provided with a mounting cavity 215'.

The blade assembly 20' includes a hub 21' and multiple second blades 22'. The hub 21' is rotatably mounted at the mounting portion 12', and arranged in the mounting cavity 215'. One side, away from the mounting portion 12', of the hub 21' is provided with a spherical surface 212', and the multiple second blades 22' are arranged on the spherical surface 212' and distributed at intervals in a circumferential direction of the hub 21', and an inclination direction of the second blades 22' is opposite to that of the first blades 13' (for example, when the first blade 13' is right-handed, the second blade 22' is left-handed; or, when the first blade 13' is left-handed, the second blade 22' is right-handed). A flow direction of the airflow is a direction that the first blade 13' points to the second blade 22'.

According to the technical solution of the present invention, because the inclination direction of the second blade 22' is opposite to that of the first blade 13', after the blade assembly 20' rotates to drive the airflow to enter the air duct 10' and then to pass through the second blade 22', the airflow can be compressed, so that the compressed airflow can be blown out more concentratedly, and the airflow force can be effectively increased. Moreover, a windward surface of the hub 21' is configured as a spherical surface 212', and the multiple second blades 22' are arranged on the spherical surface 212' to play a better guiding role on an operating spherical surface 212' and effectively avoid the generation of turbulence, which not only can ensure that the airflow force is large, but also can avoid excessive noise.

In some embodiments, the hub 21' includes a spherical shell 211', a mounting inner cylinder 213' and multiple reinforcing ribs 214. An outer side of the spherical shell 211' is provided with a spherical surface 212', and the multiple reinforcing ribs 214' are arranged in the spherical shell 211' and located at positions far away from the mounting portion 12'. The mounting inner cylinder 213' is arranged in the spherical shell 211' and located between the reinforcing ribs 214' and the mounting portion 12'. Such an arrangement can increase the structural strength of the spherical shell 211' through the reinforcing ribs 214' and the mounting inner cylinder 213'. Moreover, the structure of the mounting inner cylinder 213' is relatively regular, which is convenient for the mounting of the blade assembly 20'.

In some embodiments, the mounting portion 12' is provided with a mounting shaft 121', the mounting inner cylinder 213' surrounds the mounting shaft 121' at intervals to form a mounting cavity 215' with the mounting shaft 121'. The fan blade assembly also includes a motor, the motor is mounted in the mounting cavity 215', a stator of the motor is connected to the mounting shaft 121', and a rotor of the motor is connected to the hub 21'. That is, the motor can be integrated into the fan blade assembly to improve the structure compactness of the fan blade assembly and facilitate the assembling of the handheld fan.

In some embodiments, one side, away from the hub 21', of the mounting portion 12' is provided with a mounting groove 122' and a wire passing hole 123' for communicating the mounting cavity 215' and the mounting groove 122', and the mounting groove 122' is used for mounting a circuit board. In this way, the circuit board is mounted by using the mounting groove 122', which is convenient for the wiring of the motor. A connector can be arranged on the circuit board to facilitate the wiring when assembling the handheld fan.

In some embodiments, the number of the first blades 13' is greater than that of the second blades 22'. Such an arrangement can improve the air gathering effect and increase the airflow force.

In some embodiments, an area of the windward surface of the second blade 22' is larger than that of the windward surface of the first blade 13'. In this way, when the second blade 22' rotates, more airflow can be driven to flow, which can increase the airflow force.

In some embodiments, the fan blade assembly further comprises an air guide duct 30' (equivalent to the air outlet guard 24 in the fourth embodiment), which is located at one side, away from the hub 21', of the mounting portion 12', and includes an outer duct portion 31' (equivalent to the outer frame 243), a central part 33' (equivalent to the atomizing portion 241) arranged in the outer duct portion 31', and multiple connecting portions 32' (equivalent to the air outlet vanes 242) connected between the outer duct portion 31' and the central portion 33'. The outer duct portion 31' is butted with the outer duct body 11', and an outer diameter of the central portion 33' is greater than that of the mounting portion 12'. That is, a spacing between the central portion 33' and the outer duct portion 31' is less than a spacing between the mounting portion 12' and the outer duct body 11'. The airflow, when flowing between the central portion 33' and the outer duct portion 31', can be further compressed, which can increase the airflow force. Specifically, the outer duct portion 31' is butted with the air duct 10', and an outer diameter of the air duct 10' is larger than that of the mounting portion 12'. The central portion 33' is provided with a mist outlet hole 2410.

In some embodiments, the air guide duct 30' is detachably connected to the outer duct portion 31'. As such, the air guide duct 30' can be conveniently disassembled for maintenance.

In some embodiments, one side, away from the mounting portion 12', of the central portion 33' is provided with an accommodation groove 331'. As such, when used for the handheld fan, the circuit structure can be mounted in the accommodation groove 331', which can improve a space utilization rate of the central portion 33'.

Figure 49:
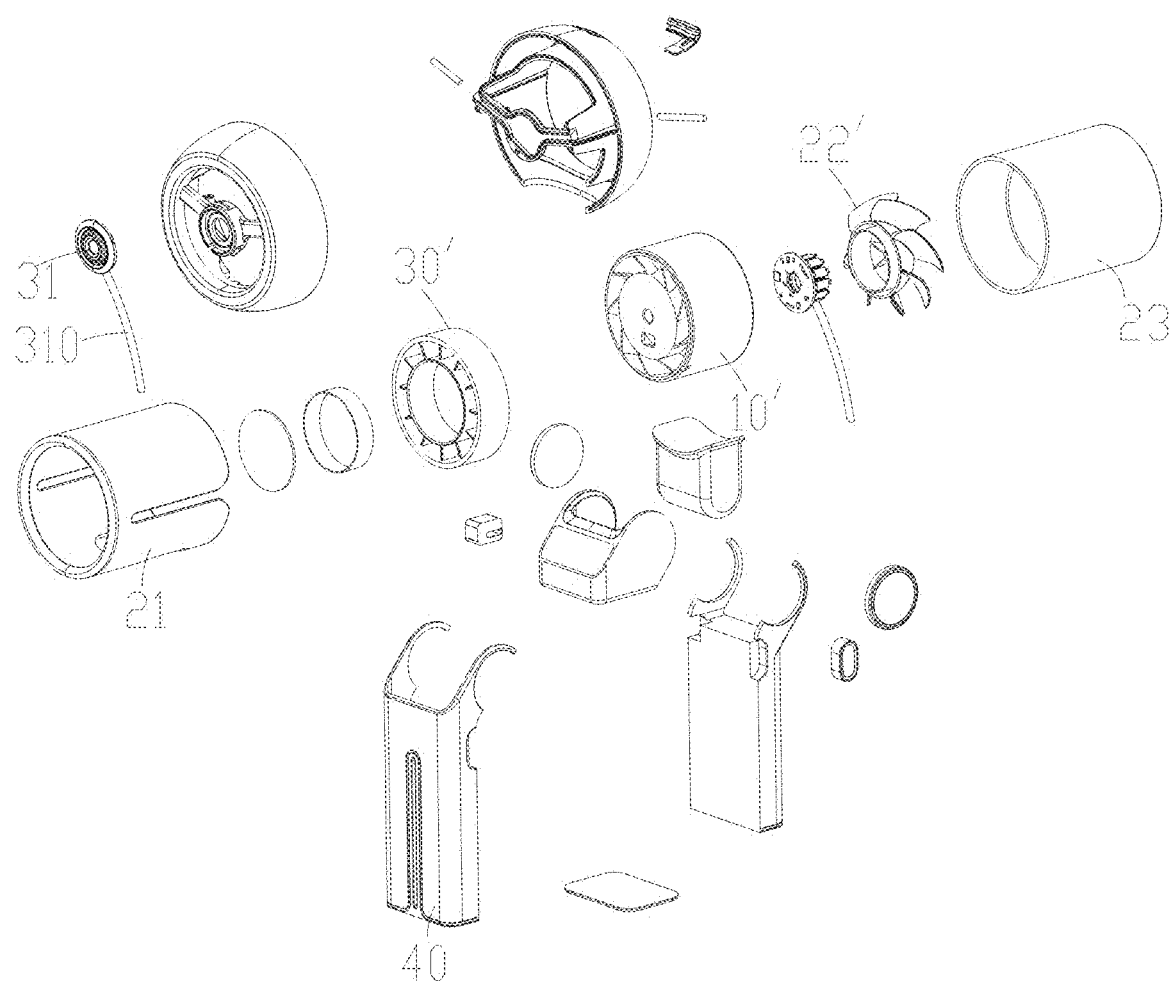
FIG. 49 is an exploded view of a misting fan according to an eighth embodiment of the present invention.
Figure 50:
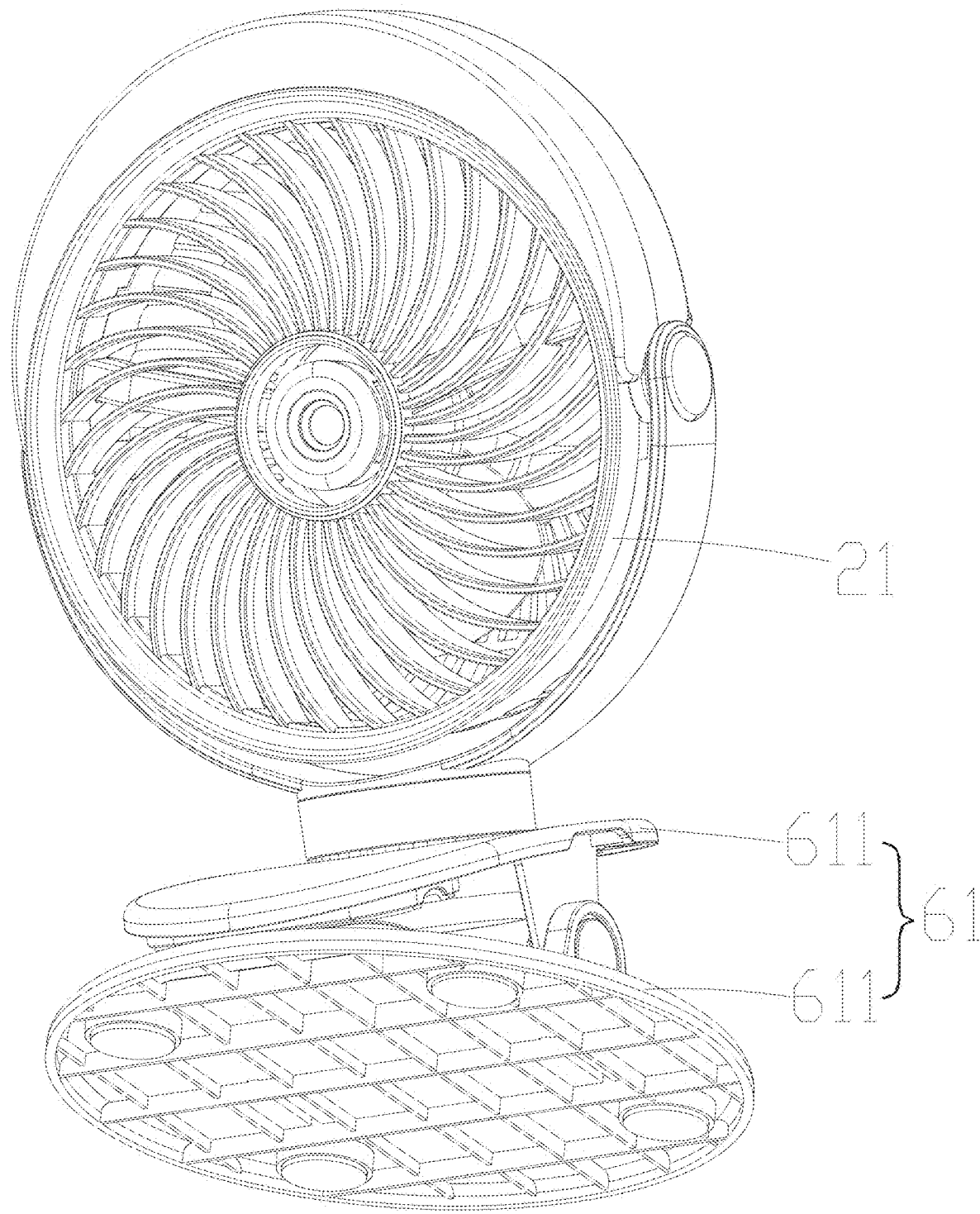
FIG. 50 is a three-dimensional diagram of a misting fan according to a ninth embodiment of the present invention.
Figure 51:
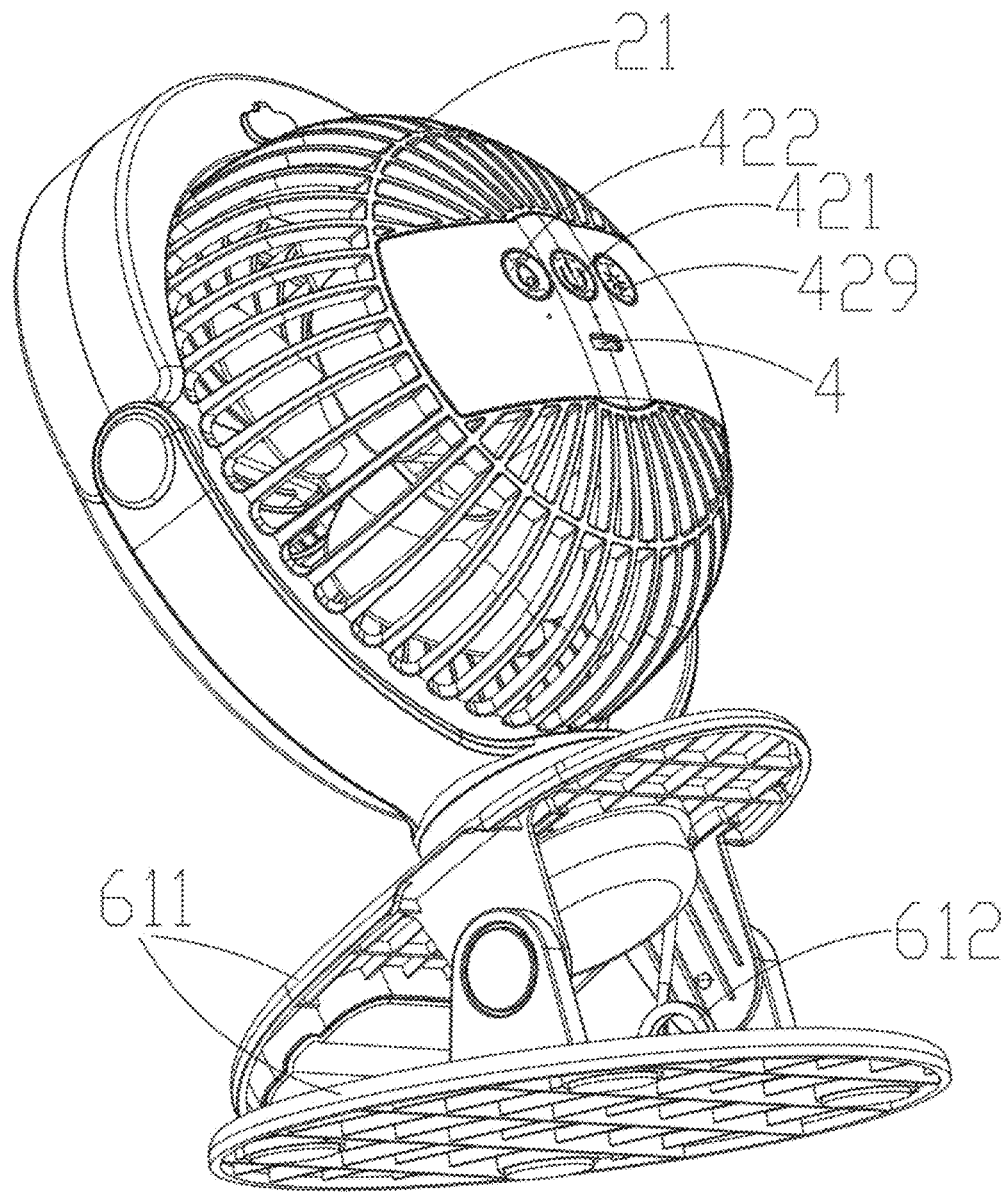
FIG. 51 is a three-dimensional diagram of a misting fan according to a ninth embodiment of the present invention from another perspective.
Figure 52:
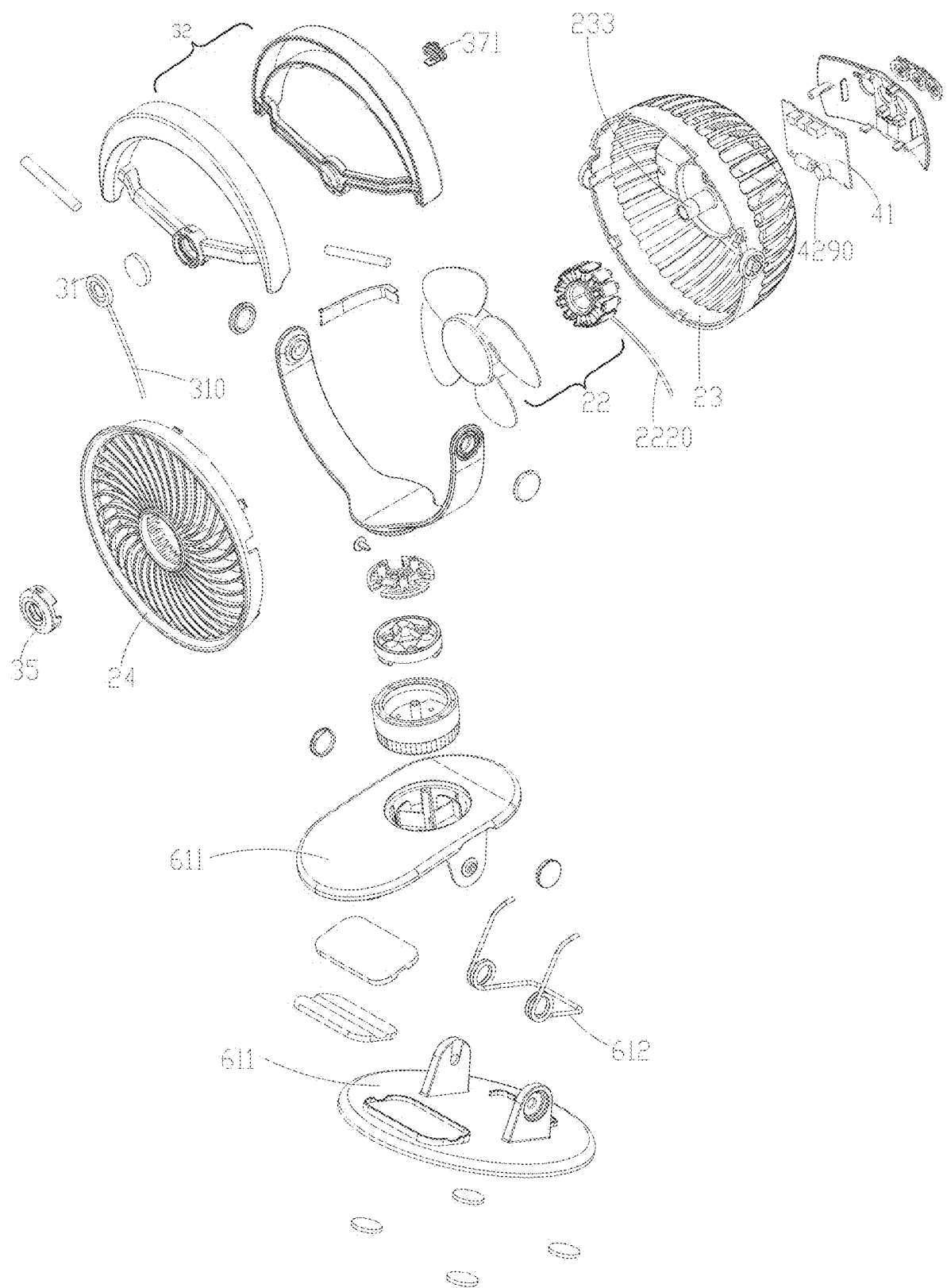
FIG. 52 is an exploded view of a misting fan according to a ninth embodiment of the present invention.
Figure 53:
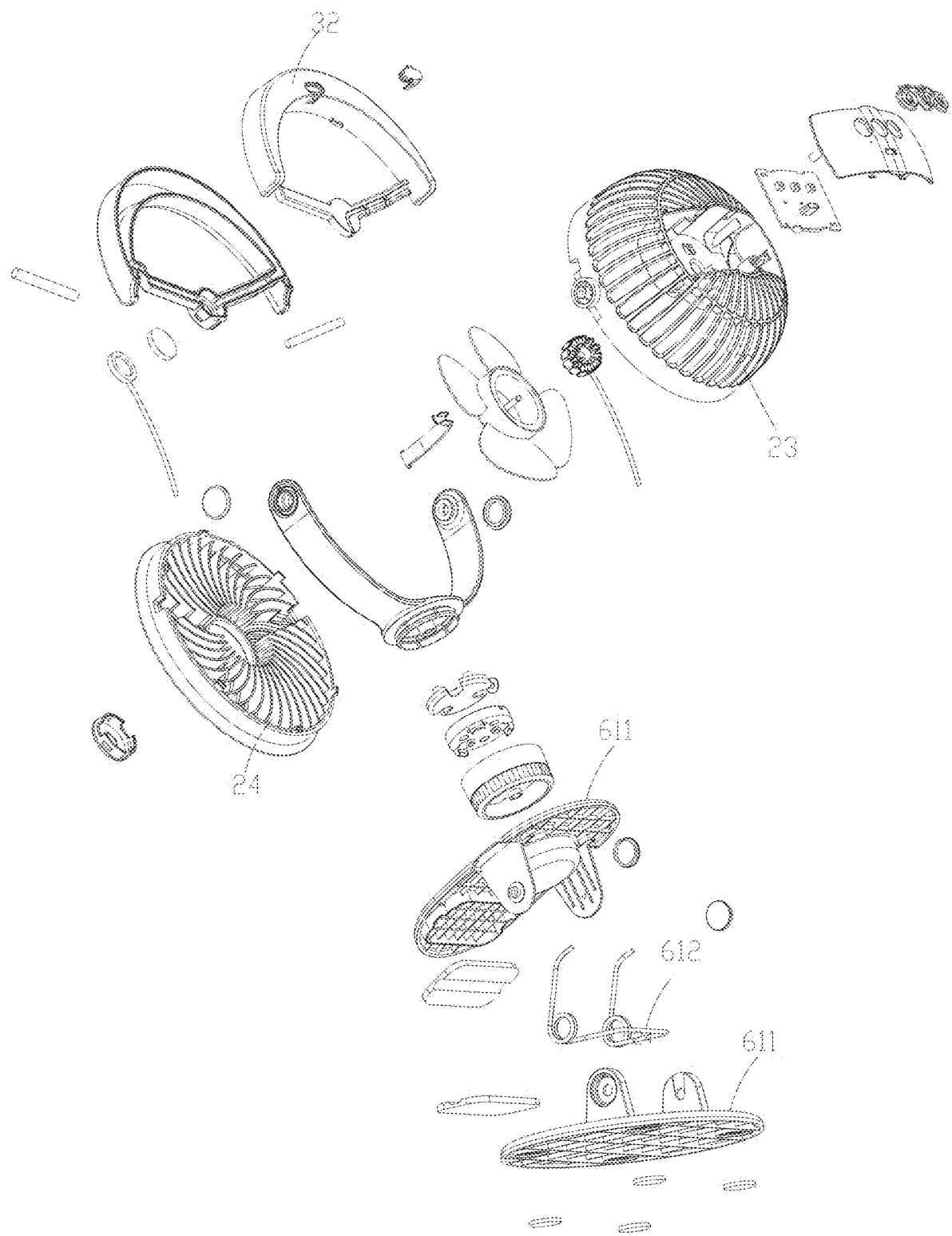
FIG. 53 is an exploded view of a misting fan according to a ninth embodiment of the present invention from another perspective.

As shown in FIG. 49, this embodiment further provides a handheld misting fan 10, and the misting fan 10 includes the fan assembly shown in FIG. 45 to FIG. 48. The handheld housing 40 may also be rotatably connected to the fan housing 21, so that the handheld housing 40 can rotate relative to the fan housing 21 to switch between a handheld state and a bent connection state. The handheld housing 40 includes a support surface 401. When the handheld housing 40 and the fan housing 21 are in the bent connection state, the support surface 401 is configured to be arranged on an external object to enable the handheld housing 40 to support the fan housing 21.

Ninth Embodiment

Please referring to FIG. 50 to FIG. 53, the ninth embodiment of the present disclosure also provides a misting fan 10, and the misting fan 10 is a clip-on misting fan, or a desktop misting fan. It may be understood that parts of the misting fan 10 in the ninth embodiment that have essentially the same structure as those of the misting fans 10 in the first to sixth embodiment may not be described in detail in the ninth embodiment, but the descriptions in the first to sixth embodiments about essentially the same structure as the ninth embodiment can be essentially appliable to the ninth embodiment. The following mainly introduces the key parts of the misting fan 10 in the ninth embodiment or the differences from the misting fans 10 in the first to sixth embodiments.

The misting fan 10 includes a clamp mechanism 61, the clamp mechanism 61 is connected to the fan housing 21 and configured to arrange the misting fan 10 on an external object. Specifically, two clamp portions 611 of the clamp mechanisms 61 are rotatably connected, and can be switched between a clamping state or a non-clamping state by controlling an elastic member 612.

The misting fan 10 further includes a main circuit board 41 arranged in the fan housing 21, at least one key arranged in at least one key hole of the air inlet guard 23, a port assembly 423 arranged in a charging aperture of the air inlet guard 23. The key, a wire 310 of an atomizing member 31, a wire 2220 of a fan blade assembly 22 and the port assembly 423 are all electrically connected to the main circuit board 41. The at least one key includes a first key 421, a second key 422, and a third key 429. The first key 421 is configured to control on/off and/or airflow volume of the fan blade assembly 22, the second key 422 is configured to control on/off of the atomizing member 31, and the third key 429 is configured to control on/off and/or illumination intensity of a lighting lamp or a decorative lamp 4290 arranged on the misting fan 10.

Tenth Embodiment

Figure 54:
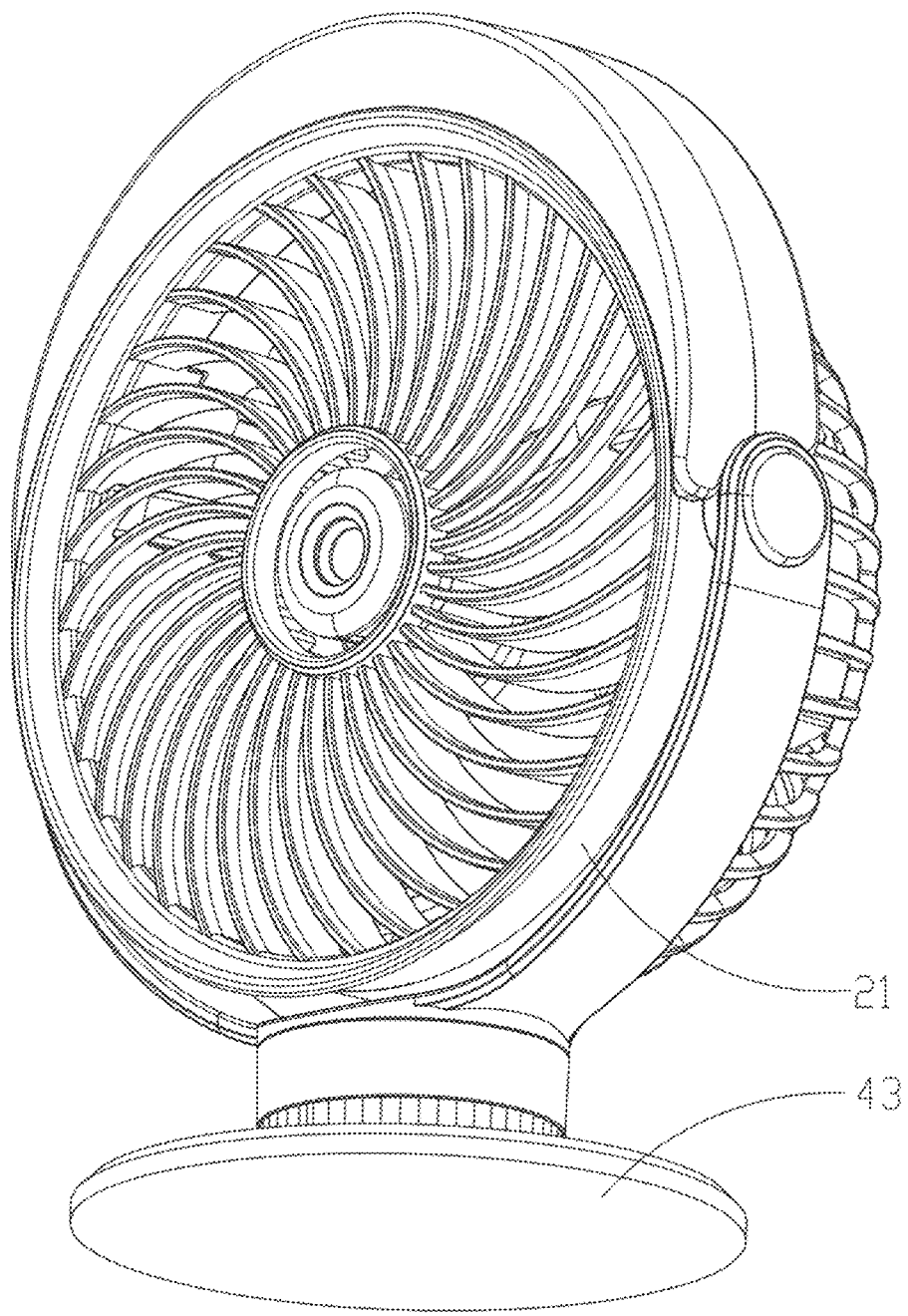
FIG. 54 is a three-dimensional diagram of a misting fan according to a tenth embodiment of the present invention.
Figure 55:
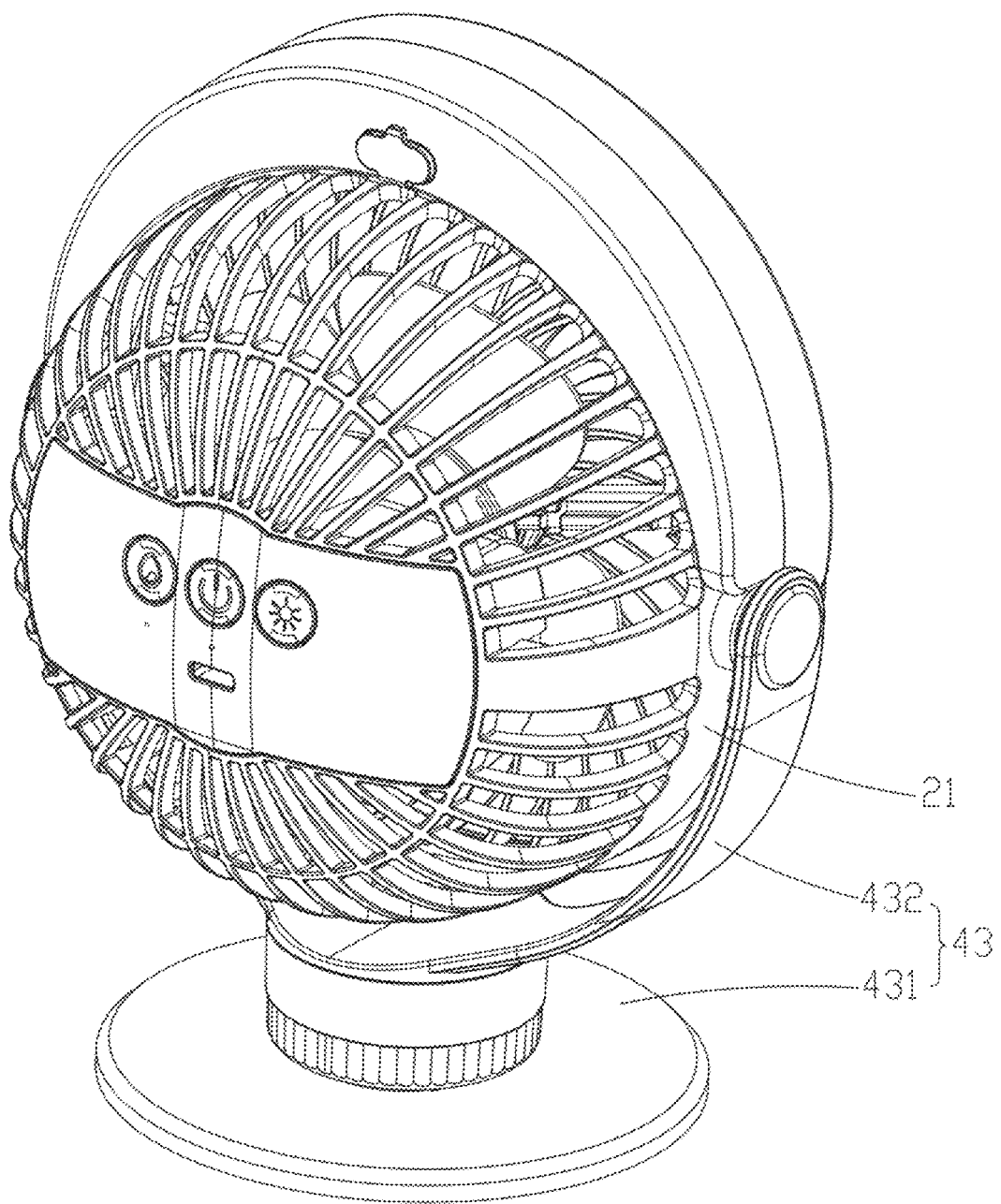
FIG. 55 is a three-dimensional diagram of a misting fan according to a tenth embodiment of the present invention from another perspective.
Figure 56:
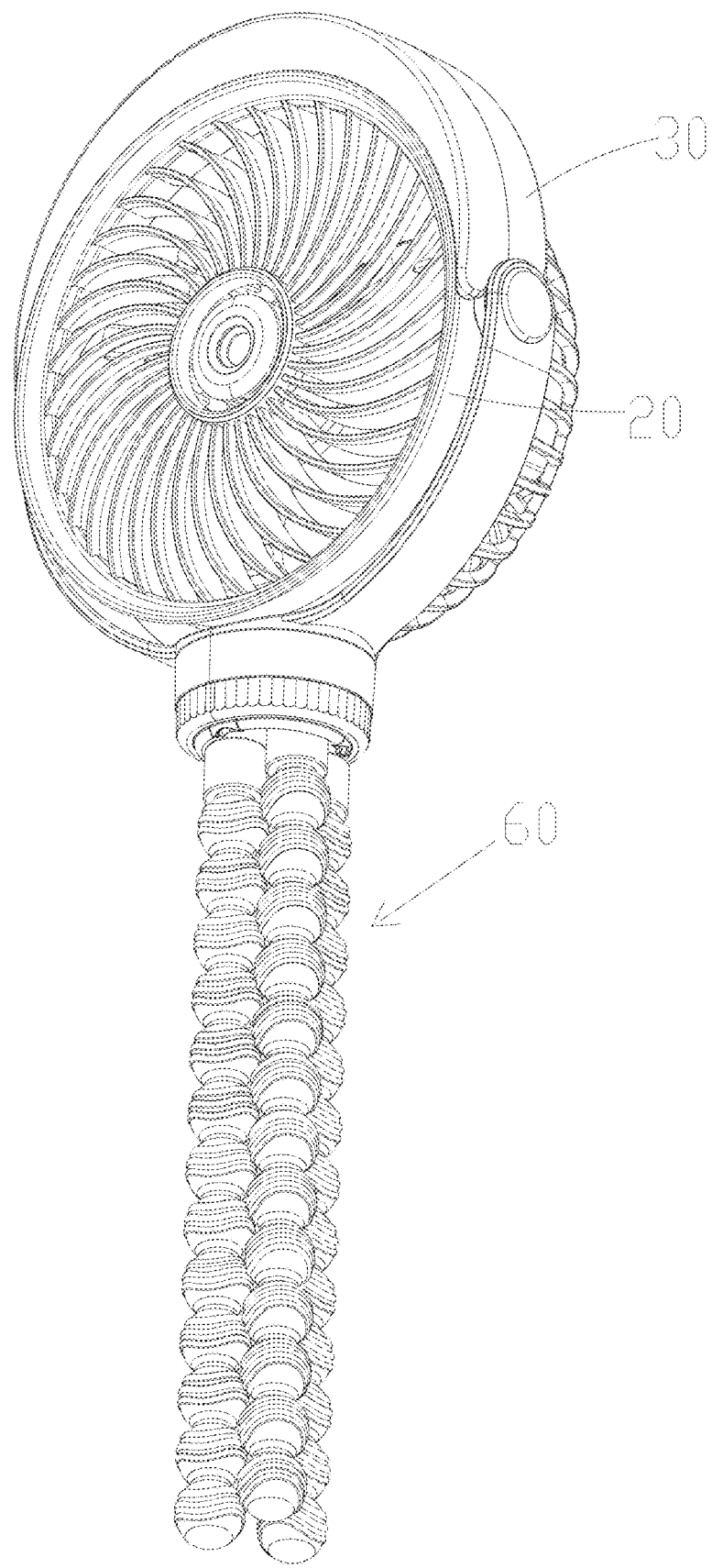
FIG. 56 is a three-dimensional diagram of a misting fan according to an eleventh embodiment of the present invention.
Figure 57:
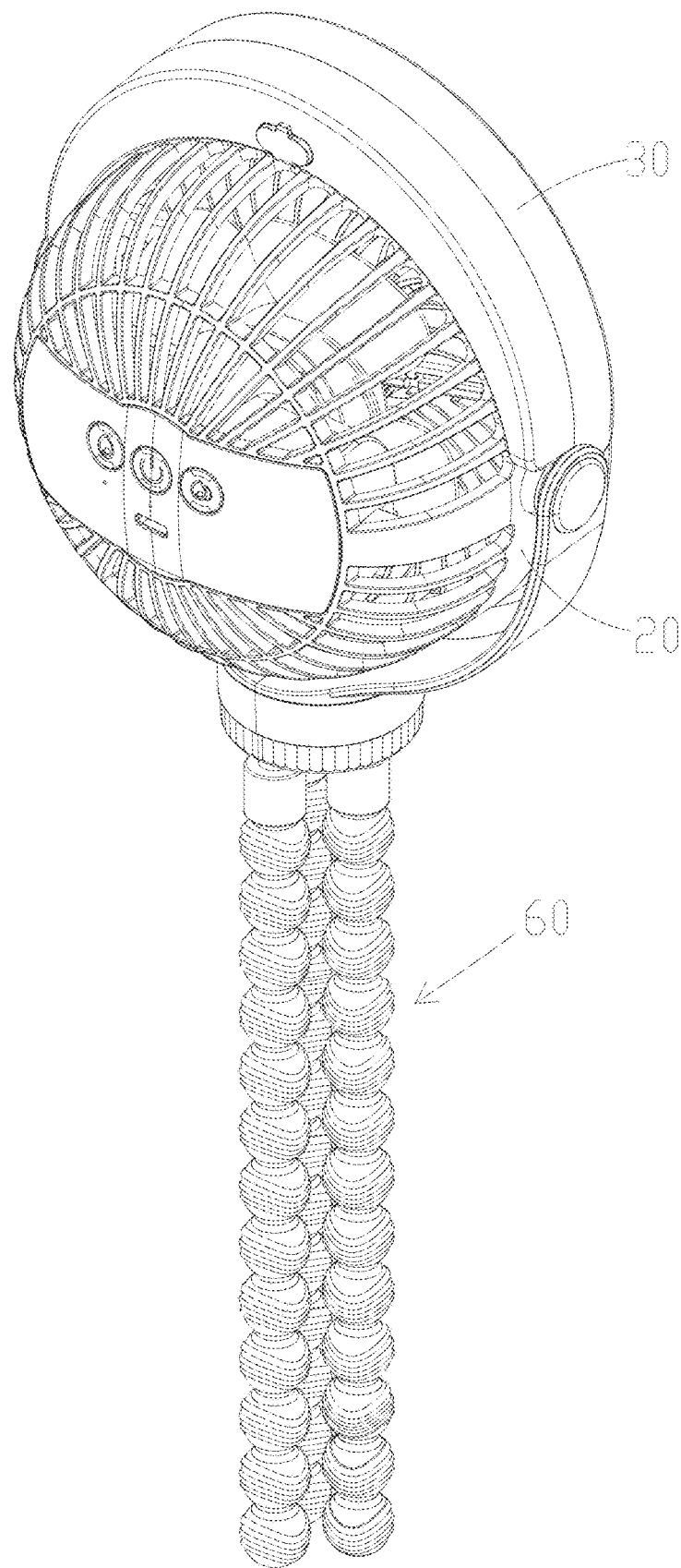
FIG. 57 is a three-dimensional diagram of a misting fan according to an eleventh embodiment of the present invention from another perspective.
Figure 58:
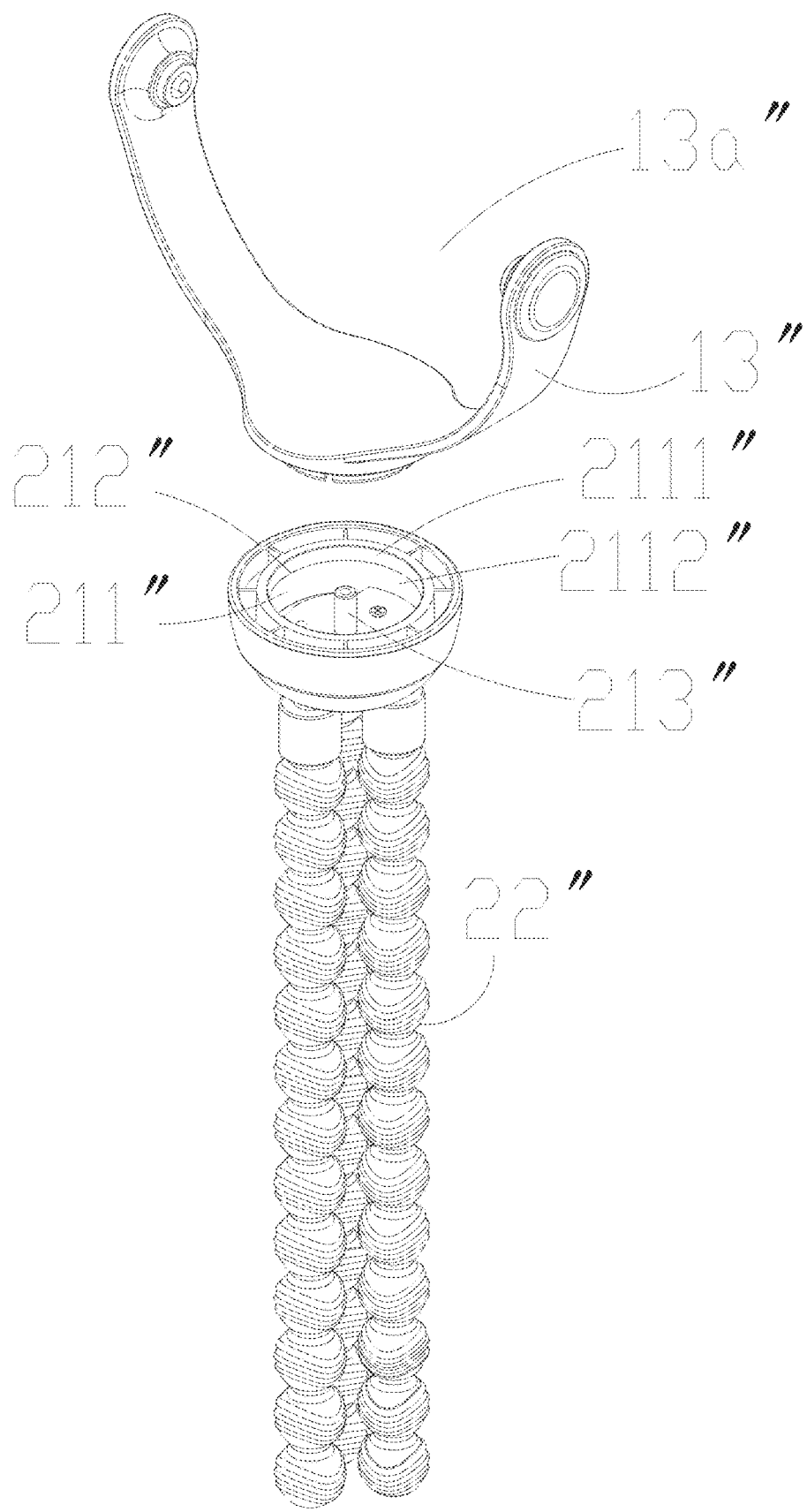
FIG. 58 is an exploded view of a misting fan according to an eleventh embodiment of the present invention.
Figure 59:
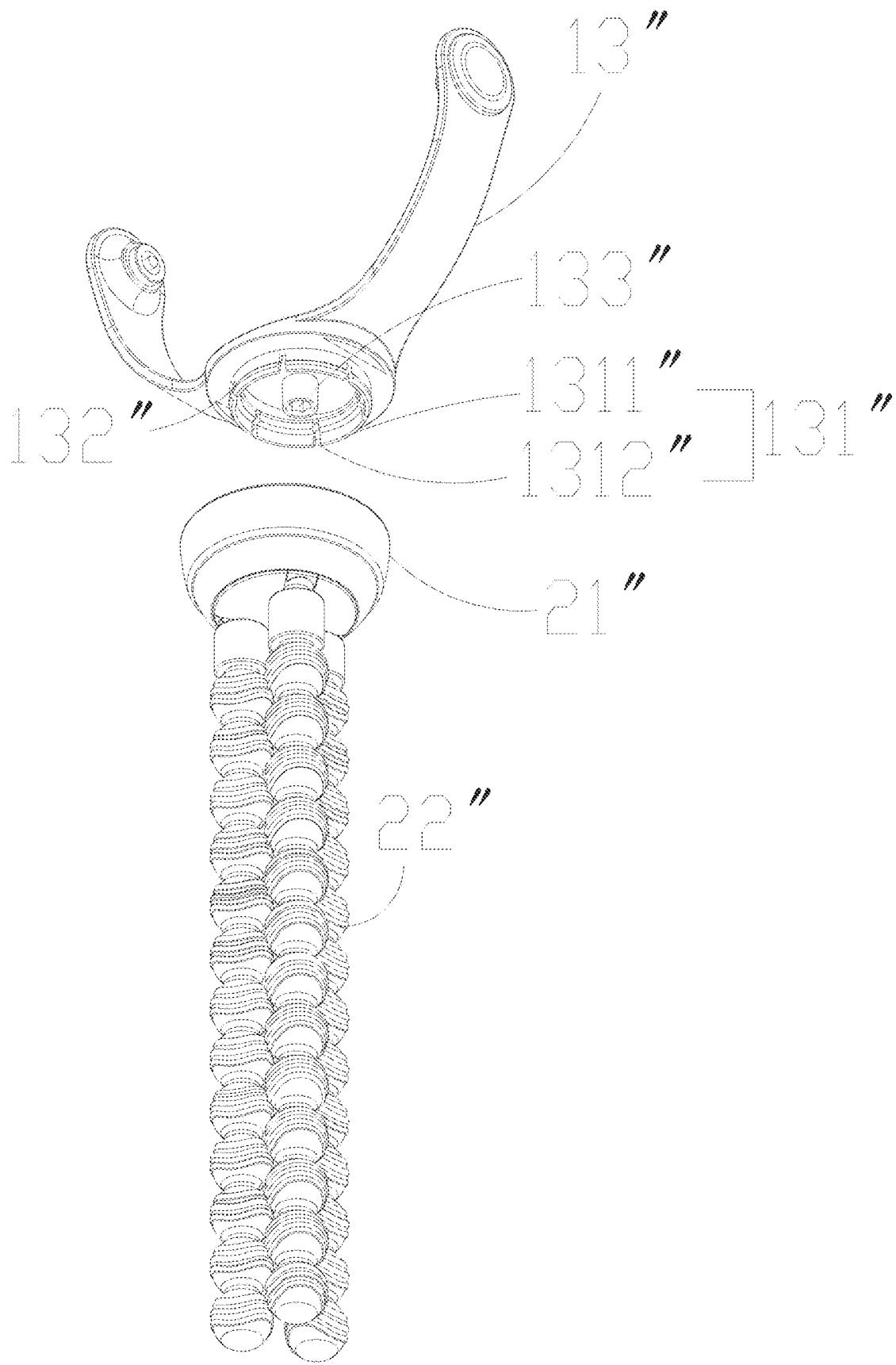
FIG. 59 is an exploded view of a misting fan according to an eleventh embodiment of the present invention from another perspective.
Figure 60:
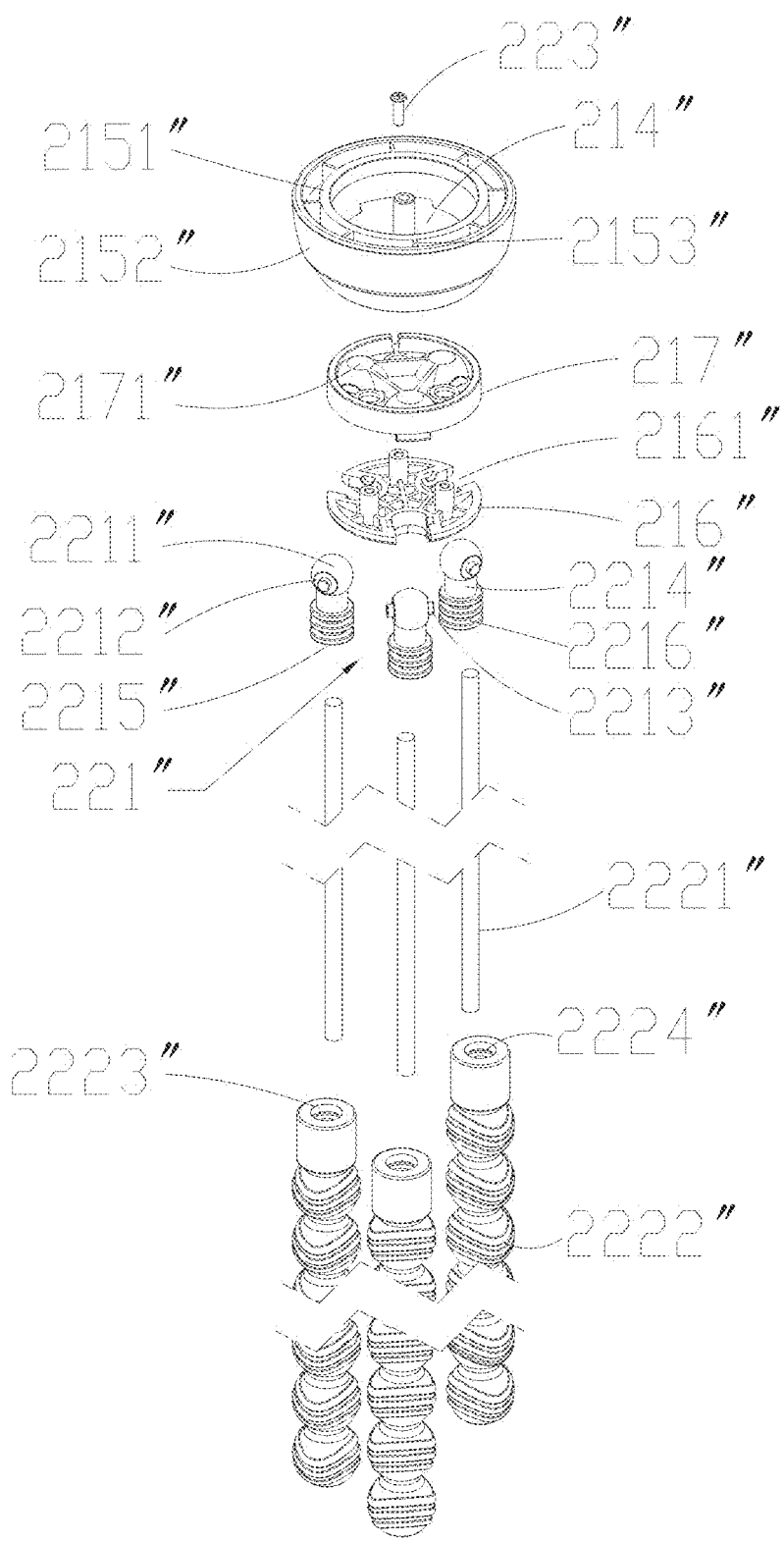
FIG. 60 is an exploded view of a bracket of a misting fan according to an eleventh embodiment of the present invention.
Figure 61:
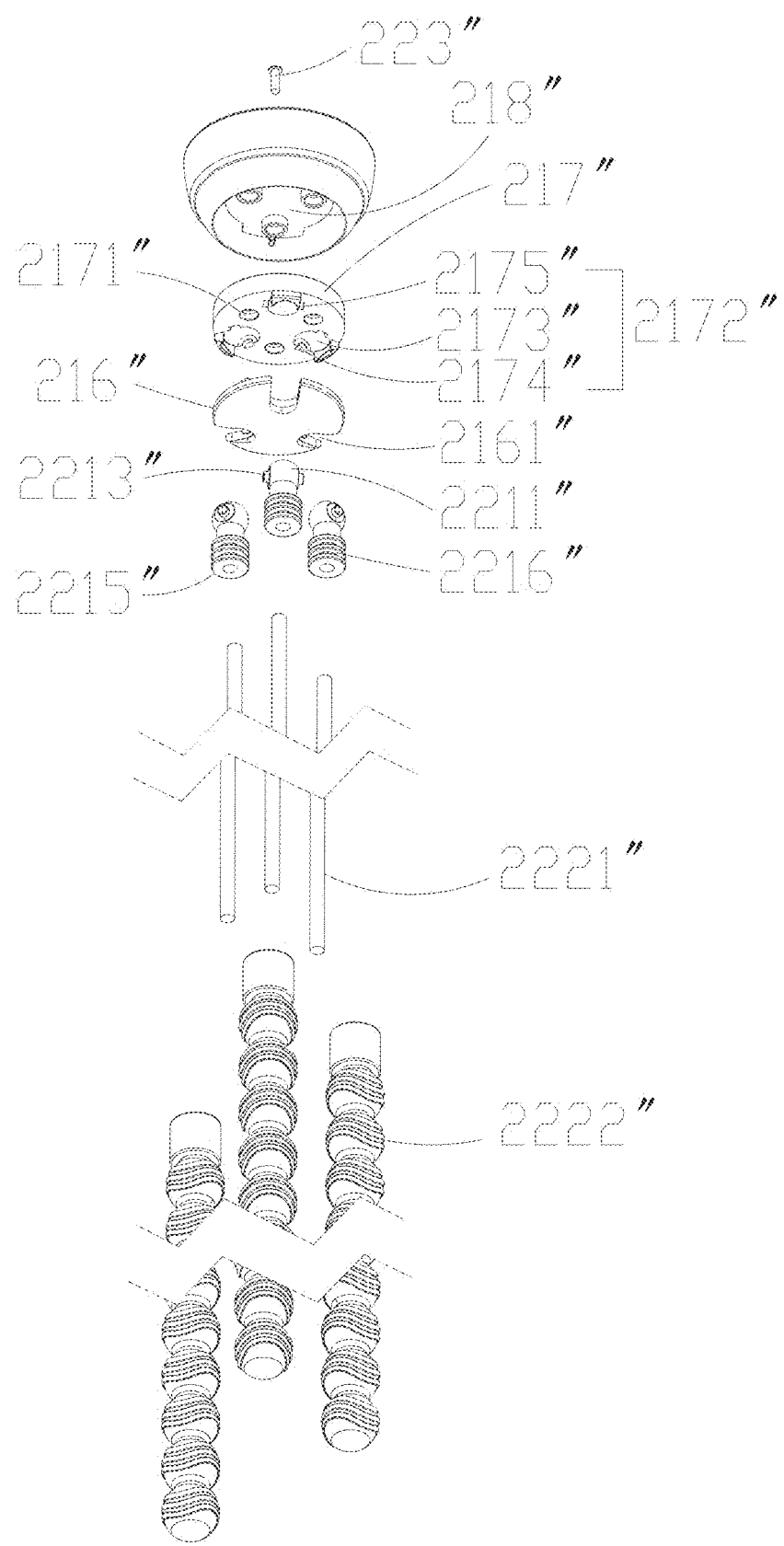
FIG. 61 is an exploded view of a bracket shown in FIG. 60 from another perspective.
Figure 62:
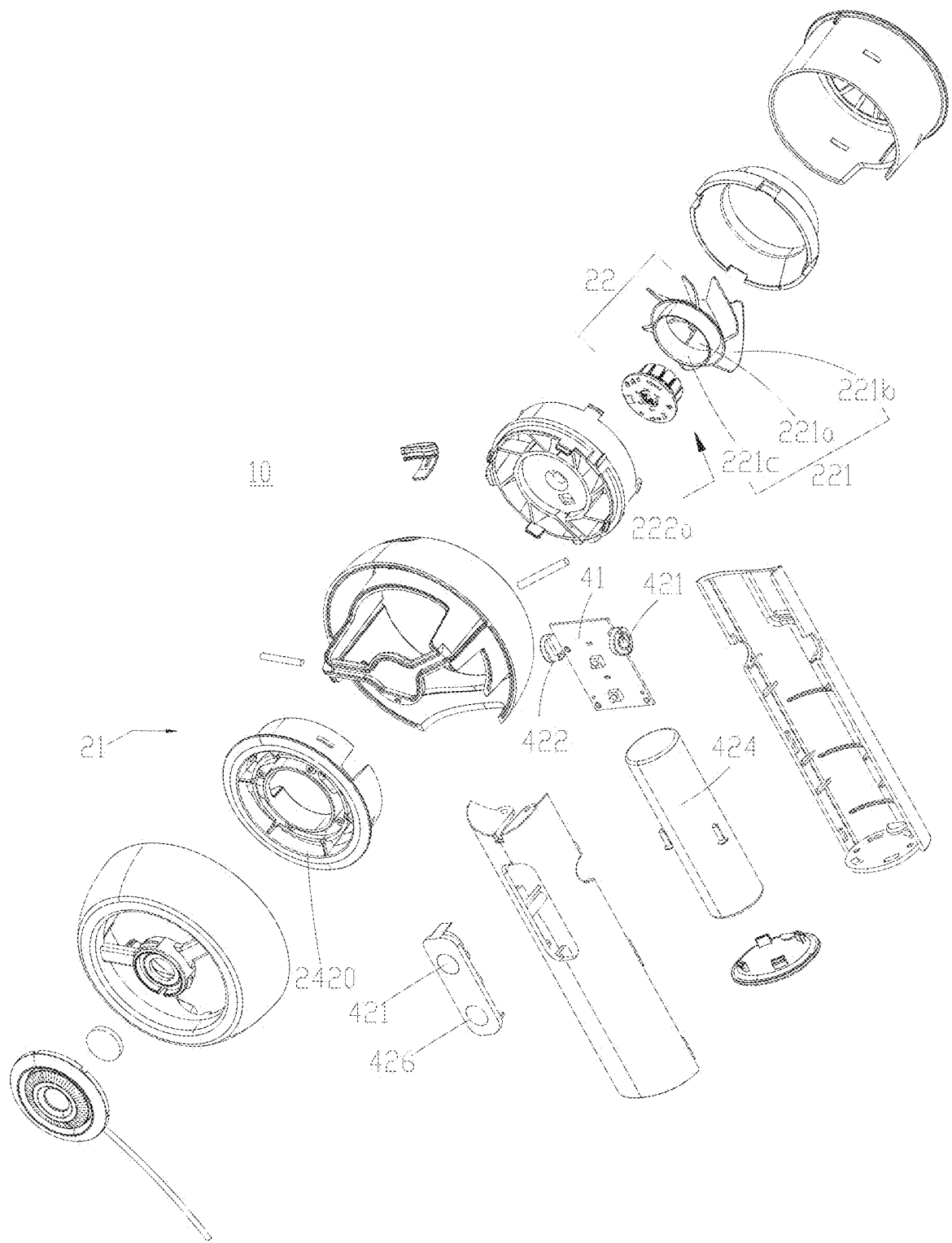
FIG. 62 is an exploded view of a fan according to a twelfth embodiment of the present invention.
Figure 63:
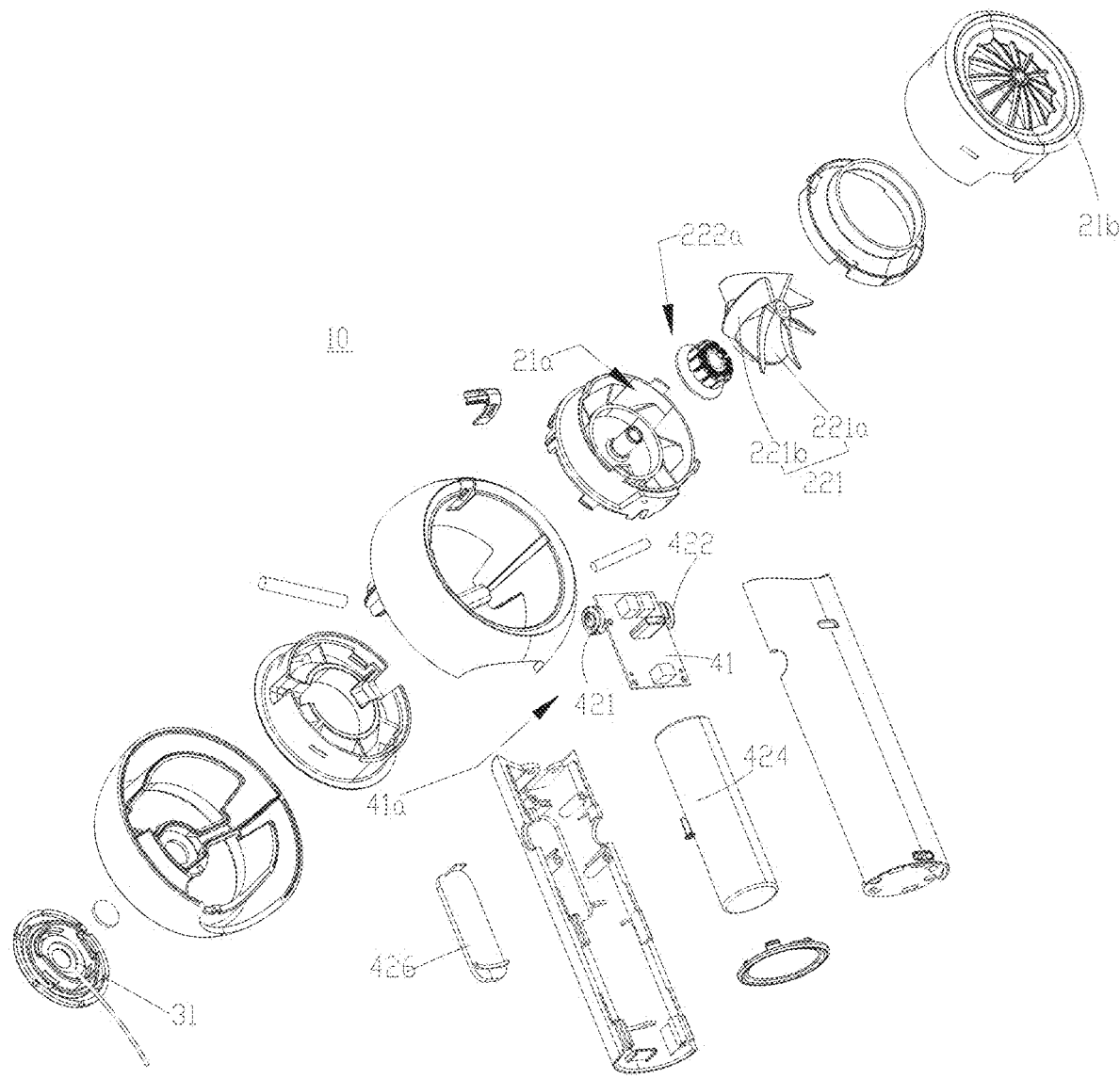
FIG. 63 is an exploded view of the fan according to the twelfth embodiment of the present invention, viewed in another angle.
Figure 64:
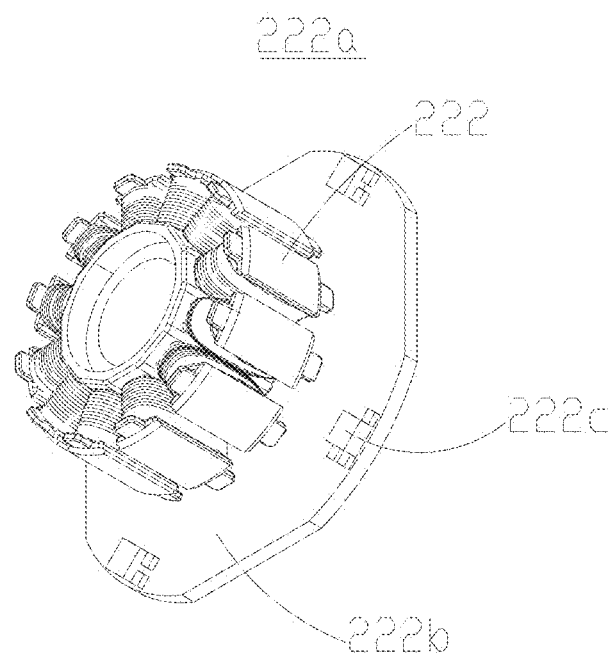
FIG. 64 is a three-dimensional diagram of a motor assembly of the fan according to the twelfth embodiment of the present invention.
Figure 65:
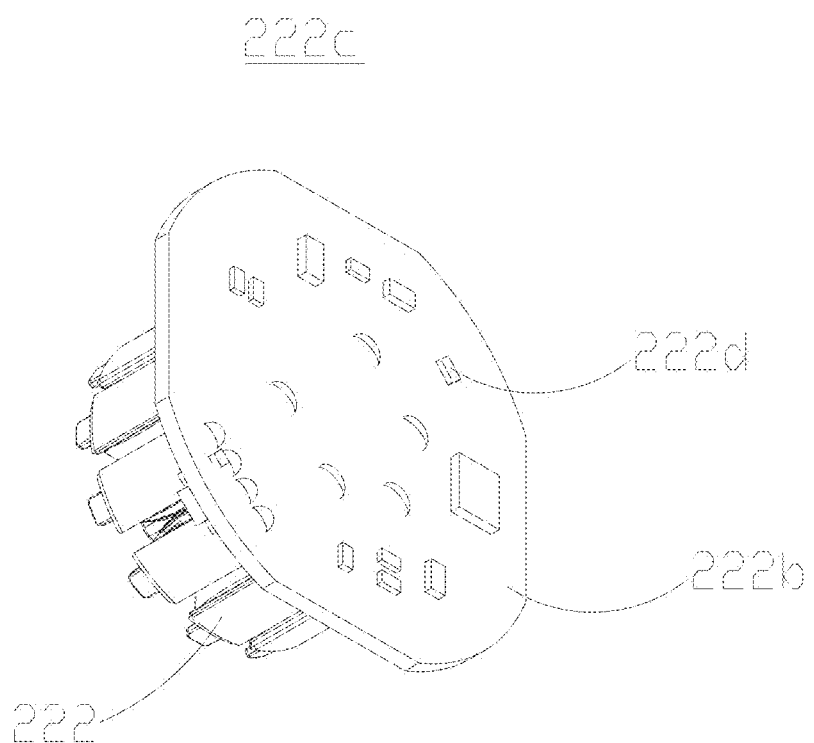
FIG. 65 is a three-dimensional diagram of a motor assembly of the fan according to the twelfth embodiment of the present invention, viewed in another angle.
Figure 66:
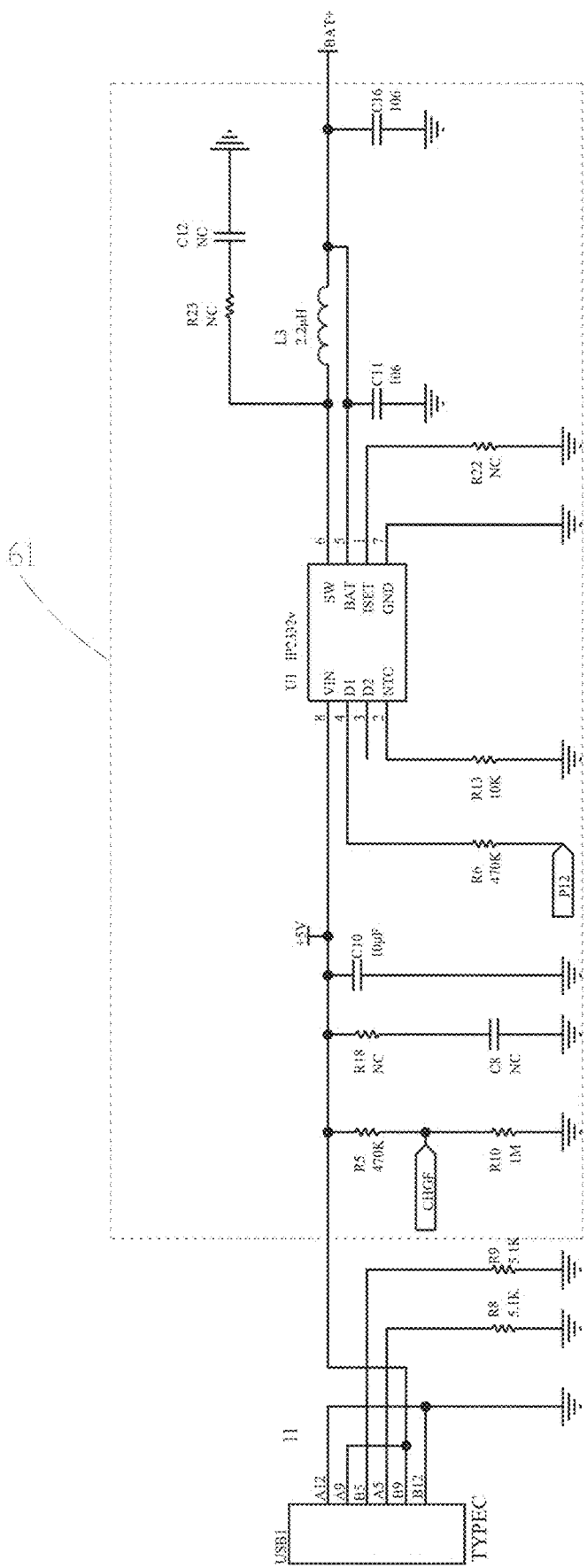
FIG. 66 is a schematic structural diagram of a charging management circuit of the fan according to the twelfth embodiment of the present invention.
Figure 67:
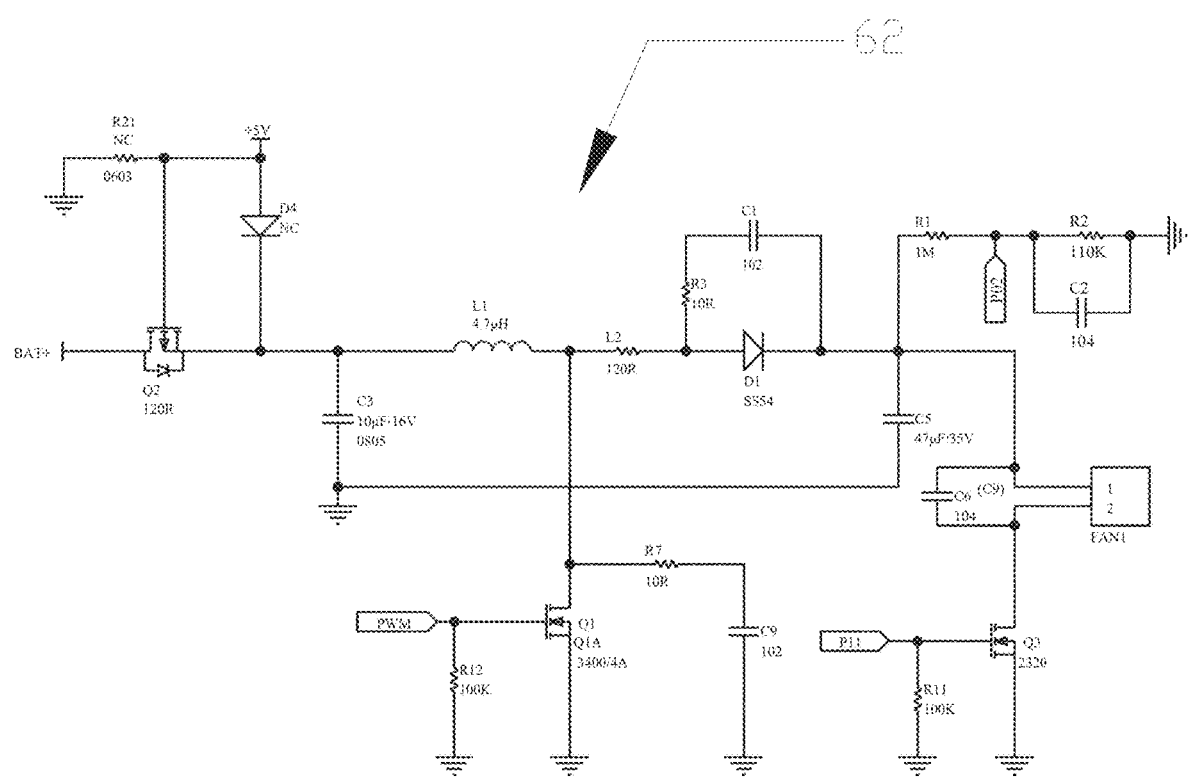
FIG. 67 is a schematic structural diagram of a fan driving circuit of the fan according to the twelfth embodiment of the present invention.
Figure 68:
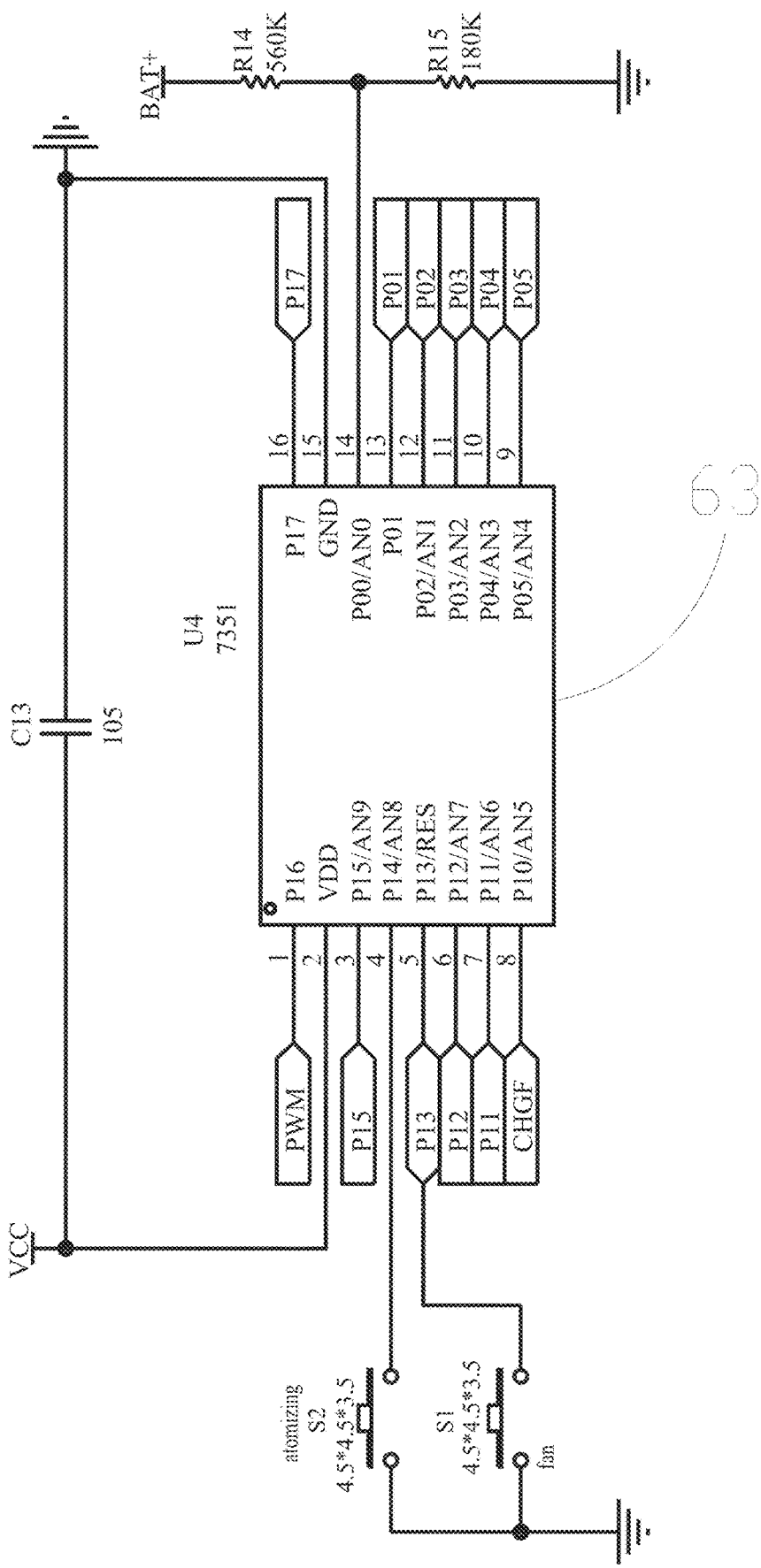
FIG. 68 is a schematic structural diagram of a main control circuit of the fan according to the twelfth embodiment of the present invention.
Figure 69:
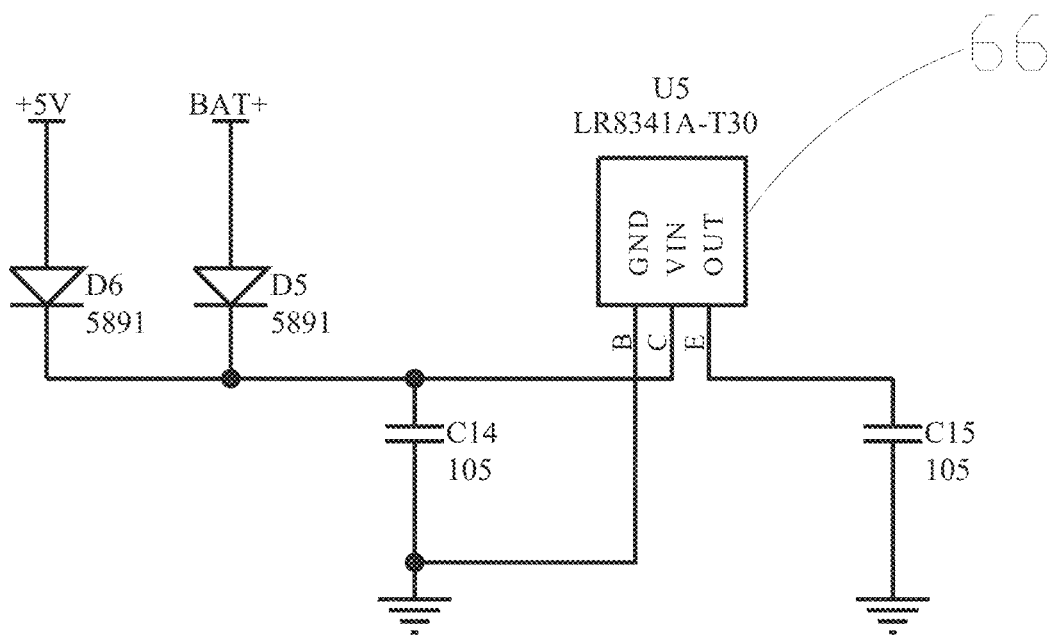
FIG. 69 is a schematic structural diagram of a light-emitting driving circuit of the fan according to the twelfth embodiment of the present invention.
Figure 70:
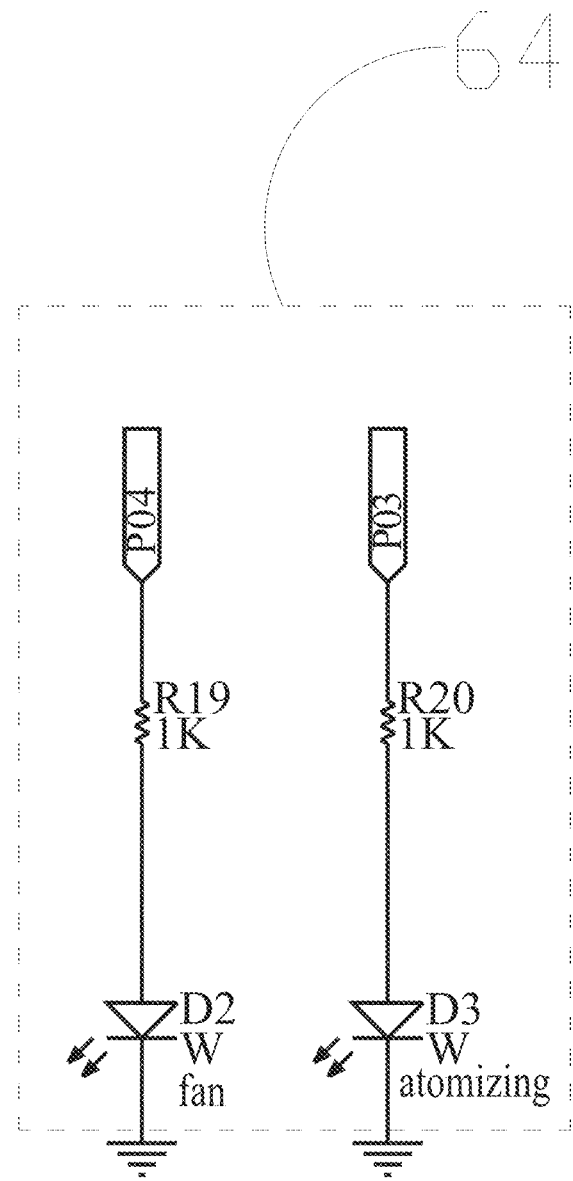
FIG. 70 is a schematic structural diagram of an indicator lamp circuit of the fan according to the twelfth embodiment of the present invention.
Figure 71:
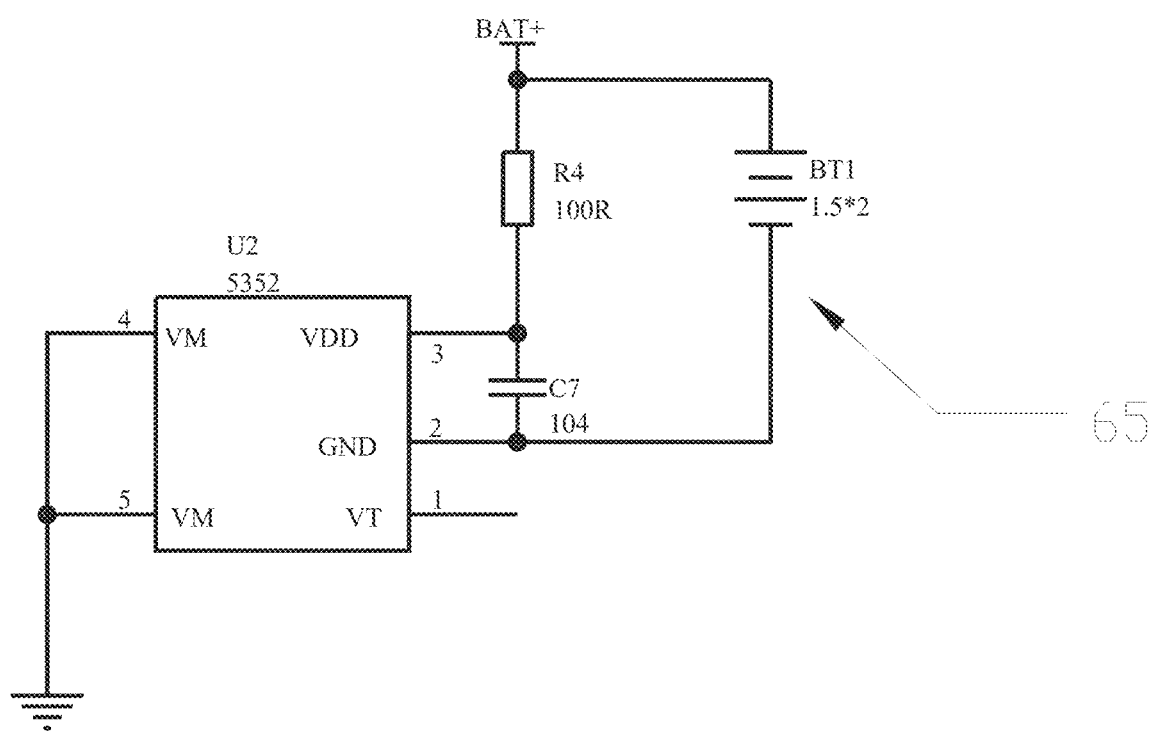
FIG. 71 is a schematic structural diagram of a battery protection circuit of the fan according to the twelfth embodiment of the present invention.
Figure 72:
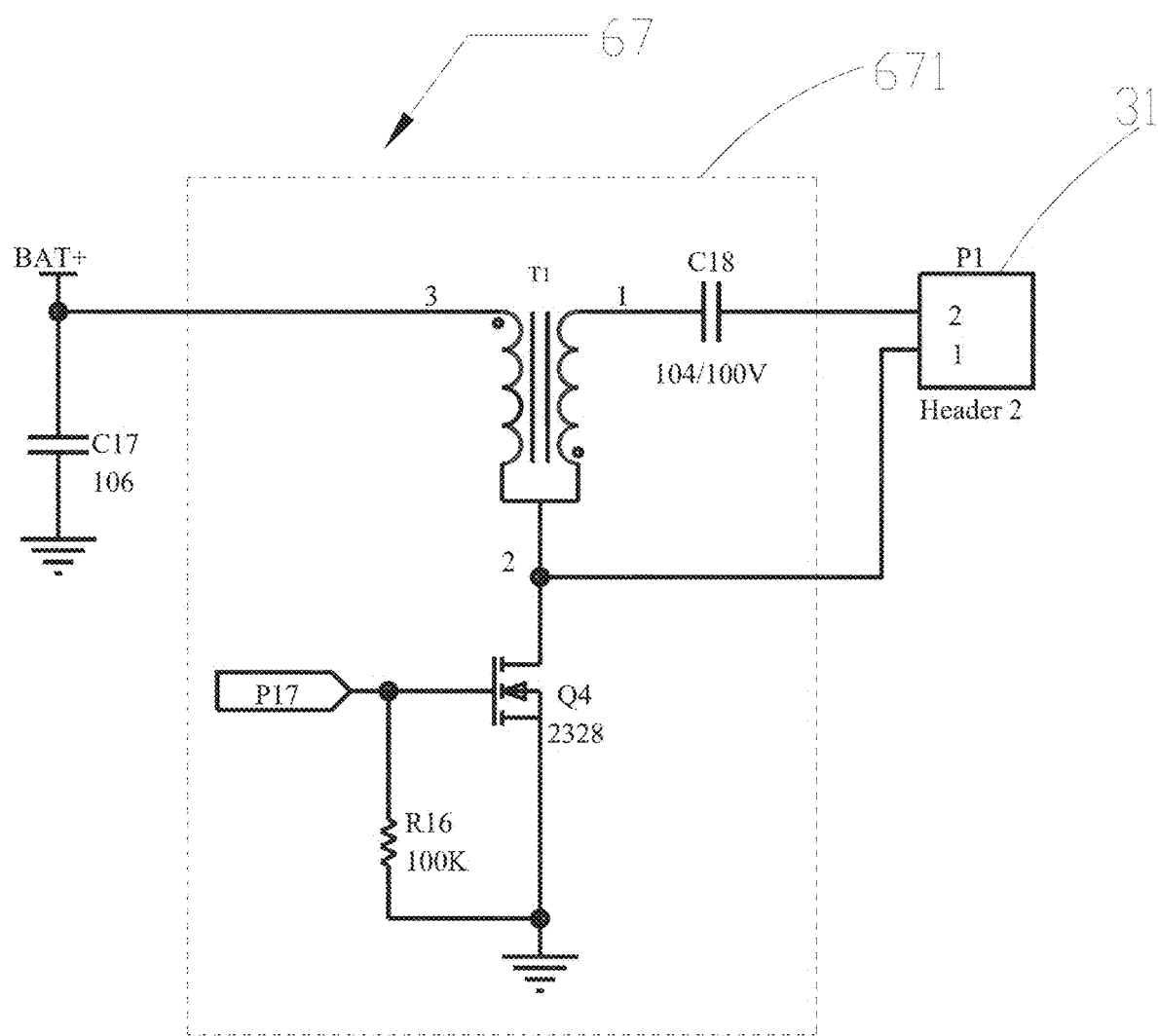
FIG. 72 is a schematic structural diagram of a booster circuit of the fan according to the twelfth embodiment of the present invention.

Please referring to FIG. 54 to FIG. 55, the tenth embodiment of the present invention provides a misting fan 10, and the misting fan 10 is a desktop misting fan. It may be understood that parts of the misting fan 10 in the tenth embodiment that have essentially the same structure as those of the misting fans 10 in the first to ninth embodiment may not be described in detail in the tenth embodiment, but the descriptions in the first to ninth embodiments about essentially the same structure as the tenth embodiment can be essentially appliable to the tenth embodiment. The following mainly introduces the key parts of the misting fan 10 in the tenth embodiment or the differences from the misting fans 10 in the ninth embodiment.

In the tenth embodiment, the misting fan 10 includes a base 43, and the base 43 is rotatably connected to the fan housing 21. Further, the base 43 may include a base body 431 and a support member 432. The base body 431 may be rotatably connected to the support member 432, so that the support member 432 can drive the fan housing 21 to rotate relative to the base body 431 to achieve oscillation. The fan housing 21 may also be rotatably connected relative to the support member 432 to adjust a pitching angle of the fan assembly.

Eleventh Embodiment

Please referring to FIG. 56 to FIG. 61, the eleventh embodiment of the present invention also provides a misting fan 10, and the misting fan 10 is a bracket misting fan. It may be understood that parts of the misting fan 10 in the eleventh embodiment that have essentially the same structure as those of the misting fans 10 in the first to ninth embodiment may not be described in detail in the eleventh embodiment, but the descriptions in the first to tenth embodiments about essentially the same structure as the eleventh embodiment can be essentially appliable to the eleventh embodiment. The following mainly introduces the key parts of the misting fan 10 in the eleventh embodiment or the differences from the misting fans 10 in the tenth embodiment.

Specifically, in the eleventh embodiment, the misting fan 10 may be a bracket fan with at least one support leg capable of being shaped by bending, including a bracket 60 with at least one support leg capable of being shaped by bending. The bracket 60 is configured to arrange the misting fan 10 on an external object. The misting fan 10 may include a mounting structure arranged on an inner side an air inlet guard 23, and a fan blade assembly 22 is mounted on the air inlet guard 23.

The bracket 60 includes a first connector 13", a second connector 21", and at least one support leg 22" capable of being shaped by bending, where the at least one support leg is connected to the second connector 21". The first connector 13" is configured to connect a fan housing of a fan assembly 20, the at least one support leg 22" is configured to arrange the misting fan 10 on the external object. One of the first connector 13" and the second connector 21" is provided with a first mounting groove 211", and the other of the first connector 13" and the second connector 21" is provided with an elastic connecting portion 131". The elastic connecting portion 131" extends into the first mounting groove 211" and is elastically deformed under the pressing of a groove wall of the first mounting groove 211", so that the elastic connecting portion 1311" can be pressed against and fastened into the first mounting groove 211", and then the fan assembly 20 and the bracket 60 can be connected into a whole.

The first connector 13" includes the elastic connecting portion 131", and the elastic connecting portion 131" is connected to the bracket 60.

The first mounting groove 211" is an annular groove. When the elastic connecting portion 131" extends into the first mounting groove 211" and is elastically deformed under the pressing of the groove wall of the first mounting groove 211", so that the elastic connecting portion 131" can be pressed against and fastened into the first mounting groove 211", and then the fan assembly 20 and the bracket 60 can be connected into a whole.

Compared with the prior art, the misting fan 10 provided by the present invention adopts the first connector 13" in the fan assembly 20 as well as the first mounting groove 211" and the elastic connecting portion 131" in the second connector 21" of the bracket 60 to implement the rapid abutting mounting of the fan assembly 20 and the bracket 60, so that the fan assembly 20 and the bracket 60 can be assembled separately during production and assembly, and then the fan assembly 20 and the bracket 60 can be assembled together, which is convenient for production and assembly and can improve the production efficiency. Moreover, the elastic connecting portion 131" and the first mounting groove 211" are simple and firm in structure, which can ensure the strength and service life of the product, and improve the competitiveness of the product and use experience of the user.

The elastic connecting portion 131" includes multiple elastic sheets 1311", and the elastic sheets 1311" may be in snap-fit connection with the first mounting groove 211". Specifically, the elastic sheet 1311" has a certain elasticity, can deform under the action of an external force, and recover or generate resilience. When the elastic connecting portion 131" extends into the first mounting groove 211", the elastic sheet 1311" abuts against the wall of the first mounting groove 211". The annular groove is used to connect the elastic sheet 1311", which has simple structure and low cost. When the fan assembly 20 needs to be mounted to the bracket 60, it is only necessary to insert the elastic sheet 1311" into the first mounting groove 211", and due to the elasticity of the elastic sheet 1311", the elastic sheet can deform when inserted into the first mounting groove 211", and can be reset to abut against the groove wall of the first mounting groove 211" after being installed in place, thereby ensuring stability of connection. The assembly and connection are convenient and rapid, and the competitiveness of the product is improved.

Specifically, an outer sidewall of the elastic sheet 1311" is provided with a protrusion 132", the protrusion 132" is arranged at a free end of the elastic sheet 1311", i.e., one end, away from the fan assembly 20, of the elastic sheet 1311". An inner sidewall of the first mounting groove 211" is provided with a step portion 212", the step portion 212" is configured to abut against the protrusion to limit the elastic sheet 1311" in the first mounting groove 211". The arrangement of the protrusion 132" not only can enhance the strength of the elastic sheet 1311", but also can make the elastic sheet to cooperate with the step portion 212" to firmly clamp the elastic sheet 1311" into the first mounting groove 211", so that the product is firmly connected, convenient to use and practical.

In this embodiment, the first mounting groove 211" is provided with an annular sidewall, including a first annular sidewall 2111" and a second annular sidewall 2112". A distance from the first annular sidewall 2111" to an axis of the first mounting groove 211" is greater than a distance from the second annular sidewall 2112". to an axis of the first mounting groove 211", thereby forming the step portion 212". When the elastic connecting portion 131" is mounted in the first mounting groove 211", the protrusion 132" abuts against the second annular sidewall 2112".

In this embodiment, the protrusion 132" is provided with an arc-shaped surface, which can be clamped into the step portion 221" when abutting against the step portion 212", so that the assembling of the elastic sheet 1311" and the first mounting groove 211" can be achieved by the user with less force.

To provide an elastic deformation space, there is a gap 1312" between every two elastic sheets 1311", so that the elastic sheet 1311" has a certain deformation space when deforming, and is prevented from being damaged. The first connector 13" further includes a locating slot 133", and the elastic sheet 1311" is arranged around the locating slot 133". The first mounting groove 211" is internally provided with a locating post 213" for being inserted into the locating slot 133". In some embodiments, the first connector 13" can rotate around an axis with respect to the first mounting groove 211". By providing the gap 1312", the elastic sheet 1311" can be better mounted in the first mounting groove 211", so that the elastic sheet 1311" have a deformable space when extruded inwards, and can be prevented from being damaged. By providing the locating post 213" to be in fit with the locating slot 133", the elastic sheet 1311" can be located and mounted easier when inserted into the first mounting groove 211", thereby avoiding product damage caused by misalignment. The first connector 13" can rotate around the axis to facilitate the angle adjustment of the fan assembly 20, which helps improve use experience of the user.

The bracket 60 further includes a support leg 22", the support leg 22" is arranged at one end, away from the first connector 13", of the second connector 21", and the support leg 22" is rotatably connected to the second connector 21". By providing the support leg 22", the product can be better supported on the surface of the object or held by the user. The rotatable connection makes the support leg 22" suitable for more scenes.

Specifically, the support leg 22" can be bent and deformed, and the misting fan 10 can be arranged on an external object. For example, the support legs 22" can be opened to stand on the surface of the external object, or the support legs 22" can be bent and deformed to stand on the surface of the object, or the support legs 22" can be bent and deformed to wind around the object, so that the misting fan 10 can be used in multiple scenes.

The number of the support legs 22" is three, and each support leg 22" is rotatably connected to the second connector 21". One of use states is that the three support legs 22", after being rotated by a same angle, are supported on the surface of the object to achieve stable support. The support leg 22" is flexible, and can deform and maintain a deformed state under the action of the external force, such as bent by a certain angle or wound around the object, thereby supporting the misting fan 10. Moreover, after deformation, the support leg can recover to an original state under the action of the external force. In other embodiments, the number of the support legs 22" may be one, two, four or other numbers, which is not particularly limited in the present invention.

In this embodiment, the second connector 21" includes a base plate 214" and a first sidewall 2151" connected to the base plate 214". The support leg 22" is mounted on the base plate 214", the base plate 214" forms a first mounting groove 211" with the first sidewall 2151", and the elastic sheet 1311" is pressed against and fastened to an inner side of the first sidewall 2151".

The second connector 21" further includes a second sidewall 2151" connected to the base plate 214" and located at an outer side of the first sidewall 2151", and one of the first connector 13" and the second connector 21" further includes multiple reinforcing plates 2153" connected between the first sidewall 2151" and the second sidewall 2152". A cross section of the first sidewall 2151" is circular, and a cross section of the second sidewall 2152" is circular. The locating post 213" is located at the center of the first sidewall 2151", and the first sidewall 2151" and the second sidewall 2152" are coaxially arranged. By providing the second sidewall 2152" and the reinforcing plate 2153", the strength of the product component can be ensured, and the service life of the product can be prolonged.

The second connector 21" further includes a fixing cover 216", the fixing cover 216" is provided with at least one opening 2161", and is fixed to one side, away from the fan assembly 20, of the base plate 214". A fixed end 221" of the support leg 22" is fastened between the fixing cover 216" and the base plate 214", and a support portion 222" of the support leg 22" extends out from the opening 2161" and is arranged on the external object. The fixing cover 216" and the base plate 214" are locked by a locking member 223".

The second connector 21" further includes a fixing plate 217", the fixing plates 217" is located between the base plate 214" and the fixing cover 216", and the locking member 223" passes through the opening 2171" on the fixing plate 217" to lock the base plate 214", the fixing plate 217" and the fixing cover 216" together. A surface, close to the fixing end 221", of the fixing plate 217" is provided with a fixing groove 2172" in fit with at least part of a shape of the fixing end 221", and the fixing end 221" is arranged in the fixing groove 2172". The arrangement of the fixing cover 216" is convenient for the assembly of the support leg 22", and through the connection and fixation of the locking member 223", the structure is simple.

Specifically, the fixing end 221" includes a spherical portion 2211", the fixing groove 2172" includes a spherical groove 2173", The fixing end 221" further includes two limiting planes 2212", and limiting protrusions 2213" respectively arranged on the two limiting planes 2212", and the fixing groove 2172" includes two mating planes 2174", and mating grooves 2175" respectively arranged on the two mating planes 2174". The limiting plane 2212" abuts against the mating plane 2174", and the limiting protrusion 2213" is arranged in the mating groove 2175".

In this embodiment, the base plate 214" also forms a second mounting groove 218" with the first sidewall 2151", the second mounting groove 218" is arranged opposite to the first mounting groove 211", and the fixing plate 217" is arranged in the second mounting groove 218". An inner diameter of the first sidewall 2151" gradually decreases along a direction from the fan assembly 20 to the bracket 60. An edge of the fixing cover 216" is aligned with and connected to an edge, away from the fan assembly 20, of the first sidewall 2151". A surface, away from the fan assembly 20, of the fixing cover 216" is an arc-shaped surface protruding toward the side away from the base plate 214".

Specifically, the opening 2161" is a semi-closed opening arranged at an edge of the fixing cover 216, the opening 2161" is in fit with the fixing plate 217" to limit a rotation angle of the support leg 22", so that the support leg 22" can rotate only in the range of the opening 2161".

The fixing end 221" further includes a clamp portion 2214" connected to the spherical portion 2211", and a connecting portion 2215" connected to the clamping portion 2214" and away from the spherical portion 2211", and a diameter of the clamping portion 2214" is adapted to the size of the opening 2161" and is smaller than that of the spherical portion 2211". The support portion 222" includes a support main body 2221" capable of being shaped by bending, and a flexible material portion 2222" wrapped around the support main body 2221", the flexible material portion 2222" is provided with a connecting groove 2223", and the connecting portion 2215" is fastened into the connecting groove 2223". An outer surface of the connecting portion 2215" includes a first convex-concave structure 2216", and an inner surface of the connecting groove 2223" includes a second convex-concave structure 2224". The first convex-concave structure 2216" is meshed with the second convex-concave structure 2224" to connect the connecting portion 2215" with the flexible material portion 2222". By providing the spherical portion 2211" and the spherical groove 2173" that are in fit with each other, the support leg 22" can be rotatably connected to the fixing groove 2172", and a rotation direction and angle can be limited through design of a relevant limiting structure to avoid the product damage caused by excessive rotation angle, thereby facilitating the use of the user. Through the structural design of the supporting feet 22", the product can be better placed on the surface of the object or held by the user, can be used in more applicable scenes.

Specifically, the support main body 2221" is made of aluminum, iron and other metal materials. The flexible material portion 2222" is made of a material with a certain flexibility or elasticity, such as silicon and rubber. During production, the support main body 2221" is wrapped with the flexible or elastic material and then subjected to injection molding to form the flexible material portion 2222", and then is assembled on the second connector 21".

In this embodiment, to adjust an angle of the fan assembly 20 conveniently, the first connector 13" is rotatably connected to the fan housing 21. The first connector 13" is provided with a mounting space 13a" for accommodating the fan housing 21, and the elastic connecting portion 131" is arranged at one side, away from the mounting space, of the first connector 13". Specifically, the first connector 13" is a U-shaped structure, and the fan housing 21 is arranged at the opening. A rotatable connection between the first connector 13" and the fan housing 11" makes the fan housing 21 able to rotate, so that an air outlet direction can be conveniently adjusted, and the use is convenient.

Twelfth Embodiment

Referring to FIG. 62 to FIG. 65, the twelfth embodiment of the present application provides a fan. The fan can be a portable fan, specifically a handheld misting fan. It can be understood that parts of the misting fan 10 of the twelfth embodiment that have basically the same structures as those in the misting fans 10 of the first to eleventh embodiments may not be described in detail in the twelfth embodiment, but the descriptions of the structures, which are basically the same as those in the twelfth embodiment, in the first to eleventh embodiments can be basically applicable to the twelfth embodiment. The following mainly introduces key parts of the misting fan 10 of the twelfth embodiment or differences from the misting fan 10 of the fourth embodiment.

In the twelfth embodiment, the misting fan 10 includes a fan housing 21 and a fan blade assembly 22. The fan housing 21 has a storage cavity 21a, an air inlet 21b communicated to the storage cavity 21a, and air outlet holes 2420 communicated to the storage cavity. The fan blade assembly 11 is located inside the storage cavity 21a and includes a blade assembly 221 and a motor assembly 222a. The motor assembly 222a includes a motor 222 connected to the blade assembly 221, a circuit board 222b connected to the motor 222, and at least one light-emitting element 222c. The motor 222 is configured to drive the blade assembly 221 to rotate to export air at the air inlet 21b to the air outlet holes 2420. The at least one light-emitting element 222c is arranged on the circuit board 222b to emit light toward the air inlet 21b and/or the air outlet holes 2420.

In this embodiment, the motor 222 is arranged on the circuit board 222b. The at least one light-emitting element 222c is also arranged on the circuit board 222b and can emit light toward the air inlet 21b and/or the air outlet holes 2420. The misting fan 10 and the motor assembly 222a have a light-emitting effect and a good user experience, and competitiveness of the product is improved.

Specifically, the blade assembly 221 includes a mounting portion 221a and a plurality of blades 221b annularly arranged at a periphery of the mounting portion 221a. The mounting portion 221a is configured to mount the motor 222. The circuit board 222b is connected to one side of the motor 222. The at least one light-emitting element 222c includes a plurality of light-emitting elements 222c annularly arranged on the circuit board 222b. It can be understood that the plurality of light-emitting elements 222c can achieve a better lighting or light-emitting atmosphere effect and provide a good user experience.

In this embodiment, the mounting portion 221a has a mounting cavity 221c. The motor 222 is located in the mounting cavity 221c. The at least one light-emitting element 222c and the motor 222 are arranged on the same side of the circuit board 222b. The plurality of light-emitting elements 222c are annularly arranged at a periphery of the motor 222. Further, the misting fan 10 further includes a plurality of electronic elements 222d. The plurality of electronic elements 222d can be resistors, capacitors, and/or chips, which are arranged on the circuit board 222b and are located on a side opposite to the motor 222. It can be understood that the above design makes the layout of the circuit board 222b proper, so that the manufacturing process is simple, the costs are low, and it is also conducive to avoiding electrical interference.

In this embodiment, the at least one light-emitting element 222c includes a light source assembly capable of emitting light with various different colors (such as a light-emitting diode (LED) light source having red-green-blue (RGB) sub light sources). The light source assembly includes at least two sub light sources that have different colors and that are separately controlled to be switched on and switched off. Each sub light source is configured to emit light with one color, thereby enabling the light source assembly to emit light with various different colors. There are a plurality of the at least one light-emitting element 222c. Each light-emitting element includes a light source assembly capable of emitting light with various different colors. It can be understood that the light source assembly enables the fan to be controlled to achieve different lighting effects, for example, to emit light with different colors, light with constantly switched colors, and/or flashing marquee light, so that the fan can provide a perfect atmosphere effect and a good user experience.

It can be understood that the fan blade assembly 22 is an axial flow fan blade assembly, and the air inlet 21b, the storage cavity 21A, and the air outlet holes are arranged on the same straight line. The fan further includes a control assembly 41a (such as the main circuit board 41 and the keys 421 and 422). The control assembly 41a is electrically connected to the circuit board 222b and is configured to control operation of the motor 222b and light emission of the at least one light-emitting element 222c. The specific elements (such as the main circuit board 41 and the keys 421 and 422) of the control assembly have been introduced in the first to eleventh embodiments above and will not be elaborated here.

The fan blade assembly 22 is an axial flow fan blade assembly. The air inlet 21b, the storage cavity 21a, and the air outlet holes 2420 are arranged on the same straight line, which not only makes the misting fan 10 have high air efficiency, but also makes a lighting effect observed from the air inlet 21b and the air outlet holes 2420, so that the misting fan 10 has a good light-emitting effect.

Referring to FIG. 66 to FIG. 72, an equivalent circuit of the misting fan 10 can include a charging management circuit 61, a fan driving circuit 62, a main control circuit 63, an indicator lamp circuit 64, a battery protection circuit 65, a light-emitting driving circuit 66, and an atomization driving circuit 67. The light-emitting driving circuit 66 can be arranged on the circuit board 222b. The charging management circuit 61, the fan driving circuit 62, the main control circuit 63, the indicator lamp circuit 64, the battery protection circuit 65, and the atomization driving circuit 67 can be arranged on the main circuit board 41. The atomization driving circuit 67 includes a booster circuit 671. The booster circuit 671 is configured to: receive a voltage BAT+ of the battery 424 and boost the voltage BAT+ of the battery 424 to output a driving voltage to the atomizing member 31, to drive the atomizing member 31 to work. The driving voltage is greater than the voltage of the battery. Specifically, the voltage BAT+ of the battery 424 can be 5 V. The driving voltage can be about 80 V or can be set according to an actual need. The light-emitting driving circuit 66 can be electrically connected to light-emitting elements D5 and D6 to drive the light-emitting elements D5 and D6 to emit light. The battery protection circuit 65 can be electrically connected to the battery BT1.

The booster circuit 671 includes an inductor T1, a capacitor C18, and a control switch Q4. A first end of the inductor T1 is connected to a positive electrode (such as BAT+) of the battery 424. A second end of the inductor T1 is grounded through two conducting ends of the control switch Q4. A third end of the inductor T1 is connected to a positive electrode of the atomizing member 31 through the capacitor C18. A negative electrode of the atomizing member 31 is connected to the second end of the inductor T1. A control end of the control switch Q4 is connected to the main control circuit 63.

The above descriptions are only preferred embodiments of the present invention, and are not intended to limit the patent scope of the present invention. Any equivalent structural transformation made by using the content of the specification and the drawings of the present invention under the invention idea of the present invention, directly or indirectly applied to other related technical fields, shall all be included in the scope of patent protection of the present invention.

What is claimed is:
1. A misting fan, comprising:
a fan assembly, comprising a fan housing and a fan blade assembly arranged in the fan housing, wherein the fan housing comprises an air inlet guard located at an air inlet side and an air outlet guard located at an air outlet side, the air outlet guard comprises a mist outlet portion and a plurality of air outlet vanes annularly connected about the mist outlet portion, the mist outlet portion comprises a mist outlet hole, and a plurality of air outlet holes annularly arranged about the mist outlet hole are formed among the plurality of air outlet vanes; and a misting assembly, comprising an atomizing member and a water tank, wherein the atomizing member is located in the fan housing and corresponds to the mist outlet hole, the water tank comprises a main tank body, at least one water delivery pipeline, and an atomizing portion, the at least one water delivery pipeline communicates between the main tank body and the atomizing portion, the atomizing portion corresponds to the atomizing member, and the atomizing portion and the atomizing member are located between the fan blade assembly and the air outlet guard to enable the fan blade assembly to be able to blow air entering from the air inlet side to sequentially pass through a periphery of the atomizing portion and a periphery of the atomizing member and then blow the air out through the plurality of air outlet holes; liquid in the main tank body is able to be provided to the atomizing member through the at least one water delivery pipeline and the atomizing portion, thereby enabling the atomizing member to spray mist spray formed by atomizing the liquid from the mist outlet hole, and outlet airflow from the plurality of air outlet holes is arranged around the mist spray;

wherein the at least one water delivery pipeline is located at one side of the air outlet hole, and when viewed from an air outlet direction of the air outlet hole, a projection of the at least one water delivery pipeline overlaps with that of at least one of the plurality of air outlet holes or that of at least one of the plurality of air outlet vanes; the misting fan further comprises at least one wind shield structure, when viewed from the air outlet direction of the air outlet hole, a projection of the at least one wind shield structure overlaps with or is staggered from the projection of the at least one water delivery pipe, and at least one wind shield structure is configured to balance the outlet airflow of the plurality of air outlet holes disrupted by the at least one water delivery pipe, thereby enabling the outlet airflow of the plurality of air outlet holes basically and uniformly arranged around the mist spray, wherein a direction of the mist spray is basically along a central axis of the mist outlet hole.

2. The misting fan according to claim 1, wherein the main tank body is located above the fan housing, the at least one delivery pipeline is located at an upper half side of the fan housing in a direction of gravity, the at least one wind shield structure comprises a first wind shield structure, and the first wind shield structure is located at a lower half side of the fan housing in the direction of gravity; at least one inner wall, close to one end of the at least one water delivery pipeline, of the main tank body is higher than or equal to one end, connected to the main tank body, of the at least one water delivery pipeline in the direction of gravity; one end, connected to the main tank body, of the at least one water delivery pipeline is higher than or equal to one end, connected to the atomizing portion, of the at least one water delivery pipeline in the direction of gravity, thereby facilitating the liquid in the main tank body to flow into the atomizing portion through the at least one water delivery pipeline under an action of gravity.

3. The misting fan according to claim 2, wherein the at least one water delivery pipeline comprises a first water delivery pipeline and a second water delivery pipeline; the main tank body comprises an arc-shaped structure with a cavity, the first water delivery pipeline communicates between one end of the main tank body and the atomizing portion, and the second water delivery pipeline communicates between the other end of the main tank body and the atomizing portion; in a direction from the fan blade assembly to the air outlet guard, the water tank composed of the main tank body, the first water delivery pipeline, the second water delivery pipeline and the atomizing portion is divided into a first part of housing facing the fan blade assembly, and a second part of housing facing the air outlet guard, the first part of housing and the second part of housing are hermetically connected into a whole, and the second part of housing comprises an atomizing hole formed in the atomizing portion; the atomizing member is located in a mounting groove in the atomizing portion, the mist spray is sprayed out through the atomizing hole and the mist outlet hole, or the atomizing member is located outside the atomizing portion and corresponds to the atomizing hole, thereby atomizing the liquid in the water tank into the mist spray through the atomizing hole and spraying out the mist spray through the mist outlet hole; the air outlet guard further comprises an outer frame annularly connected to peripheries of the plurality of air outlet vanes; a position, corresponding to the at least one water delivery pipeline, of the outer frame is provided with an avoidance opening; one end, connected to the main tank body, of the at least one water delivery pipeline is embedded into the avoidance opening, and the at least one wind shield structure is arranged at the air outlet guard and connected between the mist outlet portion and the outer frame.

4. The misting fan according to claim 3, wherein the atomizing member is located outside the atomizing portion, a surface, close to the air outlet guard, of the atomizing portion is provided with the mounting groove, the atomizing member is arranged in the mounting groove, and the atomizing portion is further provided with a first wire slot communicating with the mounting groove, and a wire of the atomizing member extends out through the first wire slot; the misting assembly further comprises a decorative cover, and the decorative cover is mounted on one side, close to the air outlet guard, of the atomizing member and is in snap-fit with the atomizing portion; the decorative cover comprises a main body portion with an opening, the main body portion is mounted on one side, close to the air outlet guard, of the atomizing member and is in snap-fit with the atomizing portion, and the mist spray of the atomizing member is sprayed out through the opening.

5. The misting fan according to claim 4, wherein the decorative cover further comprises a wiring portion connected to the main body portion, one side, away from the air outlet side, of the wiring portion is provided with a second wire channel, and the wire of the atomizing member extends out after passing through the first wire slot and the second wire channel in turn.

6. The misting fan according to claim 4, wherein the fan housing further includes an inner guard body, the inner guard body comprises an inner frame corresponding to the outer frame, a plurality of inner vanes corresponding to the plurality of air outlet vanes, and an inner plate portion corresponding to the mist outlet portion; the plurality of inner vanes are connected between the inner plate portion and the inner frame, an extension direction of each of the inner vanes is different from that of each of corresponding air outlet vanes, thereby enabling the inner guard body and the air outlet guard to form two air gathering structures successively relative to the fan blade assembly; the plurality of inner vanes and the plurality of air outlet vanes are configured to compress the outlet airflow of the fan blade assembly in turn; one end, away from the inner guard body, of each inner vane deviates from an extension direction of the air outlet vane towards a rotational side of the fan blade assembly; the water tank is arranged between the air outlet guard and the inner guard body; the inner guard body further comprises a wiring portion connected between the inner plate portion and the inner frame; one side, close to the air outlet guard, of the wiring portion is provided with a second wire channel, and the wire of the atomizing member extends out through the first wire slot and the second wire channel in turn.

7. The misting fan according to claim 6, wherein the inner guard body further comprises a mounting structure arranged at one side, away from the air outlet guard, of the inner plate portion; the fan blade assembly is fastened to the inner guard body through the mounting structure; the fan blade assembly comprises a motor, and a blade assembly; the motor is mounted on the mounting structure and connected to the blade assembly; the inner plate portion is provided with a wire hole, and a wire of the motor extends out through the wire hole, the first wire slot and the second wire channel.

8. The misting fan according to claim 4, wherein the air inlet guard comprises a mounting portion, a plurality of air inlet vanes annularly connected about the mounting portion, and a frame body connected to peripheries of the plurality of air inlet vanes; one side, close to the air outlet guard, of the mounting portion is provided with a mounting structure, and the fan blade assembly is fastened to the air inlet guard through the mounting structure; the fan blade assembly comprises a motor, and a blade assembly; the motor is mounted on the mounting structure and connected to the blade assembly, an inner surface of at least one of the plurality of air inlet vanes is provided with a second wire channel, and a wire of the motor extends out through the second wire channel.

9. The misting fan according to claim 3, wherein the at least one wind shield structure comprises a first wind shield structure, a second wind shield structure, and a third wind shield structure; when viewed from the air outlet direction, the first wind shield structure and the second wind shield structure correspondingly correspond to the first water delivery pipeline and the second water delivery pipeline, respectively; in a circumferential direction of the air outlet guard, a circumferential distance between the third wind shield structure and the first wind shield structure is equal to that between the third wind shield structure and the second wind shield structure, and a width of the third wind shield structure is greater than or equal to a width of the first wind shield structure as well as a width of the second wind shield structure.

10. The misting fan according to claim 3, wherein the at least one wind shield structure comprises a first wind shield structure and a second wind shield structure, when viewed from the air outlet direction, the first wind shield structure and the second wind shield structure are located at a lower half side of the fan housing in the direction of gravity; and the first wind shield structure and the second wind shield structure are symmetrically arranged with the first water delivery pipeline and the second water delivery pipeline, respectively.

11. The misting fan according to claim 2, wherein the water tank further comprises a decorative tank, the decorative tank is arranged below the fan housing, and both ends of the decorative tank are connected to both ends of the main tank body to form an annular structure arranged around the fan housing; the at least one inner wall comprises two inner walls, and the two inner walls are located on both ends of the main tank body and both ends of the decorative tank, respectively; each inner wall is located between a cavity of the main tank body and a cavity of the decorative tank, and configured to separate the cavity of the main tank body from the cavity of the decorative tank; the water tank is made of a transparent material; the fan housing further comprises an air guide housing, the air guide housing is arranged between the air inlet guard and the fan blade assembly, and an inner diameter of the air guide housing gradually increases from the air inlet side to the air outlet side, thereby guiding the air from the air inlet guard into the fan blade assembly.

12. The misting fan according to claim 2, wherein the misting assembly further comprises a water guide sheet, the water guide sheet is arranged on a liquid inlet side of the atomizing member and configured to guide the liquid of the atomizing portion into the atomizing member; the misting assembly further comprises at least one fiber liquid guide strip which is arranged in the at least one water delivery pipeline; and one end of the fiber liquid guide strip extends to the main tank body, and the other end of the fiber liquid guide strip extends to the atomizing portion for guiding the liquid in the main tank body to the atomizing portion.

13. The misting fan according to claim 12, wherein the water tank is further provided with a water injection port, and the misting assembly further comprises a sealing plug at least partially detachably arranged at the water injection port; the sealing plug comprises a sealing plug main body arranged at the water injection port, and a connector for connecting the sealing plug main body; one end, away from the sealing plug main body, of the connector is sandwiched between the fan housing and the water tank, the fan housing or the water tank is provided with a first fixing portion, one end, away from the sealing plug main body, of the connector is provided with a second fixing portion, and the first fixing portion and the second fixing portion are fixedly connected to fasten the connector between the fan housing and the water tank; the sealing plug is made of a flexible material, and the flexible material comprises silicone or rubber; the first fixing portion is a fixing post, the second fixing portion is a fixing hole, and the fixing hole is sleeved on the fixing post; the sealing plug main body comprises a base plate, a connecting portion connected to one side of the base plate, and a sealing end connected to one side, away from the base plate, of the connecting portion; outer diameters of the sealing end and the base plate are greater than an outer diameter of the connecting portion and an outer diameter of the water injection port, and thus the sealing end is able to deform to extend into the water tank through the water injection port; the connecting portion is arranged in the water injection port, the sealing end and the base plate are configured to clamp the water tank at an inner side and an outer side of the water tank, thereby sealing the water injection port; the sealing plug main body further comprises an extension portion connected to one side of the base plate, and the extension portion is used for a user to fetch, and thus a sealing plug main body is able to be detached from the water injection port.

14. The misting fan according to claim 1, wherein the fan blade assembly is located inside the fan housing, and comprises a blade assembly and a motor assembly; the motor assembly comprises a motor connected to the blade assembly, a circuit board connected to the motor, and at least one light-emitting element; the motor is configured to drive the blade assembly to rotate to export air at the air inlet of the air inlet guard to the air outlet holes; and the at least one light-emitting element is arranged on the circuit board to emit light toward the air inlet and/or the air outlet holes.

15. A misting fan, comprising:

a fan assembly, comprising a fan housing and a fan blade assembly arranged in the fan housing, wherein the fan housing comprises an air inlet guard located at an air inlet side and an air outlet guard located at an air outlet side, the air outlet guard comprises a mist outlet portion and a plurality of air outlet vanes annularly connected about the mist outlet portion; and a misting assembly, comprising an atomizing member and a water tank, wherein the atomizing member is configured for atomizing water from the water tank to be mist, and the mist is output from the mist outlet portion;

wherein the misting fan further comprises a main circuit board and a battery; the main circuit board comprises a charging management circuit, a fan driving circuit, a main control circuit, and an atomization driving circuit; the atomization driving circuit comprises a booster circuit; the booster circuit is configured to: receive a voltage of the battery and boost the voltage of the battery to output a driving voltage to the atomizing member, to drive the atomizing member to work; the driving voltage is greater than the voltage of the battery; the booster circuit comprises an inductor, a capacitor, and a control switch; a first end of the inductor is connected to a positive electrode of the battery; a second end of the inductor is grounded through two conducting ends of the control switch; a third end of the inductor is connected to a positive electrode of the atomizing member through the capacitor; a negative electrode of the atomizing member is connected to the second end of the inductor; and a control end of the control switch is connected to the main control circuit.

16. The misting fan according to claim 15, wherein the handheld housing is rotatably connected to the fan housing, and the handheld housing is able to rotate relative to the fan housing to switch between a handheld state and a bent connection state; the handheld housing comprises a support surface, when the handheld housing and the fan housing are in the bent connection state, the support surface is configured to be arranged on an external object to enable the handheld housing to support the fan housing; or the handheld housing comprises a handheld main body, and an arc-shaped bracket portion connected to the handheld main body, both ends of the arc-shaped bracket portion are rotatably connected to two opposite sides of the fan housing respectively, and thus the fan assembly is able to be located in a storage space of the arc-shaped bracket portion and rotate relative to the handheld housing to adjust a pitch blowing angle of the fan assembly; or the misting fan further comprises a display screen, the display screen is mounted to correspond to a display opening of the handheld housing, the display screen is electrically connected to the main circuit board, and the display screen is configured to display fan speed setting of the misting fan and/or electric quantity of the battery.

17. A misting fan, comprising:

a fan assembly, comprising a fan housing and a fan blade assembly arranged in the fan housing, wherein the fan housing comprises an air inlet guard located at an air inlet side and an air outlet guard located at an air outlet side, the air outlet guard comprises a mist outlet portion and a plurality of air outlet vanes annularly connected about the mist outlet portion; and a misting assembly, comprising an atomizing member and a water tank, wherein the atomizing member is configured for atomizing water from the water tank to be mist, and the mist is output from the mist outlet portion;

wherein the misting fan further comprises a main circuit board arranged in the fan housing, and at least one key arranged on the air inlet guard and electrically connected to the main circuit board, the at least one key comprises a first key, a second key and a third key; the first key is configured to control on/off and/or airflow volume of the fan blade assembly, the second key is configured to control the on/off of the atomizing member, and the third key is configured to control on/off and/or illumination intensity of an illuminating lamp or decorative lamp arranged on the misting fan.

18. The misting fan according to claim 17, wherein the fan housing comprises a first connector; the bracket comprises a second connector, and at least one support leg capable of being shaped by bending, wherein the at least one support leg is connected to the second connector; the at least one support leg is configured to arrange the fan on an external object, one of the first connector and the second connector is provided with a mounting groove, and the other of the first connector and the second connector is provided with an elastic connecting portion; the elastic connecting portion extends into the first mounting groove and is elastically deformed under the pressure of a groove wall of the first mounting groove, and thus is able to be abutted and fixed into the first mounting groove, and then the fan assembly and the bracket are connected into a whole.

19. A misting fan, comprising:

a fan assembly, comprising a fan housing and a fan blade assembly arranged in the fan housing, wherein the fan housing comprises an air inlet guard located at an air inlet side and an air outlet guard located at an air outlet side, the air outlet guard comprises a mist outlet portion and a plurality of air outlet vanes annularly connected about the mist outlet portion; and a misting assembly, comprising an atomizing member and a water tank, wherein the atomizing member is configured for atomizing water from the water tank to be mist, and the mist is output from the mist outlet portion;

wherein the fan housing further comprises an inner guard body, a mounting portion, and a plurality of first blades; the mounting portion is located in the inner guard body and spaced apart from an inner wall surface of the inner guard body, the plurality of first blades are connected between the inner guard body and the mounting portion, and are distributed at intervals in a circumferential direction of the mounting portion, and the inner guard body is internally provided with a mounting cavity; the fan blade assembly comprises a hub and a plurality of second blades;

and an inclination direction of the second blades is opposite to that of the first blade; the air outlet guard is located on one side, away from the hub, of the mounting portion.

* * * * *